(12) United States Patent
Yeung et al.

(10) Patent No.: US 12,378,864 B2
(45) Date of Patent: Aug. 5, 2025

(54) SYSTEMS AND METHODS TO REDUCE ACOUSTIC RESONANCE OR DISRUPT STANDING WAVE FORMATION IN A FLUID MANIFOLD OF A HIGH-PRESSURE FRACTURING SYSTEM

(71) Applicant: BJ Energy Solutions, LLC, Houston, TX (US)

(72) Inventors: Tony Yeung, Houston, TX (US); Nicholas Tew, Houston, TX (US); William Nieuwenburg, Houston, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 249 days.

(21) Appl. No.: 17/972,699

(22) Filed: Oct. 25, 2022

(65) Prior Publication Data

US 2023/0132304 A1    Apr. 27, 2023

Related U.S. Application Data

(60) Provisional application No. 63/262,993, filed on Oct. 25, 2021.

(51) Int. Cl.
*E21B 43/26* (2006.01)
*F16L 41/03* (2006.01)
*F16L 55/027* (2006.01)

(52) U.S. Cl.
CPC .......... *E21B 43/2607* (2020.05); *F16L 41/03* (2013.01); *F16L 55/02718* (2013.01); *F16L 55/02754* (2013.01)

(58) Field of Classification Search
CPC .............. F16L 55/027; F16L 55/02718; F16L 55/02754; F16L 55/02781; E21B 43/2607
(Continued)

(56) References Cited

U.S. PATENT DOCUMENTS

| 1,716,049 A | 6/1929 | Greve |
| 1,726,633 A | 9/1929 | Smith |

(Continued)

FOREIGN PATENT DOCUMENTS

| AU | 9609498 | 7/1999 |
| AU | 737970 | 9/2001 |

(Continued)

OTHER PUBLICATIONS

US 11,555,493 B2, 01/2023, Chang et al. (withdrawn)
(Continued)

*Primary Examiner* — Kevin F Murphy
(74) *Attorney, Agent, or Firm* — Norton Rose Fulbright US LLP

(57) ABSTRACT

An example fluid manifold, for a fracturing system, includes one or more spool sections and a flow passage at least partially defined by the spool sections that extends along a longitudinal axis. In addition, the manifold includes a first flow altering assembly positioned along the flow passage and including a diverter surface positioned to divert fluid radially away from the axis. Further, the manifold includes a second flow altering assembly positioned along the flow passage and spaced from the first flow altering assembly. The second flow altering assembly includes an annular flange and a flow altering tube extending axially from the annular flange such that the annular flange and the flow altering tube define an annular cavity that extends radially between the flow altering tube and an inner wall of the flow passage and that extends axially along the flow altering tube to the annular flange.

9 Claims, 21 Drawing Sheets

(58) Field of Classification Search
USPC .................................................. 138/40, 44
See application file for complete search history.

(56) References Cited

U.S. PATENT DOCUMENTS

| | | | |
|---|---|---|---|
| 2,178,662 A | 11/1939 | Lars | |
| 2,427,638 A | 9/1947 | Vilter | |
| 2,498,229 A | 2/1950 | Adler | |
| 2,535,703 A | 12/1950 | Smith et al. | |
| 2,572,711 A | 10/1951 | Fischer | |
| 2,820,341 A | 1/1958 | Amann | |
| 2,868,004 A | 1/1959 | Runde | |
| 2,912,821 A * | 11/1959 | Horak | F02K 7/04 |
| | | | 138/40 |
| 2,940,377 A | 6/1960 | Darnell et al. | |
| 2,947,141 A | 8/1960 | Russ | |
| 2,956,738 A | 10/1960 | Rosenschold | |
| 3,068,796 A | 12/1962 | Pfluger et al. | |
| 3,109,459 A * | 11/1963 | Lee, II | F15B 21/00 |
| | | | 138/40 |
| 3,191,517 A | 6/1965 | Solzman | |
| 3,257,031 A | 6/1966 | Dietz | |
| 3,274,768 A | 9/1966 | Klein | |
| 3,378,074 A | 4/1968 | Kiel | |
| 3,382,671 A | 5/1968 | Ehni, III | |
| 3,401,873 A | 9/1968 | Privon | |
| 3,463,612 A | 8/1969 | Whitsel | |
| 3,496,880 A | 2/1970 | Wolff | |
| 3,545,492 A * | 12/1970 | Scheid, Jr. | F16L 55/02718 |
| | | | 138/44 |
| 3,550,696 A | 12/1970 | Kenneday | |
| 3,560,053 A | 2/1971 | Ortloff | |
| 3,586,459 A | 6/1971 | Zerlauth | |
| 3,632,222 A | 1/1972 | Cronstedt | |
| 3,656,582 A | 4/1972 | Alcock | |
| 3,667,868 A | 6/1972 | Brunner | |
| 3,692,434 A | 9/1972 | Schnear | |
| 3,739,872 A | 6/1973 | McNair | |
| 3,757,581 A | 9/1973 | Mankin | |
| 3,759,063 A | 9/1973 | Bendall | |
| 3,765,173 A | 10/1973 | Harris | |
| 3,771,916 A | 11/1973 | Flanigan et al. | |
| 3,773,438 A | 11/1973 | Hall et al. | |
| 3,781,135 A | 12/1973 | Nickell | |
| 3,786,835 A | 1/1974 | Finger | |
| 3,791,682 A | 2/1974 | Mitchell | |
| 3,796,045 A | 3/1974 | Foster | |
| 3,814,549 A | 6/1974 | Cronstedt | |
| 3,820,922 A | 6/1974 | Buse et al. | |
| 3,847,511 A | 11/1974 | Cole | |
| 3,866,108 A | 2/1975 | Yannone | |
| 3,875,380 A | 4/1975 | Rankin | |
| 3,921,672 A * | 11/1975 | Arnold | F16L 55/00 |
| | | | 138/44 |
| 3,963,372 A | 6/1976 | McLain et al. | |
| 4,010,613 A | 3/1977 | McInerney | |
| 4,019,477 A | 4/1977 | Overton | |
| 4,031,407 A | 6/1977 | Reed | |
| 4,050,862 A | 9/1977 | Buse | |
| 4,059,045 A | 11/1977 | McClain | |
| 4,086,976 A | 5/1978 | Holm et al. | |
| 4,117,342 A | 9/1978 | Melley, Jr. | |
| 4,173,121 A | 11/1979 | Yu | |
| 4,204,808 A | 5/1980 | Reese et al. | |
| 4,209,079 A | 6/1980 | Marchal et al. | |
| 4,209,979 A | 7/1980 | Woodhouse et al. | |
| 4,222,229 A | 9/1980 | Uram | |
| 4,239,396 A | 12/1980 | Arribau et al. | |
| 4,269,569 A | 5/1981 | Hoover | |
| 4,311,395 A | 1/1982 | Douthitt et al. | |
| 4,330,237 A | 5/1982 | Battah | |
| 4,341,508 A | 7/1982 | Rambin, Jr. | |
| 4,357,027 A | 11/1982 | Zeitlow | |
| 4,383,478 A | 5/1983 | Jones | |
| 4,402,504 A | 9/1983 | Christian | |
| 4,430,047 A | 2/1984 | Ilg | |
| 4,442,665 A | 4/1984 | Fick | |
| 4,457,325 A | 7/1984 | Green | |
| 4,470,771 A | 9/1984 | Hall et al. | |
| 4,483,684 A | 11/1984 | Black | |
| 4,505,650 A | 3/1985 | Hannett et al. | |
| 4,516,986 A * | 5/1985 | Jepsen | F22B 37/227 |
| | | | 138/44 |
| 4,574,880 A | 3/1986 | Handke | |
| 4,584,654 A | 4/1986 | Crane | |
| 4,620,330 A | 11/1986 | Izzi, Sr. | |
| 4,672,813 A | 6/1987 | David | |
| 4,754,607 A | 7/1988 | Mackay | |
| 4,782,244 A | 11/1988 | Wakimoto | |
| 4,796,777 A | 1/1989 | Keller | |
| 4,869,209 A | 9/1989 | Young | |
| 4,913,625 A | 4/1990 | Gerlowski | |
| 4,983,259 A | 1/1991 | Duncan | |
| 4,990,058 A | 2/1991 | Eslinger | |
| 5,032,065 A | 7/1991 | Yamamuro | |
| 5,135,361 A | 8/1992 | Dion | |
| 5,167,493 A | 12/1992 | Kobari | |
| 5,245,970 A | 9/1993 | Waszkiewicz et al. | |
| 5,291,842 A | 3/1994 | Sallstrom et al. | |
| 5,326,231 A | 7/1994 | Pandeya | |
| 5,362,219 A | 11/1994 | Paul et al. | |
| 5,511,956 A | 4/1996 | Hasegawa | |
| 5,537,813 A | 7/1996 | Davis et al. | |
| 5,553,514 A | 9/1996 | Walkowc | |
| 5,560,195 A | 10/1996 | Anderson et al. | |
| 5,586,444 A | 12/1996 | Fung | |
| 5,622,245 A | 4/1997 | Reik | |
| 5,626,103 A | 5/1997 | Haws et al. | |
| 5,634,777 A | 6/1997 | Albertin | |
| 5,651,400 A | 7/1997 | Corts et al. | |
| 5,678,460 A | 10/1997 | Walkowc | |
| 5,717,172 A | 2/1998 | Griffin, Jr. et al. | |
| 5,720,598 A | 2/1998 | de Chizzelle | |
| 5,761,084 A | 6/1998 | Edwards | |
| 5,811,676 A | 9/1998 | Spalding et al. | |
| 5,839,888 A | 11/1998 | Harrison | |
| 5,846,062 A | 12/1998 | Yanagisawa et al. | |
| 5,875,744 A | 3/1999 | Vallejos | |
| 5,983,962 A | 11/1999 | Gerardot | |
| 5,992,944 A | 11/1999 | Hara | |
| 6,000,433 A * | 12/1999 | Carroll | B01D 46/10 |
| | | | 138/44 |
| 6,041,856 A | 3/2000 | Thrasher et al. | |
| 6,050,080 A | 4/2000 | Horner | |
| 6,067,962 A | 5/2000 | Bartley et al. | |
| 6,071,188 A | 6/2000 | O'Neill et al. | |
| 6,074,170 A | 6/2000 | Bert et al. | |
| 6,123,751 A | 9/2000 | Nelson et al. | |
| 6,129,335 A | 10/2000 | Yokogi | |
| 6,145,318 A | 11/2000 | Kaplan et al. | |
| 6,230,481 B1 | 5/2001 | Jahr | |
| 6,279,309 B1 | 8/2001 | Lawlor, II et al. | |
| 6,321,860 B1 | 11/2001 | Reddoch | |
| 6,334,746 B1 | 1/2002 | Nguyen et al. | |
| 6,401,472 B2 | 6/2002 | Pollrich | |
| 6,530,224 B1 | 3/2003 | Conchieri | |
| 6,543,395 B2 | 4/2003 | Green | |
| 6,655,922 B1 | 12/2003 | Flek | |
| 6,669,453 B1 | 12/2003 | Breeden | |
| 6,765,304 B2 | 7/2004 | Baten et al. | |
| 6,786,051 B2 | 9/2004 | Kristich et al. | |
| 6,832,900 B2 | 12/2004 | Leu | |
| 6,851,514 B2 | 2/2005 | Han et al. | |
| 6,859,740 B2 | 2/2005 | Stephenson et al. | |
| 6,901,735 B2 | 6/2005 | Lohn | |
| 6,962,057 B2 | 11/2005 | Kurokawa et al. | |
| 7,007,966 B2 | 3/2006 | Campion | |
| 7,047,747 B2 | 5/2006 | Tanaka | |
| 7,065,953 B1 | 6/2006 | Kopko | |
| 7,143,016 B1 | 11/2006 | Discenzo et al. | |
| 7,222,015 B2 | 5/2007 | Davis et al. | |
| 7,281,519 B2 | 10/2007 | Schroeder | |
| 7,388,303 B2 | 6/2008 | Seiver | |
| 7,404,294 B2 | 7/2008 | Sundin | |

(56) References Cited

U.S. PATENT DOCUMENTS

| | | |
|---|---|---|
| 7,442,239 B2 | 10/2008 | Armstrong et al. |
| 7,524,173 B2 | 4/2009 | Cummins |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,574,325 B2 | 8/2009 | Dykstra |
| 7,581,379 B2 | 9/2009 | Yoshida et al. |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,836,949 B2 | 11/2010 | Dykstra |
| 7,841,394 B2 | 11/2010 | McNeel et al. |
| 7,845,413 B2 | 12/2010 | Shampine et al. |
| 7,861,679 B2 | 1/2011 | Lemke et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,955,056 B2 | 6/2011 | Pettersson |
| 7,980,357 B2 | 7/2011 | Edwards |
| 8,056,635 B2 | 11/2011 | Shampine et al. |
| 8,083,504 B2 | 12/2011 | Williams et al. |
| 8,099,942 B2 | 1/2012 | Alexander |
| 8,186,334 B2 | 5/2012 | Doyama |
| 8,196,555 B2 | 6/2012 | Ikeda et al. |
| 8,202,354 B2 | 6/2012 | Iijima |
| 8,316,936 B2 | 11/2012 | Roddy et al. |
| 8,336,631 B2 | 12/2012 | Shampine et al. |
| 8,388,317 B2 | 3/2013 | Sung |
| 8,414,673 B2 | 4/2013 | Raje et al. |
| 8,469,826 B2 | 6/2013 | Brosowske |
| 8,500,215 B2 | 8/2013 | Gastauer |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,641,399 B2 | 2/2014 | Mucibabic |
| 8,656,990 B2 | 2/2014 | Kajaria et al. |
| 8,672,606 B2 | 3/2014 | Glynn et al. |
| 8,707,853 B1 | 4/2014 | Dille et al. |
| 8,708,667 B2 | 4/2014 | Collingborn |
| 8,714,253 B2 | 5/2014 | Sherwood et al. |
| 8,757,918 B2 | 6/2014 | Ramnarain et al. |
| 8,763,583 B2 | 7/2014 | Hofbauer et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,186 B2 | 10/2014 | Shampine et al. |
| 8,851,441 B2 | 10/2014 | Acuna et al. |
| 8,894,356 B2 | 11/2014 | Lafontaine et al. |
| 8,905,056 B2 | 12/2014 | Kendrick |
| 8,950,435 B2 * | 2/2015 | Lin ................ E03C 1/084 137/833 |
| 8,951,019 B2 | 2/2015 | Hains et al. |
| 8,973,560 B2 | 3/2015 | Krug |
| 8,997,904 B2 | 4/2015 | Cryer et al. |
| 9,011,111 B2 | 4/2015 | Lesko |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,097,249 B2 | 8/2015 | Petersen |
| 9,103,193 B2 | 8/2015 | Coli et al. |
| 9,121,257 B2 | 9/2015 | Coli et al. |
| 9,140,110 B2 | 9/2015 | Coli et al. |
| 9,175,810 B2 | 11/2015 | Hains |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,593,710 B2 | 3/2017 | Laimboeck et al. |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,695,808 B2 | 7/2017 | Giessbach et al. |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,845,730 B2 | 12/2017 | Betti et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,871,406 B1 | 1/2018 | Churnock et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |

(56) References Cited

U.S. PATENT DOCUMENTS

| | | |
|---|---|---|
| 10,119,381 B2 | 11/2018 | Oehring et al. |
| 10,125,750 B2 | 11/2018 | Pfaff |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,161,423 B2 | 12/2018 | Rampen |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,662,749 B1 | 5/2020 | Hill et al. |
| 10,703,500 B2 * | 7/2020 | Rhoden .................. F16L 53/32 |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,758,981 B2 * | 9/2020 | Lewis ............... F16L 55/02709 |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,830,225 B2 | 11/2020 | Repaci |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,900,475 B2 | 1/2021 | Weightman et al. |
| 10,907,459 B1 | 2/2021 | Yeung et al. |
| 10,927,774 B2 | 2/2021 | Cai et al. |
| 10,927,802 B2 | 2/2021 | Oehring |
| 10,954,770 B1 | 3/2021 | Yeung et al. |
| 10,954,855 B1 | 3/2021 | Ji et al. |
| 10,961,614 B1 | 3/2021 | Yeung et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,961,995 B2 | 3/2021 | Mayorca |
| 10,892,596 B2 | 4/2021 | Yeung et al. |
| 10,968,837 B1 | 4/2021 | Yeung et al. |
| 10,982,523 B1 | 4/2021 | Hill et al. |
| 10,989,019 B2 | 4/2021 | Cai et al. |
| 10,989,180 B2 | 4/2021 | Yeung et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,015,423 B2 | 5/2021 | Yeung et al. |
| 11,015,536 B2 | 5/2021 | Yeung et al. |
| 11,015,594 B2 | 5/2021 | Yeung et al. |
| 11,022,526 B1 | 6/2021 | Yeung et al. |
| 11,028,677 B1 | 6/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 10,895,202 B1 | 7/2021 | Yeung et al. |
| 11,053,853 B2 | 7/2021 | Li et al. |
| 11,060,455 B1 | 7/2021 | Yeung et al. |
| 11,066,915 B1 | 7/2021 | Yeung et al. |
| 11,068,455 B2 | 7/2021 | Shabi et al. |
| 11,085,281 B1 | 8/2021 | Yeung et al. |
| 11,085,282 B2 | 8/2021 | Mazrooee et al. |
| 11,092,152 B2 | 8/2021 | Yeung et al. |
| 11,098,651 B1 | 8/2021 | Yeung et al. |
| 11,105,250 B1 | 8/2021 | Zhang et al. |
| 11,105,266 B2 | 8/2021 | Zhou et al. |
| 11,109,508 B1 | 8/2021 | Yeung et al. |
| 11,111,768 B1 | 9/2021 | Yeung et al. |
| 11,125,066 B1 | 9/2021 | Yeung et al. |
| 11,125,156 B2 | 9/2021 | Zhang et al. |
| 11,129,295 B1 | 9/2021 | Yeung et al. |
| 11,143,000 B2 | 10/2021 | Li et al. |
| 11,143,005 B2 | 10/2021 | Dusterhoft et al. |
| 11,143,006 B1 | 10/2021 | Zhang et al. |
| 11,149,533 B1 | 10/2021 | Yeung et al. |
| 11,149,726 B1 | 10/2021 | Yeung et al. |
| 11,156,159 B1 | 10/2021 | Yeung et al. |
| 11,168,681 B2 | 11/2021 | Boguski |
| 11,174,716 B1 | 11/2021 | Yeung et al. |
| 11,193,360 B1 | 12/2021 | Yeung et al. |
| 11,193,361 B1 | 12/2021 | Yeung et al. |
| 11,205,880 B1 | 12/2021 | Yeung et al. |
| 11,205,881 B2 | 12/2021 | Yeung et al. |
| 11,208,879 B1 | 12/2021 | Yeung et al. |
| 11,208,953 B1 | 12/2021 | Yeung et al. |
| 11,220,895 B1 | 1/2022 | Yeung et al. |
| 11,236,739 B2 | 2/2022 | Yeung et al. |
| 11,242,737 B2 | 2/2022 | Zhang et al. |
| 11,243,509 B2 | 2/2022 | Cai et al. |
| 11,251,650 B1 | 2/2022 | Liu et al. |
| 11,261,717 B2 | 3/2022 | Yeung et al. |
| 11,268,346 B2 | 3/2022 | Yeung et al. |
| 11,280,266 B2 | 3/2022 | Yeung et al. |
| 11,306,835 B1 | 4/2022 | Dille et al. |
| RE49,083 E | 5/2022 | Case et al. |
| 11,339,638 B1 | 5/2022 | Yeung et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,428,165 B2 | 8/2022 | Yeung et al. |
| 11,441,483 B2 | 9/2022 | Li et al. |
| 11,448,122 B2 | 9/2022 | Feng et al. |
| 11,466,680 B2 | 10/2022 | Yeung et al. |
| 11,480,040 B2 | 10/2022 | Han et al. |
| 11,492,887 B2 | 11/2022 | Cui et al. |
| 11,499,405 B2 | 11/2022 | Zhang et al. |
| 11,506,039 B2 | 11/2022 | Zhang et al. |
| 11,512,570 B2 | 11/2022 | Yeung |
| 11,519,395 B2 | 12/2022 | Zhang et al. |
| 11,519,405 B2 | 12/2022 | Deng et al. |
| 11,530,602 B2 | 12/2022 | Yeung et al. |
| 11,549,349 B2 | 1/2023 | Wang et al. |

(56) References Cited

U.S. PATENT DOCUMENTS

| | | |
|---|---|---|
| 11,555,390 B2 | 1/2023 | Cui et al. |
| 11,555,756 B2 | 1/2023 | Yeung et al. |
| 11,557,887 B2 | 1/2023 | Ji et al. |
| 11,560,779 B2 | 1/2023 | Mao et al. |
| 11,560,845 B2 | 1/2023 | Yeung et al. |
| 11,572,775 B2 | 2/2023 | Mao et al. |
| 11,575,249 B2 | 2/2023 | Ji et al. |
| 11,592,020 B2 | 2/2023 | Chang et al. |
| 11,596,047 B2 | 2/2023 | Liu et al. |
| 11,598,263 B2 | 3/2023 | Yeung et al. |
| 11,603,797 B2 | 3/2023 | Zhang et al. |
| 11,607,982 B2 | 3/2023 | Tian et al. |
| 11,608,726 B2 | 3/2023 | Zhang et al. |
| 11,624,326 B2 | 4/2023 | Yeung et al. |
| 11,629,583 B2 | 4/2023 | Yeung et al. |
| 11,629,589 B2 | 4/2023 | Lin et al. |
| 11,649,766 B1 | 5/2023 | Yeung et al. |
| 11,662,384 B2 | 5/2023 | Liu et al. |
| 11,668,173 B2 | 6/2023 | Zhang et al. |
| 11,668,289 B2 | 6/2023 | Chang et al. |
| 11,677,238 B2 | 6/2023 | Liu et al. |
| 2002/0126922 A1 | 9/2002 | Cheng et al. |
| 2002/0197176 A1 | 12/2002 | Kondo |
| 2003/0031568 A1 | 2/2003 | Stiefel |
| 2003/0061819 A1 | 4/2003 | Kuroki et al. |
| 2003/0161212 A1 | 8/2003 | Neal et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0056081 A1 | 3/2005 | Gocho |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0228225 A1 | 10/2006 | Rogers |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0041848 A1 | 2/2007 | Wood et al. |
| 2007/0066406 A1 | 3/2007 | Keller et al. |
| 2007/0098580 A1 | 5/2007 | Petersen |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0212275 A1 | 9/2008 | Waryck et al. |
| 2008/0229757 A1 | 9/2008 | Alexander et al. |
| 2008/0264625 A1 | 10/2008 | Ochoa |
| 2008/0264649 A1 | 10/2008 | Crawford |
| 2008/0298982 A1 | 12/2008 | Pabst |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2009/0178412 A1 | 7/2009 | Spytek |
| 2009/0212630 A1 | 8/2009 | Flegel et al. |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0041681 A1 | 2/2011 | Duerr |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1 | 7/2011 | Dean |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0023973 A1 | 2/2012 | Mayorca |
| 2012/0048242 A1 | 3/2012 | Sumilla et al. |
| 2012/0085541 A1 | 4/2012 | Love et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324903 A1 | 12/2012 | Dewis et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0134702 A1 | 5/2013 | Boraas et al. |
| 2013/0189915 A1 | 7/2013 | Hazard |
| 2013/0205798 A1 | 8/2013 | Kwok et al. |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0000668 A1 | 1/2014 | Lessard |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0174097 A1 | 6/2014 | Hammer et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1 | 10/2014 | Marette et al. |
| 2015/0027730 A1 | 1/2015 | Hall et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0337730 A1 | 11/2015 | Kupiszewski et al. |

(56) References Cited

U.S. PATENT DOCUMENTS

| | | |
|---|---|---|
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0076447 A1 | 3/2016 | Merlo et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0123185 A1 | 5/2016 | Le Pache et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Guevara |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226842 A1 | 8/2017 | Omont et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0241671 A1 | 8/2017 | Ahmad |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0306936 A1 | 10/2017 | Dole |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0356470 A1 | 12/2017 | Jaffrey |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0088845 A1 | 3/2019 | Sugi et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckles et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |

(56) References Cited

U.S. PATENT DOCUMENTS

| | | |
|---|---|---|
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0109616 A1 | 4/2020 | Oehring et al. |
| 2020/0132058 A1 | 4/2020 | Mollatt |
| 2020/0141219 A1 | 5/2020 | Oehring et al. |
| 2020/0141326 A1 | 5/2020 | Redford et al. |
| 2020/0141907 A1 | 5/2020 | Meck et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0300050 A1 | 9/2020 | Oehring et al. |
| 2020/0309027 A1 | 10/2020 | Rytkonen |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325791 A1 | 10/2020 | Himmelmann |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0355055 A1 | 11/2020 | Dusterhoft et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0386169 A1 | 12/2020 | Hinderliter et al. |
| 2020/0386222 A1 | 12/2020 | Pham et al. |
| 2020/0388140 A1 | 12/2020 | Gomez et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071503 A1 | 3/2021 | Ogg et al. |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0140416 A1 | 5/2021 | Buckley |
| 2021/0148208 A1 | 5/2021 | Thomas et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0190045 A1 | 6/2021 | Zhang et al. |
| 2021/0199110 A1 | 7/2021 | Albert et al. |
| 2021/0222690 A1 | 7/2021 | Beisel |
| 2021/0239112 A1 | 8/2021 | Buckley |
| 2021/0246774 A1 | 8/2021 | Cui et al. |
| 2021/0270261 A1 | 9/2021 | Zhang et al. |
| 2021/0270264 A1 | 9/2021 | Byrne |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0324718 A1 | 10/2021 | Anders |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372394 A1 | 12/2021 | Bagulayan et al. |
| 2021/0372395 A1 | 12/2021 | Li et al. |
| 2021/0376413 A1 | 12/2021 | Asfha |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |

(56) References Cited

U.S. PATENT DOCUMENTS

| | | |
|---|---|---|
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 A1 | 12/2022 | Cui et al. |
| 2022/0389799 A1 | 12/2022 | Mao |
| 2022/0389803 A1 | 12/2022 | Zhang et al. |
| 2022/0389804 A1 | 12/2022 | Cui et al. |
| 2022/0389865 A1 | 12/2022 | Feng et al. |
| 2022/0389867 A1 | 12/2022 | Li et al. |
| 2022/0412196 A1 | 12/2022 | Cui et al. |
| 2022/0412199 A1 | 12/2022 | Mao et al. |
| 2022/0412200 A1 | 12/2022 | Zhang et al. |
| 2022/0412258 A1 | 12/2022 | Li et al. |
| 2022/0412379 A1 | 12/2022 | Wang et al. |
| 2023/0001524 A1 | 1/2023 | Jiang et al. |
| 2023/0003238 A1 | 1/2023 | Du et al. |
| 2023/0015132 A1 | 1/2023 | Feng et al. |
| 2023/0015529 A1 | 1/2023 | Zhang et al. |
| 2023/0015581 A1 | 1/2023 | Ji et al. |
| 2023/0017968 A1 | 1/2023 | Deng et al. |
| 2023/0029574 A1 | 2/2023 | Zhang et al. |
| 2023/0029671 A1 | 2/2023 | Han et al. |
| 2023/0036118 A1 | 2/2023 | Xing et al. |
| 2023/0040970 A1 | 2/2023 | Liu et al. |
| 2023/0042379 A1 | 2/2023 | Zhang et al. |
| 2023/0047033 A1 | 2/2023 | Fu et al. |
| 2023/0048551 A1 | 2/2023 | Feng et al. |
| 2023/0049462 A1 | 2/2023 | Zhang et al. |
| 2023/0064964 A1 | 3/2023 | Wang et al. |
| 2023/0074794 A1 | 3/2023 | Liu et al. |
| 2023/0085124 A1 | 3/2023 | Zhong et al. |
| 2023/0092506 A1 | 3/2023 | Zhong et al. |
| 2023/0092705 A1 | 3/2023 | Liu et al. |
| 2023/0106683 A1 | 4/2023 | Zhang et al. |
| 2023/0107300 A1 | 4/2023 | Huang et al. |
| 2023/0107791 A1 | 4/2023 | Zhang et al. |
| 2023/0109018 A1 | 4/2023 | Du et al. |
| 2023/0116458 A1 | 4/2023 | Liu et al. |
| 2023/0117362 A1 | 4/2023 | Zhang et al. |
| 2023/0119725 A1 | 4/2023 | Wang et al. |
| 2023/0119876 A1 | 4/2023 | Mao et al. |
| 2023/0119896 A1 | 4/2023 | Zhang et al. |
| 2023/0120810 A1 | 4/2023 | Fu et al. |
| 2023/0121251 A1 | 4/2023 | Cui et al. |
| 2023/0124444 A1 | 4/2023 | Chang et al. |
| 2023/0138582 A1 | 5/2023 | Li et al. |
| 2023/0144116 A1 | 5/2023 | Li et al. |
| 2023/0145963 A1 | 5/2023 | Zhang et al. |
| 2023/0151722 A1 | 5/2023 | Cui et al. |
| 2023/0151723 A1 | 5/2023 | Ji et al. |
| 2023/0152793 A1 | 5/2023 | Wang et al. |
| 2023/0160289 A1 | 5/2023 | Cui et al. |
| 2023/0160510 A1 | 5/2023 | Bao et al. |
| 2023/0163580 A1 | 5/2023 | Ji et al. |
| 2023/0167776 A1 | 6/2023 | Cui et al. |

FOREIGN PATENT DOCUMENTS

| | | |
|---|---|---|
| CA | 2043184 | 8/1994 |
| CA | 2829762 | 9/2012 |
| CA | 2737321 | 9/2013 |
| CA | 2876687 A1 | 5/2014 |
| CA | 2693567 | 9/2014 |
| CA | 2964597 | 10/2017 |
| CA | 2876687 C | 4/2019 |
| CA | 3138533 | 11/2020 |
| CA | 2919175 | 3/2021 |
| CN | 2622404 | 6/2004 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 102182904 | 9/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |

(56) References Cited

FOREIGN PATENT DOCUMENTS

| | | | |
|---|---|---|---|
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935216 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |

(56) References Cited

FOREIGN PATENT DOCUMENTS

| | | |
|---|---|---|
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |

(56) References Cited

FOREIGN PATENT DOCUMENTS

| | | |
|---|---|---|
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |

(56) References Cited

FOREIGN PATENT DOCUMENTS

| | | |
|---|---|---|
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102009022859 | 12/2010 |
| DE | 102012018825 | 3/2014 |
| DE | 102013111655 | 12/2014 |
| DE | 102015103872 | 10/2015 |
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | PCT/CN2012/074945 | 11/2013 |
| WO | 2013185399 | 12/2013 |
| WO | 2015158020 | 10/2015 |
| WO | 2016014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2016/186790 | 11/2016 |
| WO | 2017123656 A | 7/2017 |
| WO | 2017146279 | 8/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018/132106 | 7/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021/038604 | 3/2021 |
| WO | 2021041783 | 3/2021 |

OTHER PUBLICATIONS

Rigmaster Machinery Ltd., Model: 2000 RMP-6-PLEX, brochure, downloaded at https://www.rigmastermachinery.com_/files/ugd/431e62_eaecd77c9fe54af8b13d08396072da67.pdf.

De Gevigney et al., "Analysis of no-load dependent power losses in a planetary gear train by using thermal network method", International Gear Conference 2014: Aug. 26-28, 2014, Lyon, pp. 615-624.

Special-Purpose Couplings for Petroleum, Chemical, and Gas Industry Services, API Standard 671 (4th Edition) (2010).

The Application of Flexible Couplings for Turbomachinery, Jon R.Mancuso et al., Proceedings of the EighteenthTurbomachinery Symposium (1989).

Pump Control With Variable Frequency Drives, Kevin Tory, Pumps & Systems: Advances in Motors and Drives, Reprint from Jun. 2008.

Fracture Design and Stimulation, Mike Eberhard, P.E., Wellconstruction & Operations Technical Workshop Insupport of the EPA Hydraulic Fracturing Study, Mar. 10-11, 2011.

General Purpose vs. Special Purpose Couplings, Jon Mancuso, Proceedings of the Twenty-Third TurboMachinerySymposium (1994).

Overview of Industry Guidance/Best Practices on Hydraulic Fracturing (HF), American Petroleum Institute, © 2012.

API Member Companies, American Petroleum Institute, WaybackMachine Capture, https://web.archive.org/web/20130424080625/http://api.org/globalitems/globalheaderpages/membership/api-member-companies, accessed Jan. 4, 2021.

API's Global Industry Services, American Petroleum Institute, © Aug. 2020.

About API, American Petroleum Institute, https://www.api.org/about, accessed Dec. 30, 2021.

About API, American Petroleum Institute, WaybackMachine Capture, https://web.archive.org/web/20110422104346 / http:/api.org/aboutapi/, captured Apr. 22, 2011.

Publications, American Petroleum Institute, WaybackMachine Capture, https://web.archive.org/web/20110427043936 / http://www.api.org:80/Publications/, captured Apr. 27, 2011.

Procedures for Standards Development, American Petroleum Institute, Third Edition (2006).

WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.

2011 Publications and Services, American Petroleum Institute (2011).

Standards, American Petroleum Institute, WaybackMachine Capture, https://web.archive.org/web/20110207195046/ http:/www.api.org/Standards/, captured Feb. 7, 2011; and https://web.archive.org/web/20110204112554/http://global.ihs.com/?RID=API1, captured Feb. 4, 2011.

(56) References Cited

OTHER PUBLICATIONS

IHS Markit Standards Store, https://global.ihs.com/doc_detail.cfm?document_name=API%20STD%20674&item_s_key=00010672#doc-detail-history-anchor, accessed Dec. 30, 2021; and https://global.ihs.com/doc_detail.cfm?&input_doc_number=671&input_doc_title=&document_name=API%20STD%20671&item_s_key=00010669&item_key_date=890331&origin=DSSC, accessed Dec. 30, 2021.
Dziubak, Tadeusz, "Experimental Studies of Dust Suction Irregularity from Multi-Cyclone Dust Collector of Two-Stage Air Filter", Energies 2021, 14, 3577, 28 pages.
ResearchGate, Answer by Byron Woolridge, found at https://www.researchgate.net/post/How_can_we_improve_the_efficiency_of_the_gas_turbine_cycles, Jan. 1, 2013.
Filipovic, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
PLOS One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, Jul. 15, 2017, https://ifsolutions.com/why-modular/.
Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Göteborg, Sweden 2015.
J. Porteiro et al., Feasibility of a new domestic CHP trigeneration with heat pump: II. Availability analysis. Design and development, Applied Thermal Engineering 24 (2004) 1421-1429.
ISM, What is Cracking Pressure, 2019.
Swagelok, The right valve for controlling flow direction? Check, 2016.
Technology.org, Check valves how do they work and what are the main type, 2018.
AFGlobal Corporation, Durastim Hydraulic Fracturing Pump, A Revolutionary Design for Continuous Duty Hydraulic Fracturing, 2018.
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super-power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.

(56) References Cited

OTHER PUBLICATIONS

35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gas field operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PlkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.com/news/oil-gas/a/124883/Turbine_Technology_Powers_Green_Field_MultiFuel_Frack_Pump.
"Turbine Frac Units," WMD Squared (2012), https://wmdsquared.com/work/gfes-turbine-frac-units/.
Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.
"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.
Final written decision of PGR2021-00102 dated Feb. 6, 2023.
Final written decision of PGR2021-00103 dated Feb. 6, 2023.
Europump and Hydrualic Institute, Variable Speed Pumping: A Guide to Successful Applications, Elsevier Ltd, 2004.
Capstone Turbine Corporation, Capstone Receives Three Megawatt Order from Large Independent Oil & Gas Company in Eagle Ford Shale Play, Dec. 7, 2010.
Wikipedia, Westinghouse Combustion Turbine Systems Division, https://en.wikipedia.org/wiki/Westinghouse_Combustion_Turbine_Systems_Division, circa 1960.
Wikipedia, Union Pacific GTELs, https://en.wikipedia.org/wiki/Union_Pacific_GTELs, circa 1950.
HCI Jet Frac, Screenshots from YouTube, Dec. 11, 2010. https://www.youtube.com/watch?v=6HjXkdbFaFQ.
AFD Petroleum Ltd., Automated Hot Zone, Frac Refueling System, Dec. 2018.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Walzel, Brian, Hart Energy, Oil, Gas Industry Discovers Innovative Solutions to Environmental Concerns, Dec. 10, 2018.
Frac Shack, Bi-Fuel FracFueller brochure, 2011.
Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-injection Stations; American Petroleum Institute; API-63-144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (Solar Division International Harvester Co.), Modern Industrial Gas Turbines for the Oil Field; American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services; SPE-2706 (1969).
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
Kas'yanov et al., Application of gas-turbine engines in pumping units complexes of hydraulic fracturing of oil and gas reservoirs; Exposition Oil & Gas; (Oct. 2012) (published in Russian).
American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.
Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts

(56) References Cited

OTHER PUBLICATIONS

Institute of Technology, Dept. of Civil and Environmental Engineering. Oct. 29, 2013. https://dspace.mit.edu/handle/1721.1/82176.

* cited by examiner

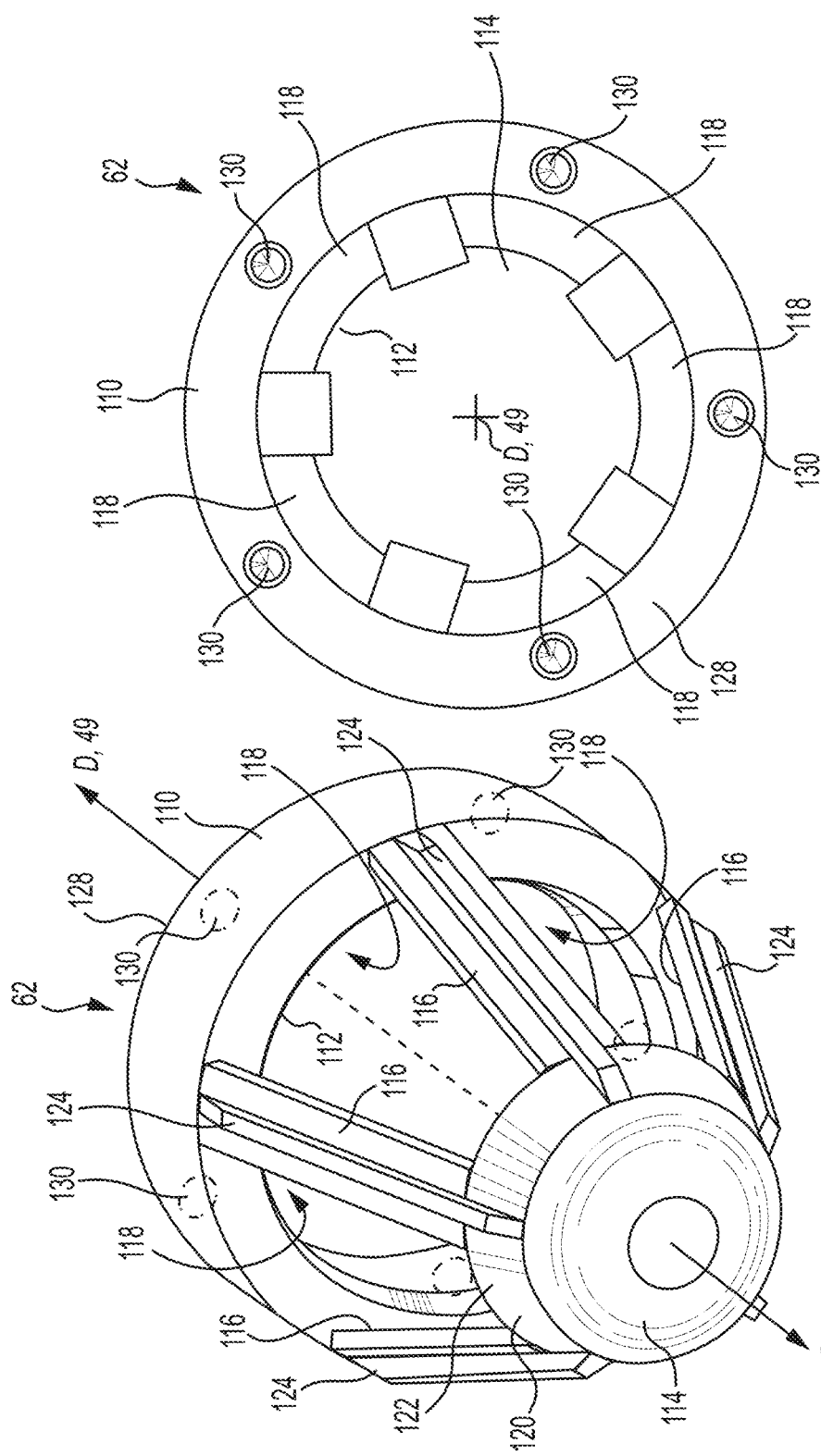

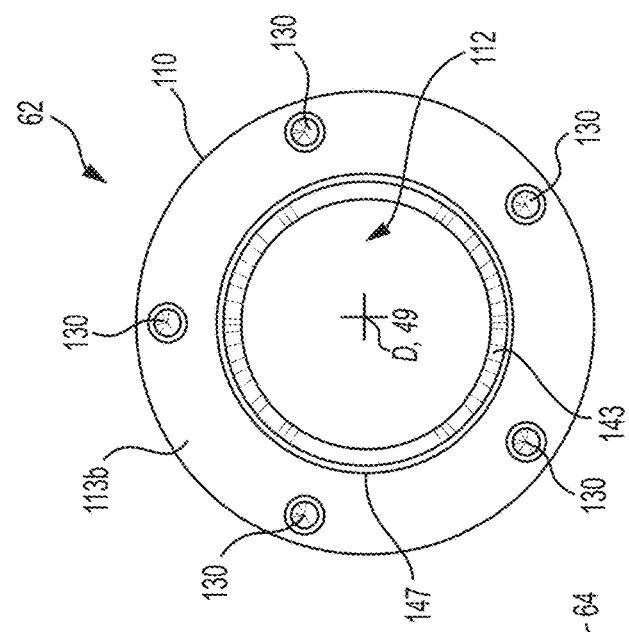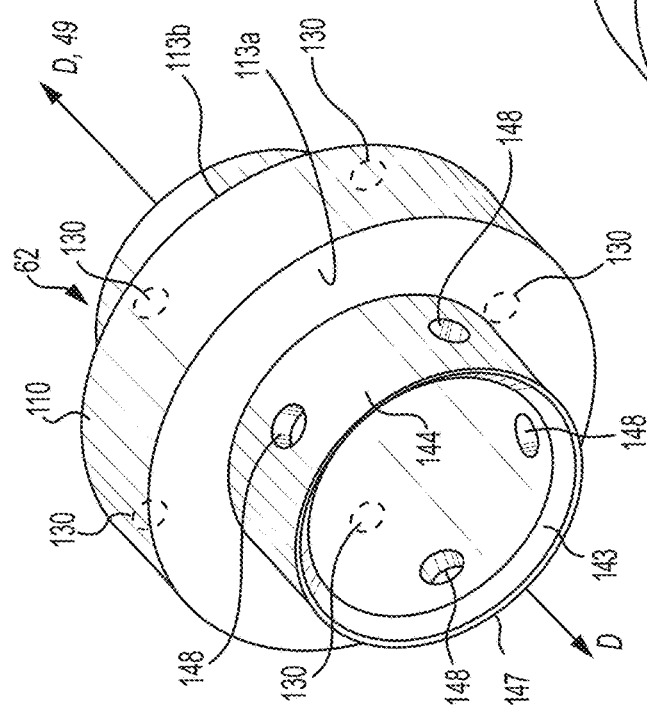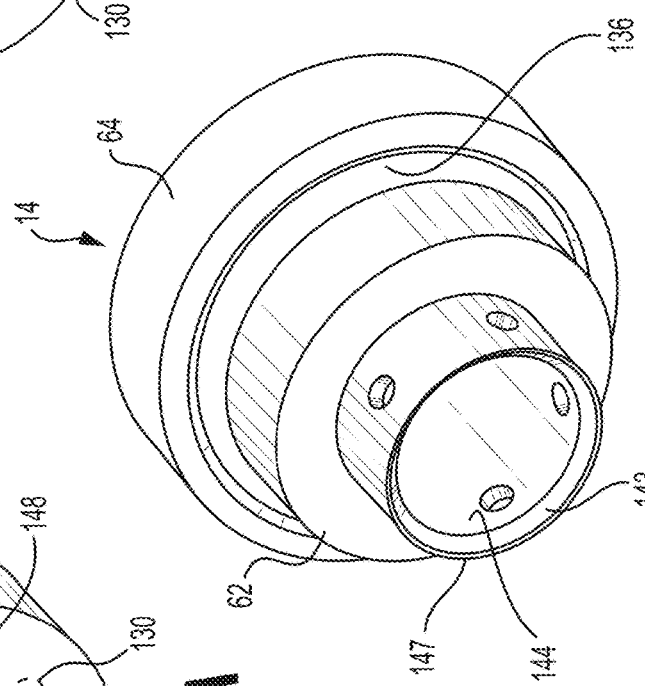

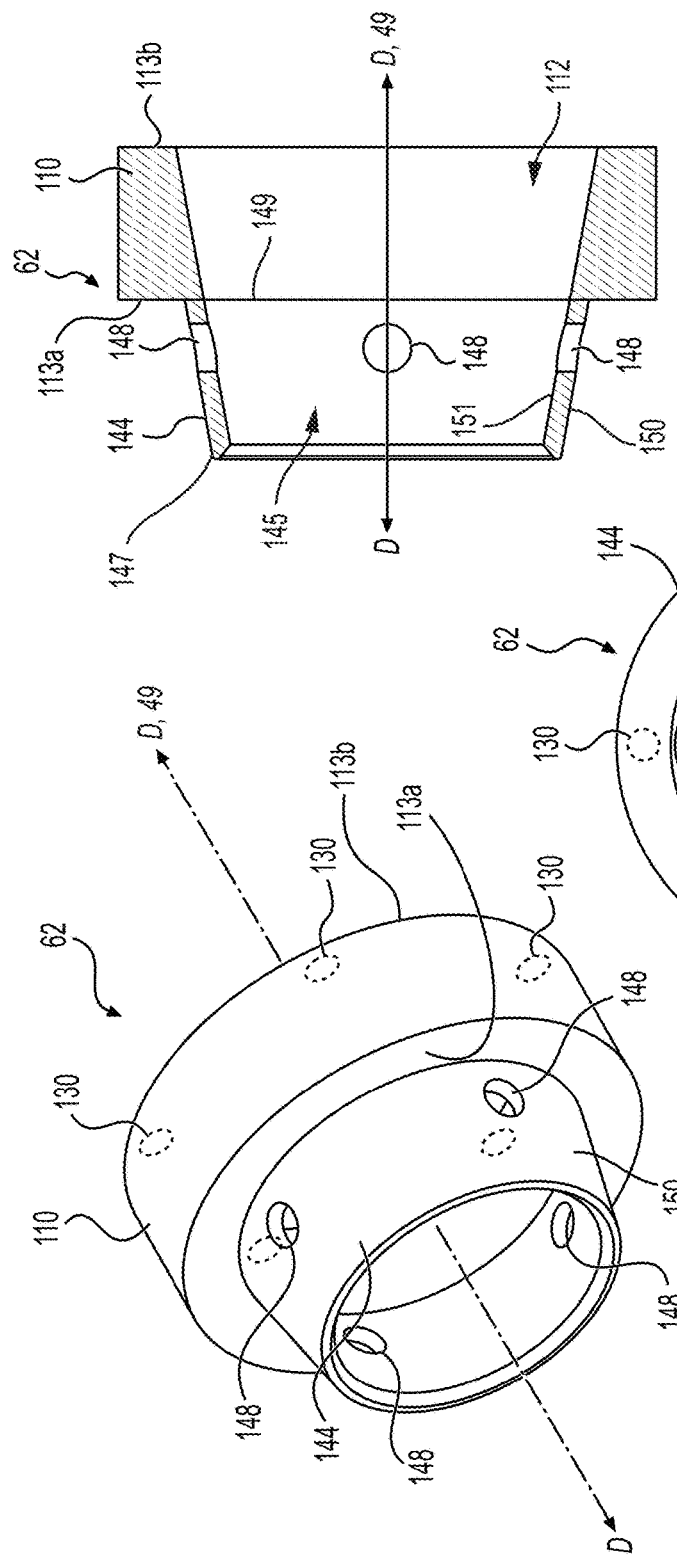
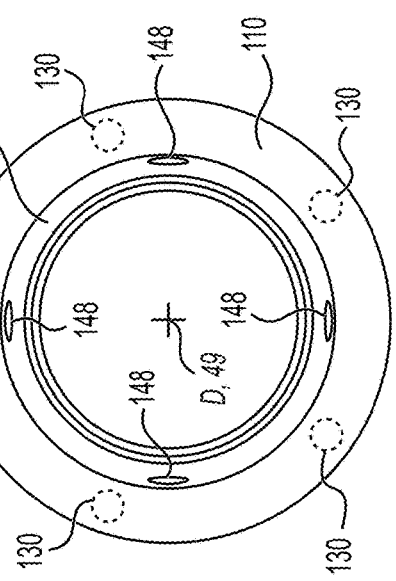
FIG. 15A
FIG. 15B
FIG. 15C

SYSTEMS AND METHODS TO REDUCE ACOUSTIC RESONANCE OR DISRUPT STANDING WAVE FORMATION IN A FLUID MANIFOLD OF A HIGH-PRESSURE FRACTURING SYSTEM

PRIORITY CLAIM

This application claims priority to and the benefit of, U.S. Provisional Application No. 63/262,993, filed Oct. 25, 2021, titled "DEVICES AND METHODS TO PREVENT ACOUSTIC RESONANCE AND/OR DISRUPT FORMATION OF STANDING WAVES IN A FLUID MANIFOLD DURING OPERATION OF A HIGH-PRESSURE FRACTURING SYSTEM," the disclosures of which is incorporated herein by reference in its entirety.

BACKGROUND

The present disclosure relates to devices and methods to reduce vibration in a fluid manifold during operation of a high-pressure fracturing system and, more particularly, to devices and methods to reduce acoustic resonance and/or disrupt formation of standing waves in a fluid manifold during operation of a high-pressure fracturing system.

Hydraulic fracturing is an oilfield operation that stimulates the production of hydrocarbons, such that the hydrocarbons may more easily or readily flow from a subsurface formation to a well. For example, a hydraulic fracturing system may fracture a formation by pumping a fracturing fluid into a well at high pressure and high flow rates. Some fracturing fluids may take the form of a slurry including water, proppants, and/or other additives, such as thickening agents and gels. The slurry may be forced via operation of one or more pumps into the formation at rates faster than can be accepted by the existing pores, fractures, faults, or other spaces within the formation. As a result, pressure builds rapidly to the point where the formation may fail and may begin to fracture. By continuing to pump the fracturing fluid into the formation, existing fractures in the formation may be caused to expand and extend in directions away from a well bore, thereby creating additional flow paths for hydrocarbons to flow to the well bore. The proppants may serve to prevent the expanded fractures from closing or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

To pump the fracturing fluid into the well bore, a hydraulic fracturing system including prime movers may be used to supply power to hydraulic fracturing pumps for pumping the fracturing fluid into the formation. The hydraulic fracturing pumps may output the pressurized fracturing fluid to a high-pressure manifold. Each of the hydraulic fracturing pumps may be positive displacement pumps that include multiple cylinders and corresponding plungers that reciprocate in the respective cylinders to draw fracturing fluid into the cylinder through a one-way valve at low-pressure during an intake stroke and force the fracturing fluid out of the cylinder through a one-way valve into the manifold at a high-pressure and flow rate during an output stroke. Each output stroke forces a charge of the fracturing fluid into the high-pressure manifold, which receives the collective high-pressure and high flow rate fracturing fluid from multiple fracturing pumps for passage to the well bore.

SUMMARY

As referenced above, during operation of a hydraulic fracturing system, pressure pulsations and resonance in the form of standing waves may be generated by operation of the fracturing pumps of the hydraulic fracturing system. The pulsations and standing waves may result in significant vibration in the hydraulic fracturing system that may lead to premature wear or failure of components of the hydraulic fracturing system.

The present disclosure generally is directed to devices and methods to reduce acoustic resonance, disrupt standing wave formation, and/or reduce vibration associated with a fluid manifold during operation of a high-pressure fracturing system. For example, in some embodiments, the devices and methods may result in creating a velocity differential and/or a pressure differential in the flow of fracturing fluid through the fluid manifold. In some embodiments, the devices and methods may result in changing the fundamental or natural frequency of the hydraulic fracturing system to reduce the likelihood that the fracturing system may be operated in a manner to cause the pressure pulsations and/or standing wave resonance to overlap the fundamental or natural frequency. In some embodiments, the devices and methods may result in at least partially reflecting pressure waves back upstream and/or creating a velocity and/or pressure differential in the manifold that reduces the effects of upstream pressure pulsation downstream from the velocity and/or pressure differential. As a result, some embodiments may reduce the likelihood or prevent premature component wear or failure in hydraulic fracturing systems.

Some embodiments disclosed herein are directed to a fluid manifold for a high-pressure fracturing system. In some embodiments, the fluid manifold includes one or more spool sections and a flow passage at least partially defined by the one or more spool sections that extend along a longitudinal axis. In addition, the fluid manifold includes a first flow altering assembly positioned along the flow passage, the first flow altering assembly including a diverter surface positioned to divert fluid flowing within the flow passage radially away from the longitudinal axis. Further, the fluid manifold includes a second flow altering assembly positioned along the flow passage and spaced from the first flow altering assembly along the longitudinal axis. The second flow altering assembly includes an annular flange and a flow altering tube extending axially from the annular flange such that the annular flange and the flow altering tube define an annular cavity that extends radially between the flow altering tube and an inner wall of the flow passage and that extends axially along the flow altering tube to the annular flange.

In some embodiments, the second flow altering assembly is upstream of the first flow altering assembly. In some embodiments, the first flow altering assembly includes a second annular flange and a plurality of supports extending between the second annular flange and the diverter surface, the plurality of supports being circumferentially spaced about the longitudinal axis so as to define a plurality of flow passages circumferentially between the plurality of supports. In some embodiments, the diverter surface is spaced from the second annular flange along the longitudinal axis. In some embodiments, the diverter surface includes a convex curved surface. In some embodiments, the plurality of supports extend radially from the second annular flange and the diverter surface, and the diverter surface. In some embodiments the second flow altering assembly includes a through passage extending axially through the second flow altering assembly and one or more apertures extending radially through the flow altering tube, between the annular cavity and the through passage. In some embodiment, the flow altering tube converges radially inward when moving axially away from the annular flange. In some embodiments, the second flow altering assembly includes a rear flow altering tube extending axially away from the annular flange on an opposite side of the annular flange from the flow altering tube, the rear flow altering tube diverging radially outward when moving axially away from the annular flange.

In some embodiments, a fluid manifold for a high-pressure fracturing system includes a longitudinal axis, a plurality of spool sections axially aligned along the longitudinal axis, and one or more flow cross junctions positioned axially between the plurality of spool sections, each of the one or more flow cross junctions to be fluidly coupled to a corresponding pump of a hydraulic fracturing system. In addition, the fluid manifold includes a flow passage at least partially defined within the plurality of spool sections and the one or more flow cross junctions and extending along the longitudinal axis. Further, the fluid manifold includes a first flow altering assembly positioned along the flow passage, the first flow altering assembly including a diverter surface to divert fluid flowing within the flow passage radially toward an inner wall of the flow passage. Still further, the fluid manifold includes a second flow altering assembly positioned along the flow passage and spaced from the first flow altering assembly along the longitudinal axis. The second flow altering assembly includes an annular flange and a flow altering tube extending axially from the annular flange such that second flow altering device constricts fluid flow through the flow altering tube.

In some embodiments, the second flow altering assembly is upstream of the first flow altering assembly. In some embodiments, the first flow altering assembly includes a second annular flange and a plurality of supports extending between the second annular flange and the diverter surface, the plurality of supports circumferentially spaced about the longitudinal axis to define a plurality of flow passages circumferentially between the plurality of supports. In some embodiments, the diverter surface is spaced from the second annular flange along the longitudinal axis, and the diverter surface includes a convex curved surface. In some embodiments, each of the plurality of supports extends radially from the second annular flange and the diverter surface. In some embodiments, the second flow altering assembly includes a through passage extending axially through the second flow altering assembly and one or more apertures extending radially through the flow altering tube, between the annular cavity and the through passage. In some embodiments, the flow altering tube converges radially inward when moving axially away from the annular flange, and the second flow altering assembly includes a rear flow altering tube extending axially away from the annular flange on an opposite side of the annular flange from the flow altering tube, the rear flow altering tube diverging radially outward when moving axially away from the annular flange.

Some embodiments disclosed herein are directed to one or more methods. In some embodiments, a method includes discharging a fluid from one or more pumps into a fluid manifold of a high-pressure fracturing system and flowing the fluid along a flow passage at least partially defined within the fluid manifold. In addition, the method includes flowing the fluid through a first flow altering assembly positioned along the flow passage and diverting the fluid toward an inner wall of the flow passage with a diverter surface of the first flow altering assembly. Further, the method includes flowing the fluid through a second flow altering assembly positioned along the flow passage and constricting the fluid through a flow altering tube of the second flow altering assembly, the flow altering tube extending axially within the flow passage.

In some embodiments, the method includes flowing the fluid through the first flow altering assembly after flowing the fluid through the second flow altering assembly. In some embodiments, the method includes preventing the fluid from flowing along a continuous axial path along the flow passage from a point upstream of the second flow altering assembly to a point downstream of the first flow altering assembly. In some embodiments, the first flow altering assembly includes a second annular flange and a plurality of supports extending between the second annular flange and the diverter surface, the plurality of supports circumferentially spaced about the longitudinal axis to define a plurality of flow passages circumferentially between the plurality of supports, and the method includes flowing the fluid through the plurality of flow passages after diverting the fluid with the diverter surface.

According to some embodiments, a flow altering device to reduce acoustic resonance, disrupt standing wave formation, and/or reduce vibration associated with a fluid manifold during operation of a high-pressure fracturing system, may include an annular device flange to be positioned at least partially in a manifold bore of a fluid manifold. The annular device flange may define a longitudinal device axis and a longitudinal device passage. The flow altering device also may include a diverter face connected to the annular device flange. The diverter face may present a convex rounded surface to be positioned facing upstream in the manifold bore relative to the annular device flange. The flow altering device further may include a plurality of face supports extending longitudinally between the diverter face and the annular device flange and connecting the diverter face to the annular device flange. The plurality of face supports and the longitudinal device passage may at least partially define a plurality of device flow passages through which to allow fracturing fluid to flow within the manifold bore. The flow altering device may be positioned to cause one or more of a velocity differential or a pressure differential in a flow of fracturing fluid through the fluid manifold.

In some embodiments, the flow altering device includes an intermediate connector connecting the plurality of face supports to the diverter face, the intermediate connector including an outer connector surface defining a truncated cone. In some embodiments, at least one of the plurality of face supports includes a support rib extending longitudinally between the diverter face and the annular device flange. In some embodiments, the diverter face and the plurality face supports form a cone-like profile between outer edges of the diverter face and the annular device flange. In some embodiments, the annular device flange includes an annular face opposite the plurality of face supports, the annular face at least partially defining a plurality of blind holes each configured to receive a fastener therein. Some embodiments may include a device adaptor to position the flow altering device at least partially in the manifold bore, the device adaptor including an adaptor body having a circumferential outer adaptor surface and defining a central adaptor passage and a device recess to receive the annular device flange, such that the longitudinal device passage and the central adaptor passage are substantially aligned. In some embodiments, the adaptor body defines an instrumentation port extending from the central adaptor passage to the outer adaptor surface, the instrumentation port being to receive a sensor configured to generate signals indicative of fluid pressure in the central adaptor passage. In some embodiments, the device recess defines a plurality of holes each for receipt of a fastener configured to connect the flow altering device to the device adaptor. In some embodiments, the adaptor body is to be received between opposing sections of the fluid manifold with the flow altering device at least partially received in the manifold bore. In some embodiments, the adaptor body includes a first radial face and a second radial face opposite the first radial face, one or more of the first radial face or the second radial face defining therein an annular groove to receive a seal to provide a fluid-tight seal between the adaptor body and opposing sections of the fluid manifold at least partially defining the manifold bore.

According to some embodiments, a flow altering device to reduce acoustic resonance, disrupt standing wave formation, and/or reduce vibration associated with a fluid manifold during operation of a high-pressure fracturing system, may include an annular device flange to be positioned in a manifold bore of a fluid manifold. The annular device flange may define a longitudinal device axis, a longitudinal device passage, a first face, and a second face opposite the first face. The flow altering device also may include a front flow altering tube connected to the first face of the annular device flange. The front flow altering tube may be positioned in the manifold bore facing upstream relative to the annular device flange. The front flow altering tube may at least partially define a plurality of pressure relief apertures, and the flow altering device may be positioned to cause one or more of a velocity differential or a pressure differential in a flow of fracturing fluid through the fluid manifold.

In some embodiments, the front flow altering tube includes an outer front tube surface defining a truncated cone-shaped profile. In some embodiments, the flow altering device includes a rear flow altering tube connected to the second face of the annular device flange, the rear flow altering tube to be positioned in the manifold bore facing downstream relative to the manifold bore. In some embodiments, the rear flow altering tube includes an outer rear tube surface defining a truncated cone-shaped profile diverging as the rear flow altering tube extends away from the second face of the annular device flange. Some embodiments include a device adaptor is to position the flow altering device at least partially in the manifold bore. The device adaptor includes an adaptor body having a circumferential outer adaptor surface and defining a central adaptor passage and a device recess receiving the annular device flange, such that the longitudinal device passage and the central adaptor passage are substantially aligned.

According to some embodiments, a flow altering device to reduce acoustic resonance, disrupt standing wave formation, and/or reduce vibration associated with a fluid manifold during operation of a high-pressure fracturing system, may include an annular device flange to be positioned in a manifold bore of a fluid manifold, the annular device flange at least partially defining a longitudinal device axis, a longitudinal device passage, a first face, and a second face opposite the first face. The flow altering device also may include a front flow altering tube connected to the first face of the annular device flange. The front flow altering tube may be positioned in the manifold bore facing upstream relative to the annular device flange. The front flow altering tube may include an outer front tube surface defining a truncated cone-shaped profile, and the flow altering device may be positioned to cause one or more of a velocity differential or a pressure differential in a flow of fracturing fluid through the fluid manifold.

In some embodiments, the front flow altering tube at least partially defines a plurality of pressure relief apertures. In some embodiments, the longitudinal device passage diverges creating an expanding cross-sectional area as the longitudinal device passage extends between the first face and the second face. In some embodiments, the front flow altering tube at least partially defines a tube passage, the tube passage diverging creating an expanding cross-sectional area as the tube passage extends between a tube leading edge and a tube trailing edge at the first face of the annular device flange. In some embodiments, the tube passage at least partially defines a tube exit cross-section at the tube trailing edge, the longitudinal device passage at least partially defines a flange entry cross-section at the first face and a tube exit cross-section at the second face, and the tube exit cross-section and the flange entry cross-section have one or more of a common cross-sectional area or a common cross-sectional shape. In some embodiments, the annular device flange includes a plurality of device bores configured to receive fasteners. Some embodiments include a device adaptor configured to position the flow altering device at least partially in the manifold bore, the device adaptor including an adaptor body having. a circumferential outer adaptor surface and defining a central adaptor passage and a device recess receiving the annular device flange, such that the longitudinal flange passage and the central adaptor passage are substantially aligned According to some embodiments, a flow altering device to reduce acoustic resonance, disrupt standing wave formation, and/or reduce vibration associated with a fluid manifold during operation of a high-pressure fracturing system, may include an annular device flange to be positioned in a manifold bore of a fluid manifold, the annular device flange defining a longitudinal device axis, a first face, and a second face opposite the first face. The flow altering device also may include a diverter face connected to the annular device flange. The diverter face may present a substantially planar surface to be positioned in the manifold bore. The flow altering device further may include a plurality of face supports extending radially between the diverter face and the annular device flange and connecting the diverter face to the annular device flange. The plurality of face supports and the annular device flange may at least partially define a plurality of device flow passages through which to allow fracturing fluid to flow within the manifold bore. The flow altering device may be positioned to cause one or more of a velocity differential or a pressure differential in a flow of fracturing fluid through the fluid manifold.

In some embodiments, the plurality of device flow passages defines a plurality of sector-shaped passages. In some embodiments, the first face at least partially defines a front end of the flow altering device and the second face at least partially defines a rear end of the flow altering device, the front end and the rear end defining the longitudinal extent of the flow altering device. In some embodiments, the annular device flange includes a plurality of device bores configured to receive fasteners.

According to some embodiments, a flow altering assembly may include a flow altering device and a device adaptor that positions the flow altering device at least partially in a manifold bore. The device adaptor may include an adaptor body including a circumferential outer adaptor surface and defining a central adaptor passage and a device recess that receives an annular device flange of the flow altering device, such that a longitudinal device passage and the central adaptor passage are substantially aligned.

According to some embodiments, a fluid manifold assembly to provide a flow passage between a plurality of fracturing pumps and a wellhead to supply fracturing fluid under high pressure to a wellbore during a fracturing operation, may include a plurality of flow iron sections. Each of the plurality of flow iron sections may at least partially define a flow iron passage and may be connected to an output of one of the plurality of fracturing pumps. The fluid manifold assembly also may include a plurality of flow cross junctions. Each of the plurality of flow cross junctions may at least partially define a flow cross passage and a bore segment and may be connected to a remote end of one of the plurality of flow iron sections. The fluid manifold assembly further may include a plurality of spool sections. Each of the plurality of spool sections may at least partially define a manifold bore and may be connected to at least one of the plurality of flow cross junctions, such that the manifold bore and the bore segment at least partially define a bore wall providing a manifold flow passage for fracturing fluid to flow between the plurality of fracturing pumps and the wellhead. The fluid manifold assembly still further may include one or more flow altering devices to reduce acoustic resonance, disrupt standing wave formation, and/or reduce vibration associated with the fluid manifold assembly during operation of a high-pressure fracturing system. Each of the one or more flow altering devices may be positioned at least partially in the manifold flow passage and may include an annular device flange positioned at least partially in the manifold flow passage. The annular device flange may define a longitudinal device axis and one or more device passages. Each of the one or more flow altering devices also may include a diverter face connected to the annular device flange and/or a front flow altering tube connected to the annular device flange. The one or more flow altering devices may be positioned relative to the fluid manifold assembly to cause a velocity differential and/or a pressure differential in a flow of fracturing fluid within the fluid manifold assembly.

In some embodiments, the fluid manifold assembly includes two or more flow altering devices, and at least two of the two or more flow altering devices have the same structure. In some embodiments, the fluid manifold assembly includes two or more flow altering devices, and at least two of the two or more flow altering devices have respective structures that are different.

In some embodiments, the one or more flow altering devices includes one or more of: (1) a flow altering device including: a diverter face connected to the annular device flange, the diverter face presenting a convex rounded surface positioned facing upstream in the manifold flow passage relative to the annular device flange; and a plurality of face supports extending longitudinally between the diverter face and the annular device flange and connecting the diverter face to the annular device flange, the plurality of face supports and the one or more device passages at least partially defining a plurality of device flow passages through which to allow fracturing fluid to flow within the manifold flow passage; (2) a flow altering device including a front flow altering tube connected to the first face of the annular device flange, the front flow altering tube being positioned in the manifold flow passage facing upstream relative to the annular device flange, the front flow altering tube at least partially defining a plurality of pressure relief apertures; (3) a flow altering device including a front flow altering tube connected to the first face of the annular device flange, the front flow altering tube being positioned in the manifold bore facing upstream relative to the annular device flange, the front flow altering tube including an outer front tube surface defining a truncated cone-shaped profile; or (4) a flow altering device including: a diverter face connected to the annular device flange, the diverter face presenting a substantially planar surface being positioned in the manifold flow passage; and a plurality of face supports extending radially between the diverter face and the annular device flange and connecting the diverter face to the annular device flange, the plurality of face supports and the annular device flange at least partially defining a plurality of sector-shaped device flow passages through which to allow fracturing fluid to flow within the manifold bore.

In some embodiment, the one or more flow altering devices includes a diverter face connected to the annular device flange, the diverter face presenting a convex rounded surface positioned in the manifold flow passage facing upstream relative to the annular device flange and diverting flow of the fracturing fluid from a substantially straight flow path to a diverted flow path toward the bore wall. In some embodiments, the one or more flow altering devices includes a front flow altering tube connected to the annular device flange, the front flow altering tube being positioned in the manifold flow passage upstream relative to the annular device flange, and one or more of the annular device flange or the front flow altering tube to one or more of reflect a portion of the fracturing fluid back upstream, cause a velocity differential in the flow of fracturing fluid, or cause a pressure differential in the flow of fracturing fluid as the fracturing fluid flows through the one or more flow altering devices. In some embodiments, the one or more flow altering devices includes a front flow altering tube connected to the first face of the annular device flange, the front flow altering tube being positioned in the manifold flow passage facing upstream relative to the annular device flange, the front flow altering tube at least partially defining an outer front tube surface defining a truncated cone-shaped profile and a plurality of pressure relief apertures. In some embodiments, the one or more flow altering devices includes: a diverter face connected to the annular device flange, the diverter face presenting a substantially planar surface being positioned in the manifold flow passage; and a plurality of face supports extending radially between the diverter face and the annular device flange and connecting the diverter face to the annular device flange, the plurality of face supports and the annular device flange at least partially defining a plurality of sector-shaped device flow passages through which to allow fracturing fluid to flow within the manifold bore. In some embodiment, the one or more flow altering devices include: a first flow altering device positioned in the manifold flow passage at a first manifold location; and a second flow altering device positioned in the manifold flow passage at a second manifold location. Some embodiments include one or more device adaptors connected to one or more of the first flow altering device or the second flow altering device, the one or more device adaptors to position the one or more of the first flow altering device or the second flow altering device at least partially in the manifold flow passage. In some embodiments, one or more of the one or more device adaptors defines an instrumentation port to receive a sensor to generate signals indicative of fluid pressure in the manifold flow passage. Some embodiments include one or more device adaptors connected to one or more of the first flow altering device or the second flow altering device, the one or more device adaptors to position the one or more of the first flow altering device or the second flow altering device at least partially in the manifold flow passage, the one or more device adaptors including an adaptor body having a circumferential outer adaptor surface and defining a central adaptor passage and a device recess receiving the annular device flange of the one or more flow altering devices, such that the one or more device passages and the central adaptor passage are substantially aligned. In some embodiments, the adaptor body is received between opposing sections of the fluid. In some embodiments, the adaptor body includes a first radial face and a second radial face opposite the first radial face, one or more of the first radial face or the second radial face defining therein an annular groove to receive a seal to provide a fluid-tight seal between the adaptor body and opposing sections of the fluid manifold at least partially defining the manifold flow passage.

According to some embodiments, a method to reduce acoustic resonance, disrupt standing wave formation, and/or reduce vibration associated with a flow of fracturing fluid in a fluid manifold assembly during operation of a high-pressure fracturing system including a plurality fracturing pumps pumping fracturing fluid through the fluid manifold assembly, may include positioning one or more flow altering devices in a bore of the fluid manifold to receive a flow therethrough of fracturing fluid of the high-pressure fracturing system. The method also may include altering, via the one or more flow altering devices, a natural frequency of the high-pressure fracturing system, so that the natural frequency is outside a frequency range capable of being output by the plurality of fracturing pumps.

In some embodiments, altering the natural frequency of the high-pressure fracturing system includes decreasing, via the one or more flow altering devices, an effective length of the fluid manifold assembly with respect to pressure standing waves and increasing the natural frequency of the high-pressure fracturing system. In some embodiments, positioning the one or more flow altering devices includes positioning a first flow altering device in the bore of the fluid manifold at a first location, and positioning a second flow altering device in the bore of the fluid manifold assembly at a second position spaced upstream from the first flow altering device. Some embodiments include receiving one or more sensor signals indicative of one or more of flow rate or pressure associated with fluid flowing past the one or more flow altering devices; and controlling, based at least in part on the one or more signals, output of one or more of the plurality fracturing pumps of the high-pressure fracturing system.

Still other aspects and advantages of these exemplary embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

FIG. 6A is a schematic perspective view of an example flow altering device according to embodiments of the disclosure.

FIG. 6B is a schematic end view of the example flow altering device shown in FIG. 6A according to embodiments of the disclosure.

FIG. 10A is a schematic perspective view of another example flow altering device according to embodiments of the disclosure.

FIG. 10B is a schematic end view of the example flow altering device shown in FIG. 10A according to embodiments of the disclosure.

FIG. 11 is a schematic perspective view of another example flow altering assembly including the example flow altering device shown in FIGS. 10A and 10B connected to the example device adaptor shown in FIG. 7 according to embodiments of the disclosure.

FIG. 15A is a schematic perspective view of still another example flow altering device consistent with the example flow altering device of the example flow altering assembly shown in FIG. 14, according to embodiments of the disclosure.

FIG. 15B is a schematic side section view of the example flow altering device shown in FIG. 15A, according to embodiments of the disclosure.

FIG. 15C is a schematic front end view of the example flow altering device shown in FIG. 15A, according to embodiments of the disclosure.

DETAILED DESCRIPTION

Figure 1:
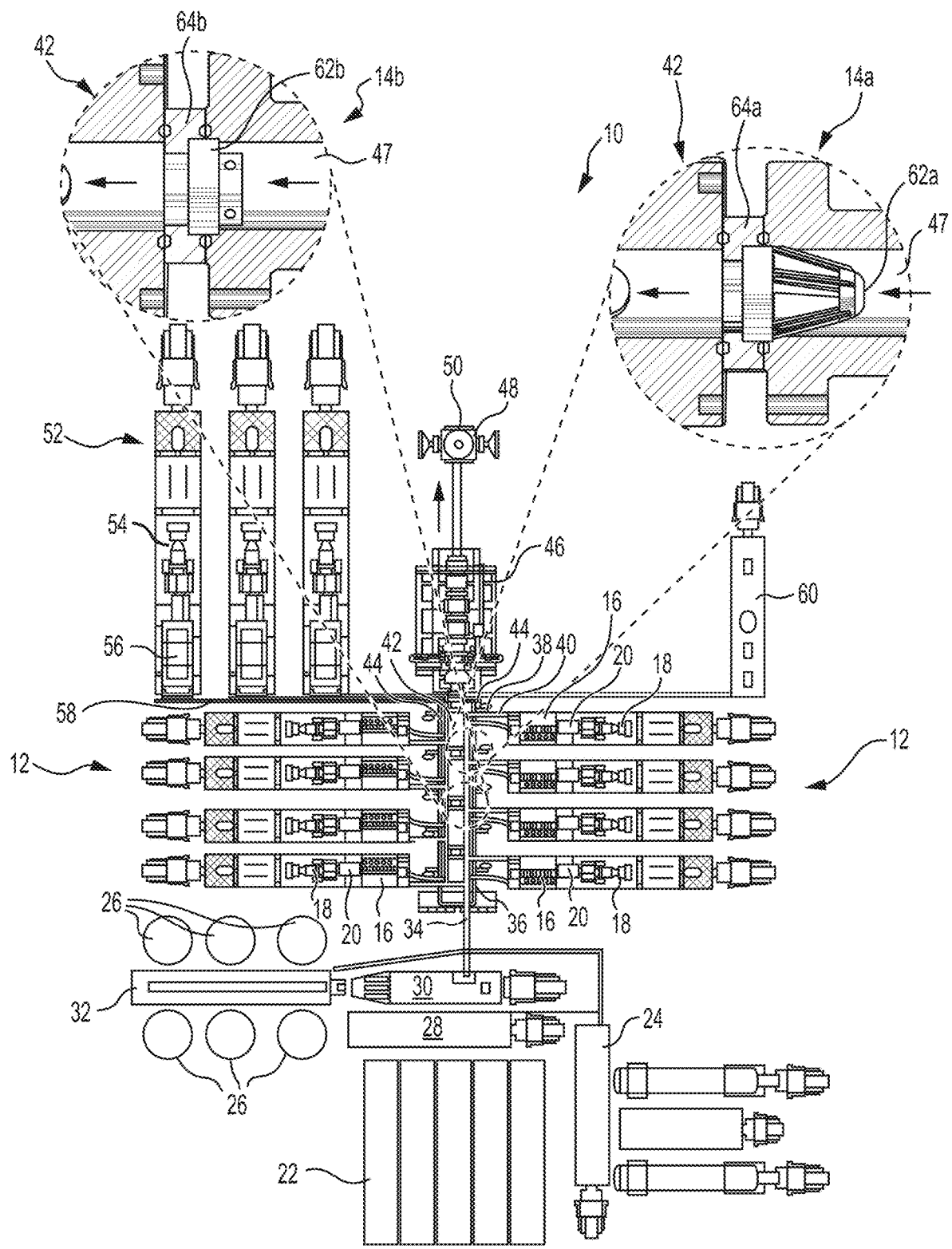
FIG. 1 schematically illustrates an example hydraulic fracturing system including a plurality of hydraulic fracturing units and example flow altering assemblies according to embodiments of the disclosure.

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements. The term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, a hydraulic fracturing system may pump fracturing fluid into a subterranean formation through a high-pressure manifold. Because the hydraulic fracturing system may employ positive displacement pumps as noted above, the fracturing fluid output to the high pressure manifold by the hydraulic fracturing system may flow with pulses of high-pressure and high flow rate. Each pulse may be associated with a corresponding output stroke of one of the plungers of the fracturing pumps operating in the hydraulic fracturing system. As a result, these pulses may result in large pressure oscillations in the high-pressure manifold.

This pressure oscillation is multiplied by the number of cylinders of the fracturing pump, which is further multiplied by the number of fracturing pumps operating during a fracturing operation. Some high-pressure manifolds consolidate all of the fracturing fluid being pumped by all of the fracturing pumps operating during a fracturing operation. Each of the fracturing pumps generates its own respective pressure pulsation waveform varying in amplitude and frequency from the pressure pulsation waveforms generated by operation of other fracturing pumps. While the volume of fracturing fluid in the high-pressure manifold and the geometry of the conduits between each of the fracturing pumps and the high-pressure manifold may result in dissipation of some of the energy associated with the collective pulsation waveforms, the energy associated with the pulsation waveforms may not adequately reduce the energy and may also introduce potential resonance in the form of standing waves inside the high-pressure manifold. This may result in introducing substantial vibration in the fracturing system, including the high-pressure manifold. Such vibration, if uncontrolled, may result in premature wear or failure of components of the fracturing system, including, for example, the high-pressure manifold, conduits between the fracturing pumps and the high-pressure manifold, manifold seals, the fracturing pumps, the prime movers, and transmissions between the prime movers and the fracturing pumps.

Accordingly, Applicant has recognized a need for systems and methods to reduce or control vibration induced during operation of a fracturing system during a fracturing operation. The present disclosure may address one or more of the above-referenced drawbacks, as well as other possible drawbacks.

FIG. 1 schematically illustrates a top view of an example hydraulic fracturing system 10 including a plurality of hydraulic fracturing units 12, including two example flow altering assemblies 14a and 14b, according to embodiments of the disclosure. As explained herein, one or more of the flow altering assemblies 14a or 14b may be cause a velocity differential and/or a pressure differential in a flow of fracturing fluid through a fluid manifold during operation of the hydraulic fracturing system 10, which may be a high-pressure hydraulic fracturing system. The flow altering assemblies 14a and 14b may be used alone or in any combination and, in some embodiments, may prevent acoustic resonance, disrupt standing wave formation, and/or prevent vibration associated with the fluid manifold during operation of the hydraulic fracturing system 10.

In some embodiments, one or more of the hydraulic fracturing units 12 may include a hydraulic fracturing pump 16 driven by a prime mover 18, such as an internal combustion engine. For example, the prime movers 18 may include gas turbine engines (GTEs) or reciprocating-piston engines. In some embodiments, each of the hydraulic fracturing units 12 may include a directly-driven turbine (DDT) hydraulic fracturing pump 16, in which the hydraulic fracturing pump 16 is connected to one or more GTEs that supply power to the respective hydraulic fracturing pump 16 for supplying fracturing fluid at high pressure and high flow rates to a formation. For example, the GTE may be connected to a respective hydraulic fracturing pump 16 via a transmission 20 (e.g., a reduction transmission) connected to a drive shaft, which, in turn, is connected to a driveshaft or input flange of a respective hydraulic fracturing pump 16, which may be a reciprocating hydraulic fracturing pump. Other types of engine-to-pump arrangements are contemplated as will be understood by those skilled in the art.

In some embodiments, one or more of the GTEs may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include gaseous fuels, such as, for example, compressed natural gas (CNG), natural gas, field gas, pipeline gas, methane, propane, butane, and/or liquid fuels, such as, for example, diesel fuel (e.g., #2 diesel), bio-diesel fuel, biofuel, alcohol, gasoline, gasohol, aviation fuel, and other fuels as will be understood by those skilled in the art. Gaseous fuels may be supplied by CNG bulk vessels, a gas compressor, a liquid natural gas vaporizer, line gas, and/or well-gas produced natural gas. Other types and associated fuel supply sources are contemplated. The one or more prime movers 18 may be operated to provide horsepower to drive the transmission 20 connected to one or more of the hydraulic fracturing pumps 16 to safely and successfully fracture a formation during a well stimulation project or fracturing operation.

In some embodiments, the fracturing fluid may include, for example, water, proppants, and/or other additives, such as thickening agents and/or gels. For example, proppants may include grains of sand, ceramic beads or spheres, shells, and/or other particulates, and may be added to the fracturing fluid, along with gelling agents to create a slurry as will be understood by those skilled in the art. The slurry may be forced via the hydraulic fracturing pumps 16 into the formation at rates faster than can be accepted by the existing pores, fractures, faults, or other spaces within the formation. As a result, pressure in the formation may build rapidly to the point where the formation fails and begins to fracture. By continuing to pump the fracturing fluid into the formation, existing fractures in the formation may be caused to expand and extend in directions away from a well bore, thereby creating additional flow paths for hydrocarbons to flow to the well. The proppants may serve to prevent the expanded fractures from closing or may reduce the extent to which the expanded fractures contract when pumping of the fracturing fluid is ceased. Once the well is fractured, large quantities of the injected fracturing fluid may be allowed to flow out of the well, and the water and any proppants not remaining in the expanded fractures may be separated from hydrocarbons produced by the well to protect downstream equipment from damage and corrosion. In some instances, the production stream of hydrocarbons may be processed to neutralize corrosive agents in the production stream resulting from the fracturing process.

In the example shown in FIG. 1, the hydraulic fracturing system 10 may include one or more water tanks 22 for supplying water for fracturing fluid, one or more chemical additive units 24 for supplying gels or agents for adding to the fracturing fluid, and one or more proppant tanks 26 (e.g., sand tanks) for supplying proppants for the fracturing fluid. The example fracturing system 10 shown also includes a hydration unit 28 for mixing water from the water tanks 22 and gels and/or agents from the chemical additive units 24 to form a mixture, for example, gelled water. The example shown also includes a blender 30, which receives the mixture from the hydration unit 28 and proppants via conveyers 32 from the proppant tanks 26. The blender 30 may mix the mixture and the proppants into a slurry to serve as fracturing fluid for the hydraulic fracturing system 10. Once combined, the slurry may be discharged through low-pressure hoses 34, which convey the slurry into two or more low-pressure lines 36 in a fracturing manifold 38. In the example shown, the low-pressure lines 36 in the frac manifold 38 feed the slurry to the hydraulic fracturing pumps 16 through low-pressure suction hoses 40.

Figure 2:
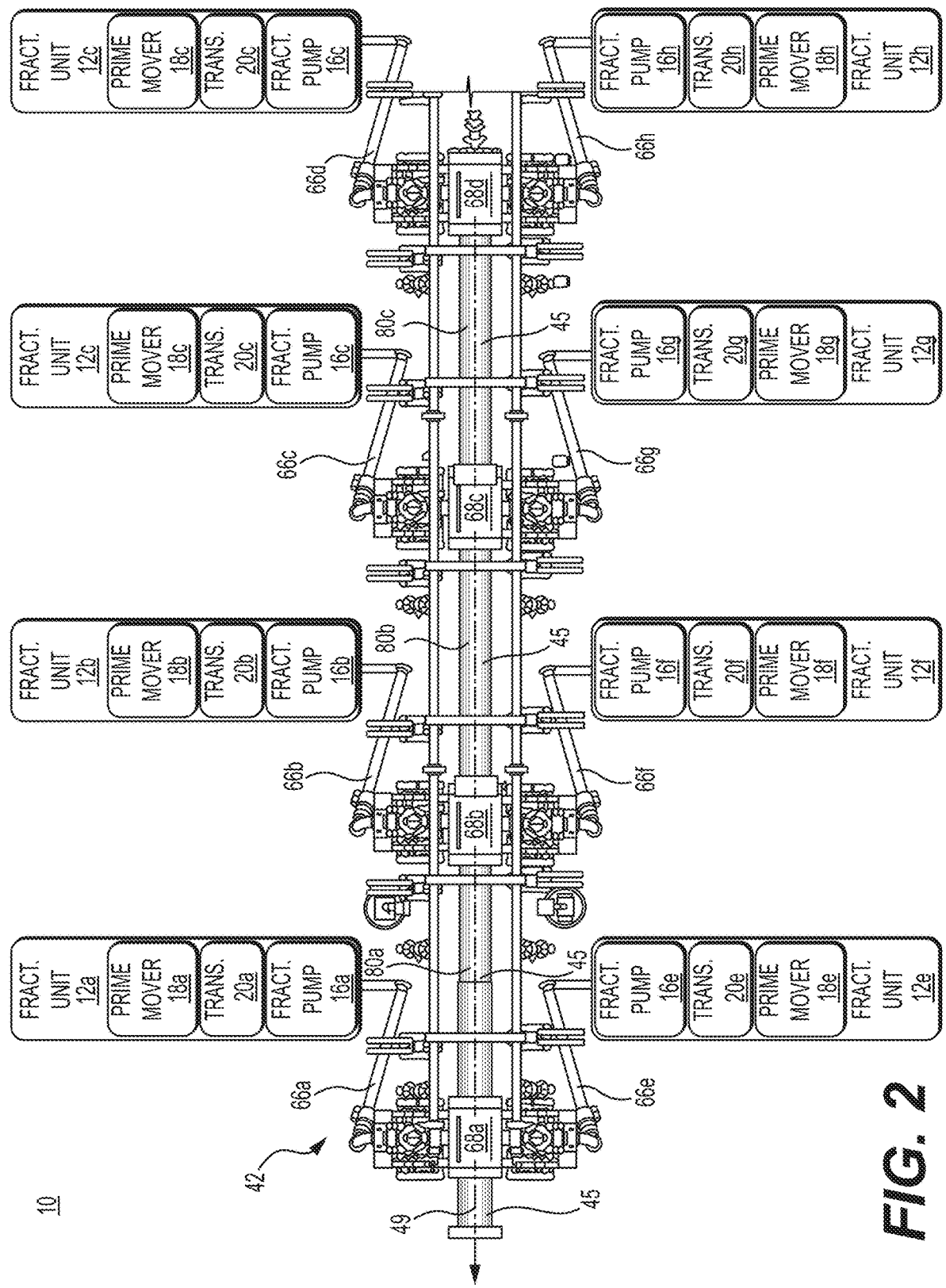
FIG. 2 schematically illustrates a portion of an example high-pressure fluid manifold assembly of an example hydraulic fracturing system according to embodiments of the disclosure.

FIG. 2 schematically illustrates a portion of an example high-pressure fluid manifold assembly 42 of an example hydraulic fracturing system 10 according to embodiments of the disclosure. As shown in FIGS. 1 and 2, the hydraulic fracturing pumps 16a through 16h, driven by the respective prime movers 18*a* through 18*h*, discharge the slurry (e.g., the fracturing fluid, including the water, agents, gels, and/or proppants) at high flow rates and/or high pressures through a high-pressure fluid manifold assembly 42 (FIG. 2), which may include flow iron sections 44 (FIG. 1) and one or more high-pressure fluid manifold sections 45, sometimes referred to as "missiles," on the fracturing manifold 38. The flow from the high-pressure fluid manifold assembly 42 is combined, and one or more of the high-pressure fluid manifold sections 45 provide fluid flow to a collection manifold 46 (FIG. 1), sometimes referred to as a "goat head." The collection manifold 46 delivers the fracturing fluid under high-pressure into a wellhead manifold 48. The wellhead manifold 48 may selectively divert the slurry to, for example, one or more wellheads 50 via operation of one or more valves. Once the fracturing process is ceased or completed, flow returning from the fractured formation discharges into a flowback manifold, and the returned flow may be collected in one or more flowback tanks as will be understood by those skilled in the art.

In some embodiments, the high-pressure fluid manifold assembly 42 may include a fluid manifold such as a monobore manifold, for example, defining a single manifold flow passage 47 through which the fracturing fluid flows under high-pressure between the flow iron sections 44 and the wellhead 50. Thus, in some embodiments, fluid manifold assembly 42 has a longitudinal axis 49 such that the manifold flow passage 47 extends axially along the longitudinal axis 49. In some embodiments, the manifold flow passage 47 may have a circular cross-section and an interior diameter ranging, for example, from about four inches to about twelve inches, from about five inches to about ten inches, or from about six inches to about eight inches (e.g., from about seven inches to about eight inches). In some embodiments, the fluid manifold assembly 42 may handle fracturing fluid flow rates ranging, for example, from about fifty barrels per minute to about two-hundred barrels per minute, from about seventy-five barrels per minute to about one hundred seventy-five barrels per minute, or from about one-hundred barrels per minute to about one hundred-fifty barrels per minute (e.g., about one hundred twenty-five barrels per minute). Other sizes and cross-sectional shapes of manifold flow passages and/or flow rates are contemplated.

As schematically depicted in FIG. 1, one or more of the components of the fracturing system 10 may be portable, so that the hydraulic fracturing system 10 may be transported to a well site, assembled, operated for a temporary period of time, at least partially disassembled, and transported to another location of another well site for use. For example, the components may be carried by trailers and/or incorporated into trucks, so that they may be easily transported between well sites.

As shown in FIG. 1, some embodiments of the hydraulic fracturing system 10 may include one or more electrical power sources 52 that are to supply electrical power for operation of electrically powered components of the hydraulic fracturing system 10. For example, one or more of the electrical power sources 52 may include an internal combustion engine 54 (e.g., a GTE or a reciprocating-piston engine) provided with a source of fuel (e.g., gaseous fuel and/or liquid fuel) that drive a respective electrical power generation device 56 to supply electrical power to the hydraulic fracturing system 10. In some embodiments, one or more of the hydraulic fracturing units 12 may include electrical power generation capability, such as an auxiliary internal combustion engine and an auxiliary electrical power generation device driven by the auxiliary internal combustion engine. As shown is FIG. 1, some embodiments of the hydraulic fracturing system 10 may include electrical power lines 58 for supplying electrical power from the one or more electrical power sources 52 to one or more of the hydraulic fracturing units 12.

Some embodiments also may include a data center 60 to facilitate receipt and transmission of data communications related to operation of one or more of the components of the hydraulic fracturing system 10. Such data communications may be received and/or transmitted via hard-wired communications cables and/or wireless communications, for example, according to known communications protocols. For example, the data center 60 may contain at least some components of a hydraulic fracturing control assembly, such as a supervisory controller that receives signals from components of the hydraulic fracturing system 10 and/or communicate control signals to components of the hydraulic fracturing system 10, for example, to at least partially control operation of one or more components of the hydraulic fracturing system 10, such as, for example, the prime movers 18, the transmissions 20, and/or the hydraulic fracturing pumps 16 of the hydraulic fracturing units 12, the chemical additive units 24, the hydration units 28, the blender 30, the conveyers 32, the frac manifold 38, the high-pressure fluid manifold assembly 42, the wellhead manifold 48, and/or any associated valves, pumps, and/or other components of the hydraulic fracturing system 10.

In some embodiments, each of the hydraulic fracturing pumps 16 may include multiple cylinders and corresponding plungers that reciprocate in the respective cylinders to draw fracturing fluid into the cylinder through a one-way valve at low-pressure during an intake stroke and force the fracturing fluid out of the cylinder at a high-pressure and flow rate during an output stroke through a one-way valve into the high-pressure fluid manifold assembly 42. Each output stroke forces a charge of the fracturing fluid into the high-pressure fluid manifold assembly 42, which receives the collective high-pressure and high flow rate fracturing fluid from multiple hydraulic fracturing pumps 16 of the hydraulic fracturing system 10 for passage to the wellhead 50. Rather than flowing in the high-pressure fluid manifold assembly 42 at a constant pressure and flow rate, the fracturing fluid output by each of the output strokes of a plunger flows with a pulse of high-pressure and high flow rate upon each output stroke of each of the plungers of each of the hydraulic fracturing pumps 16 operating in the hydraulic fracturing system 10. This stroke sequence may result in large pressure oscillations in the high-pressure manifold.

Without wishing to be bound by theory, Applicant has recognized that it may be possible to prevent acoustic resonance and/or disrupt formation of standing waves, for example, by causing a velocity differential and/or a pressure differential associated with the fracturing fluid flowing in the high-pressure fluid manifold assembly 42. Applicant has also recognized that it may be possible to mitigate or eliminate the effects of pressure pulsation and/or standing wave resonance generated during operation of the hydraulic fracturing system 10 by reducing or eliminating instances where the frequency or frequencies of pressure pulsations and/or standing wave resonance generated by operation of the hydraulic fracturing pumps 16 overlap or substantially match the natural frequency of the high-pressure fluid manifold assembly 42. This, in turn, may result in mitigating and/or reducing vibration in the flow iron sections 44 and/or the high-pressure fluid manifold assembly 42, which may reduce the likelihood or eliminate premature wear and/or failure of components of the hydraulic fracturing system 10.

For example, each operating hydraulic fracturing pump 16 may generate a distinct pressure pulsation waveform, which may vary in amplitude and/or frequency. As a result, operation of the multiple hydraulic fracturing pumps 16 may cause a cyclical fluctuation of the respective fluid output pressure pulsations and fluid flows. These pressure pulsations and fluid flows travel downstream into the manifold flow passage 47. In some embodiments, the manifold flow passage 47 may be mono-bore passage. For example, these pressure pulsations may have a relatively low frequency ranging from about five to about twenty-five Hz, depending, for example, on the operating speed of the hydraulic fracturing pump 16 and/or the number of plungers. Some damping of the pressure pulsations may occur, for example, as a result of the volume of fluid within the high-pressure fluid manifold assembly 42 and/or the manifold flow passage 47, which may dissipate some of the energy associated with the pressure pulses. In addition, further dissipation of energy may result from the spacing and orientation of flow cross inlet ports from the pump, mechanical dampening around mono-bore flow cross inlets and spool sections, and specific lengths and material construction that effect acoustic responses of the full system, the spacing and orientation of flow cross inlet ports from the pump, mechanical damping around the mono-bore flow cross inlets and spool sections, and/or the specific lengths and material construction that effect acoustic responses of the system. However, this damping may not be sufficient to significantly reduce energy associated with the pressure pulsations and may, in some instances, introduce potential resonance in the form of standing waves inside the high-pressure fluid manifold assembly 42 and/or the manifold flow passage 47.

A primary cause of failure in high-pressure manifold assemblies is wear and fatigue resulting from mechanical vibration. The reciprocating plungers of the hydraulic fracturing pumps 16 may cause significant instances of pressure pulsation due to the cyclical nature of operation. The pressure pulsation magnitude may be at least partially due to peak-to-peak pressure within the flow iron sections and/or the high-pressure manifold assembly 42. Velocity variation of the fracturing fluid flow from operation of the hydraulic fracturing pumps 16 may result in peak-to-peak hydraulic pressure variations proportional to the velocity variations. The magnitude and frequency of the pressure pulsation in the high-pressure fluid manifold assembly 42 may be influenced by operating pressure, pump crankshaft rotational speed, suction and discharge valve efficiency, and/or the effective fluid end chamber fill volume per plunger stroke. The pressure pulsations may travel through the high-pressure fluid manifold assembly 42 at the speed of sound in the fluid medium (e.g., the fracturing fluid).

Another possible factor that may affect vibration in the high-pressure fluid manifold assembly 42 is the natural frequency of the flow iron sections 44 and/or the high-pressure fluid manifold assembly 42. For example, depending on the individual rates of the hydraulic fracturing pumps 16, pressure standing waves may form in the flow iron sections 44 and/or the high-pressure fluid manifold assembly 42. The fundamental acoustic or natural frequency of the flow iron sections 44 and/or the high-pressure fluid manifold assembly 42 may be based at least in part on the length and modulus of elasticity of the material of the flow iron sections 44 and/or the high-pressure fluid manifold assembly 42, which may have a resonating frequency. When the resonating frequency of the flow iron sections 44 and/or the high-pressure fluid manifold assembly 42 is close to or substantially matches the pressure pulsation frequency generated by operation of the hydraulic fracturing pumps 16, resonance in the system may result. This resonance may cause a significant increase in the mechanical vibration, which may lead to premature wear or failure of the flow iron sections 44, the high-pressure fluid manifold assembly 42, the associated seals, the hydraulic fracturing pumps 16, the transmissions 20, and/or the prime movers 18.

Resonance in the high-pressure manifold assembly 42 may occur at standing quarter waves. A standing wave may occur in the flow iron sections 44 and/or the high-pressure fluid manifold assembly 42, for example, when two pressure waves travel back and forth in opposite directions. Each of the operating hydraulic fracturing pumps 16 may introduce pressure pulsations that develop standing waves in the system.

For the purpose of analysis, the flow iron sections 44 and/or the high-pressure fluid manifold assembly 42 may be modeled as a tube with a closed end. Thus, the resonating frequency fr of the system may be expressed in the following equation:

$$f_r = \frac{nth \text{ harmonic} * \text{Speed of pressure pulsation}}{4 * \text{Length of system}};$$

where the speed of the pressure pulsation equals the speed of sound in the fluid medium, and the length of the system equals the effective length of travel of the pressure pulsation from one end of the system to the opposite end of the system.

This frequency may sometimes be referred to as the "fundamental frequency" or "natural frequency" of the system. Resonance also may occur at certain multiples of the fundamental or natural frequency, which may sometimes be referred to as the "harmonic frequency." In single-end closed systems, these harmonics may occur specifically at every second nth harmonic, for example, such as the third, fifth, seventh, etc., harmonics. For example, if the fundamental frequency of a hydraulic fracturing pump is 20 Hz, resonance may be expected to occur at 60 Hz and 100 Hz. The fundamental frequency of the system may be directly related to the effective length of the flow iron sections 44 and/or the high-pressure fluid manifold assembly 42. By decreasing the effective length of the flow iron sections 44 and/or the high-pressure fluid manifold assembly 42, the fundamental frequency may be increased, for example, being inversely proportional to the effective length.

As shown in FIG. 1, some embodiments of the hydraulic fracturing system 10 may include one or more flow altering assemblies 14 positioned in the manifold flow passage 47 of the high-pressure fluid manifold assembly 42. For example, the embodiment shown in FIG. 1 includes a first flow altering assembly 14a and a second flow altering assembly 14b spaced from the first flow altering assembly 14a along the longitudinal axis 49 (FIG. 2). As shown in FIG. 1, the first flow altering assembly 14a is located downstream in the manifold flow passage 47 relative to the second flow altering assembly 14b. In some embodiments, the second flow altering assembly 14b may be located downstream in the manifold flow passage 47 relative to the first flow altering assembly 14a. Some embodiments may include only a single flow altering assembly 14, and other embodiments may include more than two flow altering assemblies 14. As shown in FIG. 1, the first flow altering assembly 14a may include a first flow altering device 62a and a first device adaptor 64a connected to the first flow altering device 62a, and the second flow altering assembly 14b may include a second flow altering device 62b and a second device adaptor 64b connected to the second flow altering device 62b. Although the first flow altering device 62a and the second flow altering device 62b shown in FIG. 1 differ from one another, in embodiments including more than one flow altering assembly 14, all the flow altering assemblies 14 may have substantially the same configuration, and/or all the flow altering devices 62 may have substantially the same configuration. In some embodiments including more than one flow altering assembly 14, two or more of the flow altering assemblies 14 may have configurations differing from one another. Any combination of flow altering assemblies 14 having the same or different configurations is contemplated. Although each of the embodiments of flow altering assemblies 14 shown in FIG. 1 includes a device adaptor 64, some embodiments of flow altering assembly 14 may not include a device adaptor. Although the device adaptors 64a and 64b shown in FIG. 1 have the same configuration, some embodiments of flow altering assembly may include device adaptors having different configurations.

According to some embodiments, positioning one or more flow altering assemblies 14 and/or one or more flow altering devices 62 in the manifold flow passage 47 of the high-pressure fluid manifold assembly 42 may result in vibration in the flow iron sections 44 and/or the high-pressure fluid manifold assembly 42 being prevented, mitigated, and/or reduced, such that premature wear and/or failure of components of the hydraulic fracturing system 10 due to vibration may be reduced or eliminated. Without wishing to be bound by theory, Applicant has recognized that modifying the effective internal geometry of the manifold flow passage 47 and/or the high-pressure fluid manifold assembly 42 may result in reducing or eliminating instances in which the frequency of pressure pulsations and/or standing wave resonance generated by operation of the hydraulic fracturing pumps 16 overlap or substantially match the natural frequency of the manifold flow passage 47 and/or the high-pressure manifold assembly 42. This may result in deceasing vibration in the manifold flow passage 47, the high-pressure manifold assembly 42, the flow iron sections 44, and/or other components of the hydraulic fracturing system 10. In some embodiments, one or more of the flow altering assemblies 14 and/or one or more of the flow altering devices 62 may effectively act as one or more wave blockers, which may act to change the acoustics of fracturing fluid inside the flow iron sections 44 and/or the high-pressure fluid manifold assembly 42. This may reduce and/or eliminate excitation of mechanical natural vibrating frequencies from fluid dynamics in the flow iron sections 44 and/or the high-pressure fluid manifold assembly 42. In some embodiments, one or more of the flow altering assemblies may prevent acoustic resonance, disrupt standing wave formation, and/or prevent vibration associated with the fluid manifold assembly 42, for example, by causing a velocity differential and/or a pressure differential in the flow of fracturing fluid through the fluid manifold assembly 42 during operation of the hydraulic fracturing system 10.

Without wishing to be bound by theory, Applicant has recognized that each of the hydraulic fracturing pumps 16 may be introducing a standing quarter wave at resonant pump speeds. As a result, there may be a ninety-degree phase difference between pressure and velocity variation in a pressure standing wave. The change in velocity may be zero at ends of the high-pressure manifold assembly 42 and/or the manifold flow passage 47. Positioning one or more of the flow altering assemblies 14 and/or the flow altering devices 62 inside the high-pressure fluid manifold assembly 42 and/or the manifold flow passage 47 may change the velocity variation between the ends (e.g., in the middle) of the high-pressure fluid manifold assembly 42 and/or the manifold flow passage 47. Thus, in some embodiments, the flow altering assembly 14 and/or the flow altering device 62 may act in a manner at least similar to a blank end of the high-pressure fluid manifold assembly 42 and/or the manifold flow passage 47, while continuing to allow fracturing fluid to flow through the flow altering assembly 14 and/or the flow altering device 62. The flow altering assembly 14 and/or the flow altering device 62 may act to decrease the effective length of each section of the high-pressure fluid manifold assembly 42, the manifold flow passage 47, and/or the flow iron sections 44, which may result in increasing, sometimes significantly, the natural frequency of the high-pressure fluid manifold assembly 42 and/or the manifold flow passage 47. In some embodiments, the natural frequency of the high-pressure fluid manifold assembly 42 and/or the manifold flow passage 47 may be increased beyond the potential range of the capabilities of one or more of the hydraulic fracturing pumps 16, thereby reducing or eliminating the chance of operating of the hydraulic fracturing pumps 16 in manner that results in overlapping or substantially matching the natural or fundamental frequency of the system.

In some embodiments, the configuration of the flow altering assembly 14 and/or the flow altering device 62 may serve to reduce the peak-to-peak pressure amplitude of the pressure pulsations. For example, the configuration may serve to disperse the effects of water hammering, for example, thereby dissipating energy in the hydraulic fracturing system 10. This, in turn, may result in reducing wear rates associated with the high-pressure fluid manifold assembly 42, the manifold flow passage 47, and/or the flow iron sections 44, as well as other components of the hydraulic fracturing system 10.

In some embodiments, the one or more flow altering assemblies 14 and/or the one or more flow altering devices 62 may decrease instances of resonance and/or decrease peak-to-peak pressure pulsation in the flow iron sections 44, the high-pressure fluid manifold assembly 42, and/or the manifold flow passage 47, for example, by causing a velocity differential and/or a pressure differential in the flow of fracturing fluid through the fluid manifold assembly 42 during operation of the hydraulic fracturing system 10. This, in turn, may prevent and/or reduce vibration exhibited by the hydraulic fracturing system 10, thereby decreasing the wear rate and/or instances of premature failure of components of the hydraulic fracturing system 10, for example, due to excessive vibration and/or fatigue. This may improve the reliability of the hydraulic fracturing system 10 and/or operational safety.

FIG. 2 schematically illustrates a portion of an example high-pressure fluid manifold assembly 42 of an example hydraulic fracturing system 10 according to embodiments of the disclosure. For example, FIG. 2 schematically shows a plurality of hydraulic fracturing units 12a, 12b, 12c, 12d, 12e, 12f, 12g, and 12h, each including respective hydraulic fracturing pumps 16a through 16h connected to respective prime movers 18a through 18h via respective transmissions 20a through 20h. Although the example shown in FIG. 2 includes eight hydraulic fracturing units 12a through 12h, other numbers of hydraulic fracturing units 12 are contemplated, as will be understood by those skilled in the art.

As shown in FIG. 2, each of the hydraulic fracturing units 12a through 12h may supply fracturing fluid under high pressure and/or high flow rates to the high-pressure fluid manifold assembly 42, which provides a flow passage between the respective hydraulic fracturing pumps 16a through 16h and a wellhead 50 (FIG. 1) to supply the fracturing fluid under high pressure to a wellbore during a fracturing operation. As shown in FIG. 2, each of the respective hydraulic fracturing pumps 16a through 16h may provide a supply of hydraulic fracturing fluid to the high-pressure fluid manifold assembly 42 via a respective flow iron section 66a through 66h. The flow iron sections 66a through 66h may generally correspond to the flow iron sections 44 shown in FIG. 1. For example, each of the flow iron sections 66a through 66h may at least partially define a flow iron passage and may be connected at a first end to an output of a respective one of the hydraulic fracturing pumps 16a through 16h and at an opposite, remote or second end a respective flow cross junction 68a through 68d, with two remote ends of the flow iron sections being connected to each respective flow cross junction 68a through 68d.

Figure 3:
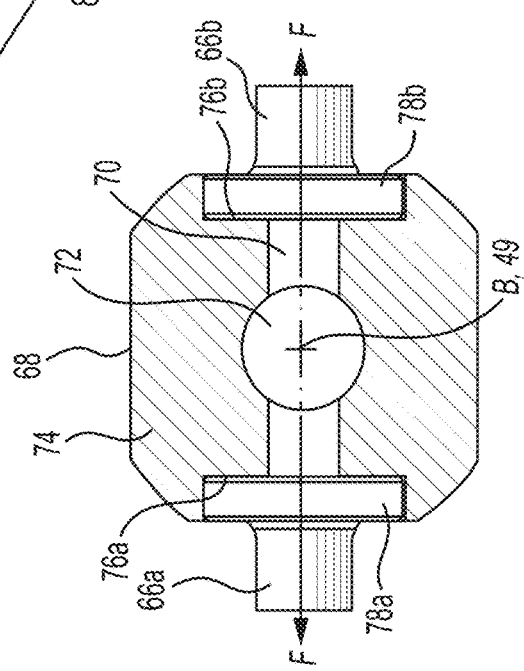
FIG. 3 is a schematic partial section view of an example flow cross junction of an example fluid manifold assembly according to embodiments of the disclosure.

In some embodiments, for example, as schematically shown in FIG. 3, each of the flow cross junctions 68a through 68d may at least partially define a flow cross passage 70 and a bore segment 72, and may be connected to the remote end of a respective one of the flow iron sections 66a through 66h (FIG. 2). As shown in FIG. 3, some embodiments of the flow cross junctions 68a through 68d may include a flow cross body 74, and the flow cross body 74 may define a flow cross passage 70 that passes through the flow cross body 74 along a flow cross longitudinal axis F and a bore segment 72 that passes through the flow cross body along a bore segment longitudinal axis B. In some embodiments, the flow cross longitudinal axis F and the bore segment longitudinal axis B may intersect one another, and in some embodiments, the flow cross longitudinal axis F and the bore segment longitudinal axis B may be substantially perpendicular (or orthogonal) to one another, for example, as shown in FIG. 3. The bore segment longitudinal axis B may be aligned (or coaxial) with the longitudinal axis 49 of fluid manifold assembly 42. In some embodiments of the flow cross junction 68, the flow cross body 74 may also include opposing connection recesses 76a and 76b that are to at least partially receive respective connection flanges 78a and 78b of respective opposing flow iron sections 66a and 66b, for example, as shown in FIG. 3. The respective connection flanges 78a and 78b may be connected to the respective flow cross body 74 via fasteners, such as, for example, bolts, and the respective interface between the respective connection flanges 78a and 78b may be provided with a respective seal to provide a substantially fluid-tight seal.

As shown in FIG. 2, some embodiments of the high-pressure fluid manifold assembly 42 also may include one or more of spool sections 80 (e.g., spool sections 80a, 80b, and 80c) connecting the flow cross junctions 68a through 68d to one another, and at least partially defining a spool bore 82 and being connected to at least one of the flow cross junctions 68a through 68d, such that the spool bore 82 and the respective bore segments 72 of the flow cross junctions 68a through 68d at least partially define a bore wall 84 (see, e.g., FIGS. 4 and 5) at least partially defining a manifold bore 85 providing the manifold flow passage 47 for fracturing fluid to flow between the plurality of fracturing pumps 16a through 16h and the wellhead 50. In some embodiments, the manifold flow passage 47 may be a mono-bore. In some embodiments, the one or more spool sections 80 (e.g., spool sections 80a, 80b, 80c, etc.) are arranged along the longitudinal axis 49, and the flow cross junctions 68a through 68d are positioned (or interleaved) axially between the one or more spool sections 80 (e.g., spool sections 80a, 80b, 80c, etc.) along the longitudinal axis 49.

Figure 4:
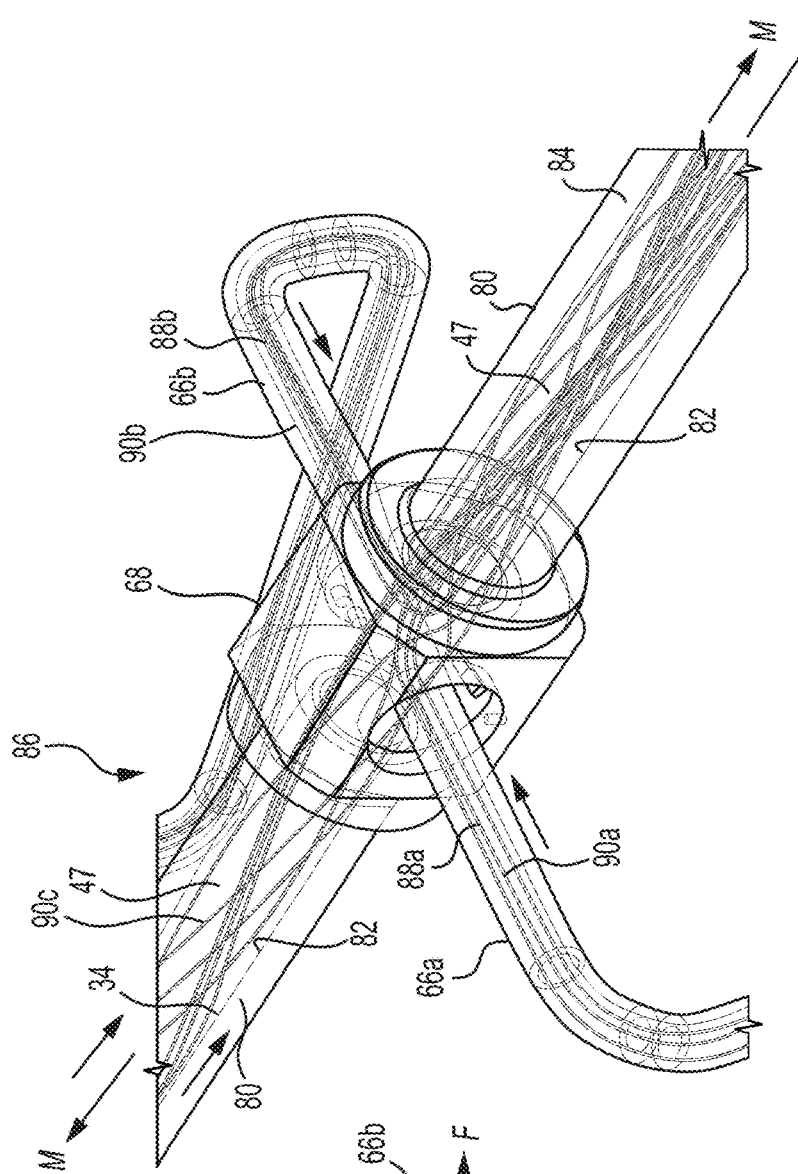
FIG. 4 is a schematic flow diagram showing example flow paths of fracturing fluid from two hydraulic fracturing pumps into an example flow cross junction and into an example manifold flow passage according to embodiments of the disclosure.

FIG. 4 is a schematic flow diagram 86 showing example flow paths 88a and 88b of fracturing fluid 90a and 90b output by two respective hydraulic fracturing pumps 16 (e.g., hydraulic fracturing pumps 16a and 16e shown in FIG. 2) into an example flow cross junction 68 and into an example manifold flow passage 47 according to embodiments of the disclosure. FIG. 4 schematically depicts a three-dimensional computational fluid analysis performed for a mono-bore manifold showing the flow paths 88a and 88b seen from the two respective hydraulic fracturing pumps 16 and the junction of the flow paths 88a and 88b in the flow cross junction 68. In the example analysis performed, the boundary conditions were chosen to represent a specific flow into and out of the example flow cross junction 68 while operating at pressures that may be commonly present in a real-world fracturing operation.

As shown in FIG. 4, entry of the fracturing fluid according modeling of the two flow paths 88a and 88b may cause a disturbance in the fracturing fluid 90c arriving at the flow cross junction 68 from upstream relative to the flow cross junction 68. As schematically shown in FIG. 4, following entry of the fracturing fluid 90a and 90b into the flow cross junction 68, the fluid path 90d downstream of the flow cross junction 68 becomes substantially straight and substantially aligned with a longitudinal manifold axis M of the manifold flow passage 47. As shown in FIG. 4, the collision between fluid pulses from the hydraulic fracturing pumps 16 may serve to reduce the turbulent nature of the fluid flow trajectory. A velocity profile of the consolidated fracturing fluid flow downstream relative to the flow cross junction 68 would be expected to have a relatively higher flow rate at the center of the manifold flow passage 47, with a decreasing relative flow rate approaching the bore wall 84. Such a flow may lead to development of standing waves, and the effective length of the manifold flow passage 47 would be expected to be the entire length of the manifold flow passage 47 from beginning to end where the fracturing fluid exits the manifold flow passage 47 and the high-pressure manifold assembly 42. As a result of the relatively long effective length, the fundamental or natural frequency of the manifold flow passage 47 and/or the high-pressure manifold assembly 42 would be relatively low. Because the fundamental or natural frequency of the manifold flow passage 47 and/or the high-pressure manifold assembly 42 would be expected to be relatively low, the frequency of pressure pulsations generated collectively by operation of the multiple hydraulic fracturing pumps 16 may be capable of overlapping or substantially matching the fundamental or natural frequency of the manifold flow passage 47 and/or the high-pressure manifold assembly 42. When this occurs, the mechanical vibration associated with the high-pressure manifold assembly 42, as well as possibly other components of the hydraulic fracturing system 10, may increase, sometimes drastically, which may lead to premature wear and/or premature failure of one or more components of the hydraulic fracturing system 10, including components of the high-pressure manifold assembly.

Figure 5:
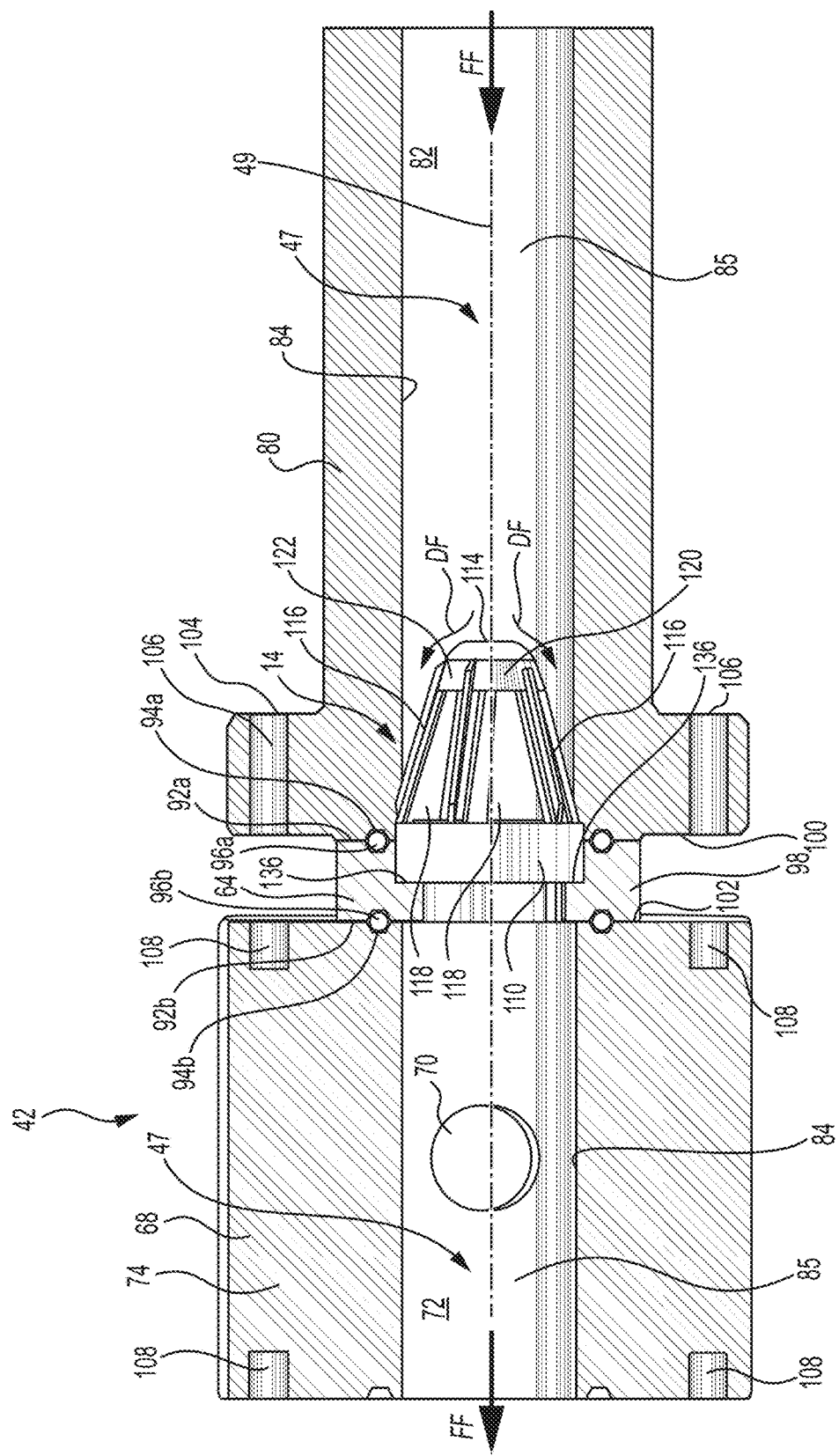
FIG. 5 is a schematic partial section view of an example flow altering assembly positioned in an example high-pressure manifold assembly according to embodiments of the disclosure.

FIG. 5 is a schematic partial section view of an example flow altering assembly 14 positioned in an example high-pressure manifold assembly 42 according to embodiments of the disclosure. As shown in FIG. 5, in some embodiments, the high-pressure manifold assembly 42 may include a flow altering device 62 to reduce effects of pressure pulsations and/or standing wave resonance associated with operation of the multiple hydraulic fracturing pumps 16 during a fracturing operation. The example flow altering assembly 14 shown in FIG. 5 may generally correspond to the first flow altering assembly 14*a* shown in FIG. 1. As shown in FIG. 5, the flow altering assembly 14 may include a flow altering device 62 connected to a device adaptor 64 and positioned longitudinally between a flow cross junction 68 and a spool section 80 of the high-pressure manifold assembly 42. The flow cross junction 68 may define a flow cross passage 70 for receiving the fracturing fluid output of two hydraulic fracturing pumps 16 and a bore segment 72. The bore segment 72 and a spool bore 82 of the spool section 80 collectively partially define a bore wall 84 of the manifold flow passage 47.

As shown in FIG. 5, the device adaptor 64 may include a first radial face 92*a* and a second radial face 92*b* opposite the first radial face 92*a*. Each of the first radial face 92*a* and the second radial face 92*b* may define therein respective first and second annular grooves 94*a* and 94*b* that may receive therein respective first and second annular seals 96*a* and 96*b* (e.g., O-ring seals and/or gaskets) to provide a fluid-tight seal between an adaptor body 98 of the device adaptor 62 and a spool end face 100 of the spool section 80 and/or a junction end face 102 of the flow cross junction 68. As shown in FIG. 5, the spool section 80 may include a spool flange 104 defining one or more fastener bores 106, and the junction end face 102 may include one or more threaded blind fastener holes 108. Fasteners (e.g., bolts, not shown) may be received through the one or more fastener bores 106 and by the one or more blind fastener holes 108 to secure the spool section 80 to the flow cross junction 68. In the embodiment shown, the device adaptor 64 may be positioned between the junction end face 102 and the spool flange 104.

In the embodiment shown in FIG. 5, the fracturing fluid is flowing right-to-left in the direction of arrows FF through the manifold flow passage 47. As shown, the flow altering assembly 14 is positioned upstream relative to the flow cross junction 68 and the flow cross passage 70 of the flow cross body 74.

FIG. 6A is a schematic perspective view of an example flow altering device 62 consistent with the flow altering device 62 shown in FIG. 5, and FIG. 6B is a schematic end view of the example flow altering device shown in FIG. 6A, according to embodiments of the disclosure. As shown in FIGS. 5, 6A, and 6B, the flow altering device 62 may include an annular device flange 110 positioned at least partially in the manifold flow passage 47. The annular device flange 110 may define a longitudinal device axis D and a longitudinal device passage 112 (or "through passage 112") extending axially therethrough. When the flow altering device 62 is installed within the manifold flow passage 47, the longitudinal device axis D may be aligned with the longitudinal axis 49 (FIG. 5). In some embodiments, the device flange 110 may have an outer circumferential diameter sized to fit within the bore wall 84 of the spool section 80. In some embodiments, the device flange 110 may have an outer circumferential diameter slightly larger than the bore wall 84 of the spool section 80. In some such embodiments, the device flange 110 may serve a function similar to the device adaptor 64, for example, for connecting the flow altering device 62 between the flow cross junction 68 and the spool section 80. In some such embodiments, the device flange 110 may at least partially define annular grooves for receiving seals, for example, in a manner at least similar to the annular grooves 94*a* and 94*b* of the device adaptor 64.

As shown in FIGS. 5, 6A, and 6B, some embodiments of the flow altering device 62 may include a diverter face 114 connected to the annular device flange 110 that is to divert flow of the fracturing fluid from a substantially straight flow path to a diverted flow path toward the bore wall 84. For example, as shown in FIG. 5, the diverter face 114 may present a convex curved (e.g., rounded) surface to be positioned facing upstream in the manifold flow passage 47 relative to the annular device flange 110 and the fluid flow FF. As noted above, the velocity profile of the fluid flow FF is such that the velocity of fluid in the central portion of the manifold flow passage 47 is relatively faster than the velocity of the fluid near the bore wall 84. The flow altering device shown in FIG. 5 is positioned such that the diverter face 114 is located in the central portion of the manifold flow passage 47, and thus, the flow of fluid having the relatively faster velocity in the central portion contacts the diverter face 114 and is diverted radially outward from the longitudinal axis 49, for example, as shown in FIG. 5 by arrows DF. The diverter face 114 may also be referred to herein as a "diverter surface." Thus, the diverter face 114 (or diverter surface 114) is to divert fluid flowing along the manifold flow passage 47 toward an inner wall of the flow passage 47 (e.g., bore wall 84 of the corresponding spool section 80).

As shown in FIGS. 5, 6A, and 6B, some embodiments of the flow altering device 62 may include a plurality of face supports 116 extending longitudinally between the diverter face 114 and the annular device flange 110 and connecting the diverter face 114 to the annular device flange 110. Thus, the diverter face 114 may be spaced from the annular flange 110 along the axis D (and thus also the longitudinal axis 49) via the plurality of face supports 116. In some embodiments, the face supports 116 may be circumferentially spaced from one another about the axis D (and thus also the longitudinal axis 49) so as to at least partially define a plurality of device flow passages 118 circumferentially between the plurality of face supports 116. The flow passages 118 may allow fracturing fluid to enter the longitudinal flow passage 112 such that the fracturing fluid is able flow through the flow altering device 62 within the manifold flow passage 47 during operation. In some embodiments, the fracturing fluid may be diverted by the diverter face 114 from the central portion of the manifold flow passage 47 toward the bore wall 84 and through the device flow passages 118. In this example manner, the flow altering device 62 may be dissipate energy associated with a pressure change in the manifold bore 85 or interrupt standing waves in the manifold bore 85.

As shown in FIGS. 5, 6A, and 6B, some embodiments of the flow altering device 62 may include an intermediate connector 120 connecting the face supports 116 to the diverter face 114. In some embodiments, the intermediate connector 120 may include an outer connector surface 122 defining a truncated cone. The outer connector surface 122 may provide a transition zone between the convex rounded surface of the diverter face 114 and the device flow passages 118 as the fracturing fluid diverts around the diverter face 114 and through the device flow passages 118. In some embodiments, one or more of face supports 116 may include a support rib 124 (FIG. 6A) extending longitudinally between the diverter face 114 and the annular device flange 110, for example, as shown in FIG. 6A. The support ribs 124 may reinforce the face supports 116 and/or assist with separation of the flow of the fracturing fluid into the device flow passages 118. An outer diameter of the annular flange 110 may be greater than a maximum outer diameter of the diverter face 114. Thus, the face supports 116 and support ribs 124 may diverge radially away from the longitudinal device axis D (and thus also the longitudinal axis 49) while moving axially from diverter face 114 to annular flange device 110.

As shown in FIGS. 5 and 6A, in some embodiments, the diverter face 114 and the face supports 116 form a conical (or cone-like) profile between outer edges of the diverter face 114 and an outer circumferential edge 126 of the annular device flange 110. This may assist with diverting the flow of the fracturing fluid outward toward the bore wall 84. In some embodiments, such a configuration may cause a velocity differential and/or a pressure differential in the flow of fracturing fluid through the manifold flow passage 47 during operation of the hydraulic fracturing system 10, which, in turn, may prevent acoustic resonance, disrupt standing wave formation, and/or prevent vibration associated with the high-pressure manifold assembly 42.

As shown in FIGS. 6A and 6B, in some embodiments of the flow altering device 62 the annular device flange 110 may include an annular face 128 opposite the face supports 116. The annular face 128 may at least partially define a plurality of blind holes 130, that are to receive a fastener therein. For example, in some embodiments, the flow altering device 62 may be connected to a device adaptor 64, for example, as shown in FIG. 5 and explained in more detail with respect to FIGS. 7 and 8.

Figure 8:
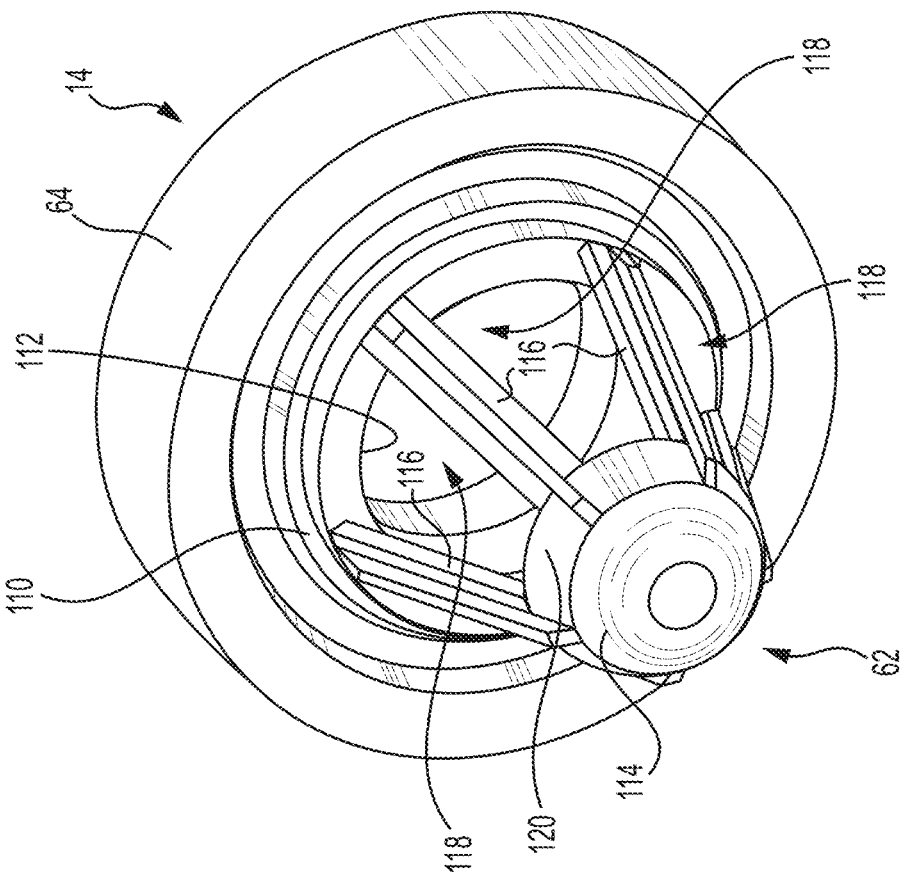
FIG. 8 is a schematic perspective view of an example flow altering assembly including the example flow altering device shown in FIGS. 6A and 6B connected to the example device adaptor shown in FIG. 7, according to embodiments of the disclosure.
Figure 7:
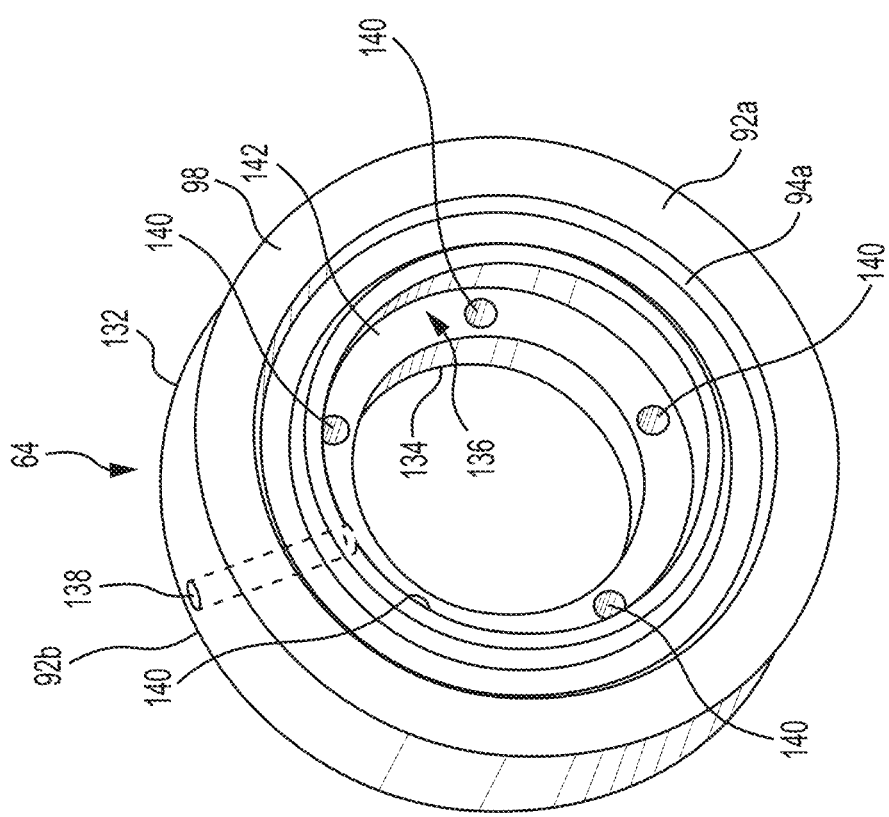
FIG. 7 is a schematic perspective view of an example device adaptor according to embodiments of the disclosure.

FIG. 7 is a schematic perspective view of an example device adaptor 64 according to embodiments of the disclosure, and FIG. 8 is a schematic perspective view of an example flow altering assembly 14 including an example flow altering device 62 consistent with the flow altering device 62 shown in FIGS. 6A and 6B connected to the device adaptor 64 shown in FIG. 7, according to embodiments of the disclosure. For example, the device adaptor 64 may position the flow altering device 62 at least partially in the manifold bore 85 as shown in FIG. 5, and the device adaptor 64 may include an adaptor body 98 including a circumferential outer adaptor surface 132 and defining a central adaptor passage 134 through which fracturing fluid may flow. As shown in FIGS. 7 and 8, some embodiments of the adaptor body 98 may at least partially define a device recess 136 that is to receive the annular device flange 110 of the flow altering device 62, such that the longitudinal device passage 112 and the central adaptor passage 134 are substantially aligned. The device adaptor 64, in some embodiments, may facilitate removal and replacement of the flow altering device 62, for example, with a flow altering device having substantially the same configuration as the removed flow altering device or an alternative configuration.

As shown in FIG. 7, in some embodiments of the device adaptor 64, the adaptor body 98 at least partially defines an instrumentation port 138 extending from the central adaptor passage 134 to the outer adaptor surface 132. The instrumentation port 138 may receive a sensor that is to generate signals indicative of fluid pressure in the central adaptor passage 134, which may be used as explained herein.

As shown in FIG. 7, in some embodiments of the device adaptor 64, the device recess 136 may define a plurality of adaptor holes 140, each to receive a fastener (e.g., a bolt) to connect the flow altering device 62 to the device adaptor 64. For example, the device recess 136 may at least partially define a radially extending face 142, and the adaptor holes 140 may be in the radially extending face 142, for example, as shown in FIG. 7.

Figure 9:
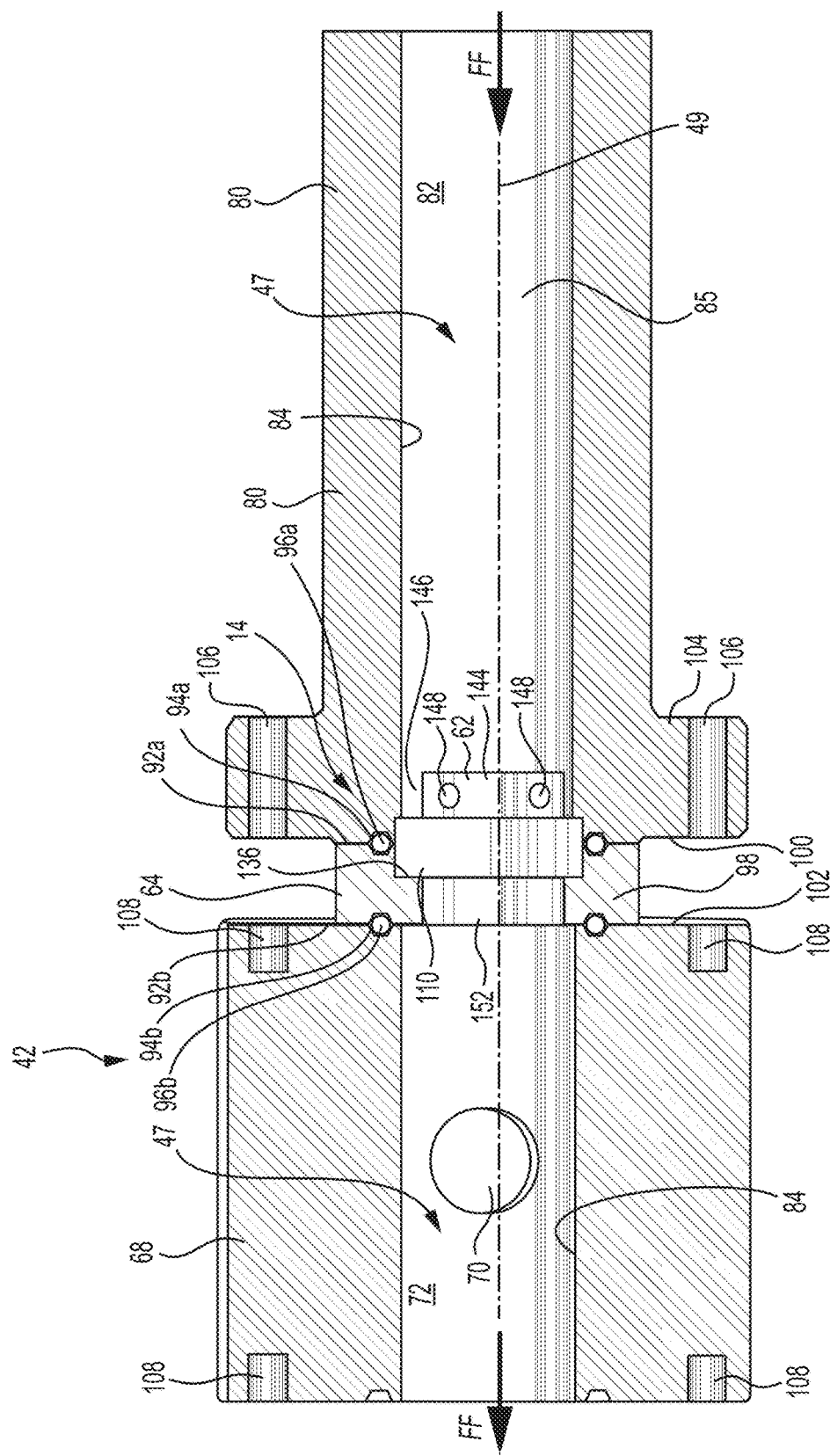
FIG. 9 is a schematic partial section view of another example flow altering assembly positioned in an example high-pressure manifold assembly according to embodiments of the disclosure.

FIG. 9 is schematic partial section view of another example flow altering assembly 14 positioned in an example high-pressure manifold assembly 42 according to embodiments of the disclosure. The flow altering device 62 shown in FIG. 9 may reduce the effects of pressure pulsations and/or standing wave resonance associated with operation of the multiple hydraulic fracturing pumps 16 during a fracturing operation. The example flow altering assembly 14 shown in FIG. 9 may generally correspond to the second flow altering assembly 14b shown in FIG. 1. As shown in FIG. 9, the flow altering device 62 may be connected to a device adaptor 64 and positioned longitudinally between a flow cross junction 68 and a spool section 80 of the high-pressure manifold assembly 42. The flow cross junction 68 may define a flow cross passage 70 for receiving the fracturing fluid output of two hydraulic fracturing pumps 16 and a bore segment 72. The bore segment 72 and a spool bore 82 of the spool section 80 may collectively at least partially define a bore wall 84 of the manifold flow passage 47. As shown in FIG. 9, the device adaptor 64 may include a first radial face 92a and a second radial face 92b opposite the first radial face 92a. Each of the first radial face 92a and the second radial face 92b may define therein respective first and second annular grooves 94a and 94b that may receive therein respective first and second annular seals 96a and 96b (e.g., O-ring seals and/or gaskets) to provide a fluid-tight seal between an adaptor body 98 of the device adaptor 62 and a spool end face 100 of the spool section 80, and/or between the adaptor body 98 and a junction end face 102 of the flow cross junction 68. As shown in FIG. 9, the spool section 80 may include a spool flange 104 defining one or more fastener bores 106, and the junction end face 102 may include one or more threaded blind fastener holes 108. Fasteners (e.g., bolts, not shown) may be received through the one or more fastener bores 106 and by the one or more blind fastener holes 108 to secure the spool section 80 to the flow cross junction 68. In the embodiment shown, the device adaptor 64 may be positioned between the junction end face 102 and the spool flange 104.

In the embodiment shown in FIG. 9, the fracturing fluid is flowing right-to-left in the direction of arrows FF through the manifold flow passage 47. As shown, the flow altering assembly 14 is positioned upstream relative to the flow cross junction 68 and the flow cross passage 70 of the flow cross body 74.

FIG. 10A is a schematic perspective view of an example flow altering device 62 consistent with the flow altering device 62 shown in FIG. 9, and FIG. 10B is a schematic end view of the example flow altering device 62 shown in FIG. 10A according to embodiments of the disclosure. As shown in FIGS. 9, 10A, and 10B, the flow altering device 62 may include an annular device flange 110 positioned at least partially in the manifold flow passage 47. The annular device flange 110 may define a longitudinal device axis D, a first face 113a, and a second face 113b opposite the first face 113a, and a longitudinal device passage 112 (or "through passage" 112) extending axially between the first face 113a and the second face 113b. When the flow altering device 62 is installed within the manifold flow passage 47, the longitudinal device axis D may be aligned with the longitudinal axis 49 (FIG. 9). The first face 113a and second face 113b may also be referred to herein as a "first side" 113a and "second side" 113b, respectively, of annular flange 110. In some embodiments, the device flange 110 may have an outer circumferential diameter sized to fit within the bore wall 84 of the spool section 80. In some embodiments, the device flange 110 may have an outer circumferential diameter slightly larger than the bore wall 84 of the spool section 80. In some such embodiments, the device flange 110 may serve a function similar to the device adaptor 64, for example, for connecting the flow altering device 62 between the flow cross junction 68 and the spool section 80. In some such embodiments, the device flange 110 may at least partially define annular grooves for receiving seals, for example, in a manner at least similar to the annular grooves 94*a* and 94*b* of the device adaptor 64 shown in FIG. 7.

As shown in FIGS. 9, 10A, and 10B, some embodiments of the flow altering device 62 may include a front flow altering tube 144 connected to and extending axially upstream from the annular device flange 110 (e.g., to the first face 113*a*). Thus, the front flow altering tube 144 may axially extend through passage 112 so that fluid may advance through both front flow altering tube 144 and annular flange 113 via through passage 112 during operation. The flow altering device 62 of FIGS. 9, 10A, and 10B may reflect a portion of the fracturing fluid back upstream and/or cause a velocity differential and/or a pressure differential in the fracturing fluid as the fracturing fluid flows through the flow altering device 62. In some embodiments, the flow altering device 62 may prevent acoustic resonance, disrupt standing wave formation, and/or dissipate energy associated with pressure change in the manifold flow passage 47 or interrupt standing waves in the manifold flow passage 47. For example, as shown in FIG. 9, the front flow altering tube 144 may be positioned in the manifold flow passage 47 upstream relative to the annular device flange 110, and the annular device flange 110 and/or the front flow altering tube 144 may reflect a portion of the fracturing fluid back upstream or cause a velocity differential and/or a pressure differential in the fracturing fluid as the fracturing fluid flows through the flow altering device 62. An upstream end (tube leading edge 147) of the front flow altering tube 144 may include a frustoconical surface 143 that angles radially inward toward axis D (and thus also longitudinal axis 49) when moving axially from the upstream end (tube leading edge 147) of front flow altering tube 144 toward annular flange 110.

The annular device flange 110, the front flow altering tube 144, and the bore wall 84 of the spool section 80 may define an annular cavity 146 that extends radially between front flow altering tube 144 and the bore wall 84 and axially along the front flow altering tube 144 to the annular flange. The annular cavity 146 may be collect and/or reflect a portion of the fluid flow FF as the fracturing fluid reaches the flow altering device 62. The annular cavity 146 may dissipate energy associated with pressure change in the manifold flow passage 47 and/or interrupt standing waves in the manifold flow passage 47. In some embodiments, the longitudinal device passage 112, having a cross-sectional area relatively smaller than the cross-sectional area of the manifold bore 85, such that the fluid flow may be constricted as it progresses into and through longitudinal device passage 112. This flow constriction may cause a velocity differential and/or a pressure differential in the fluid flow FF as it passes through the longitudinal device passage 112 that may act to increase the velocity of the fluid flow FF, which, in turn, may create an offset pressure wave, dissipate the amount of energy in the fracturing fluid, and/or prevent or mitigate pressure pulses from downstream hydraulic fracturing pumps 16 being transmitted upstream.

In some embodiments, as shown in FIGS. 9 and 10A, the front flow altering tube 144 may at least partially define a plurality of pressure relief apertures 148 that may, for example, equalize pressure between the annular cavity 146 and the flow through the flow altering device 62. A low pressure area may develop in the annular cavity 146, which may tend to cause erosion by the fracturing fluid. In some embodiments, the pressure relief apertures 148 may assist with reducing the erosion rate or preventing erosion. The plurality of pressure relief apertures 148 may extend radially through the front flow altering tube 144 between the annular cavity 146 and the through passage 112 (e.g., the portion of through passage 112 defined within front flow altering tube 144.

Figure 19:
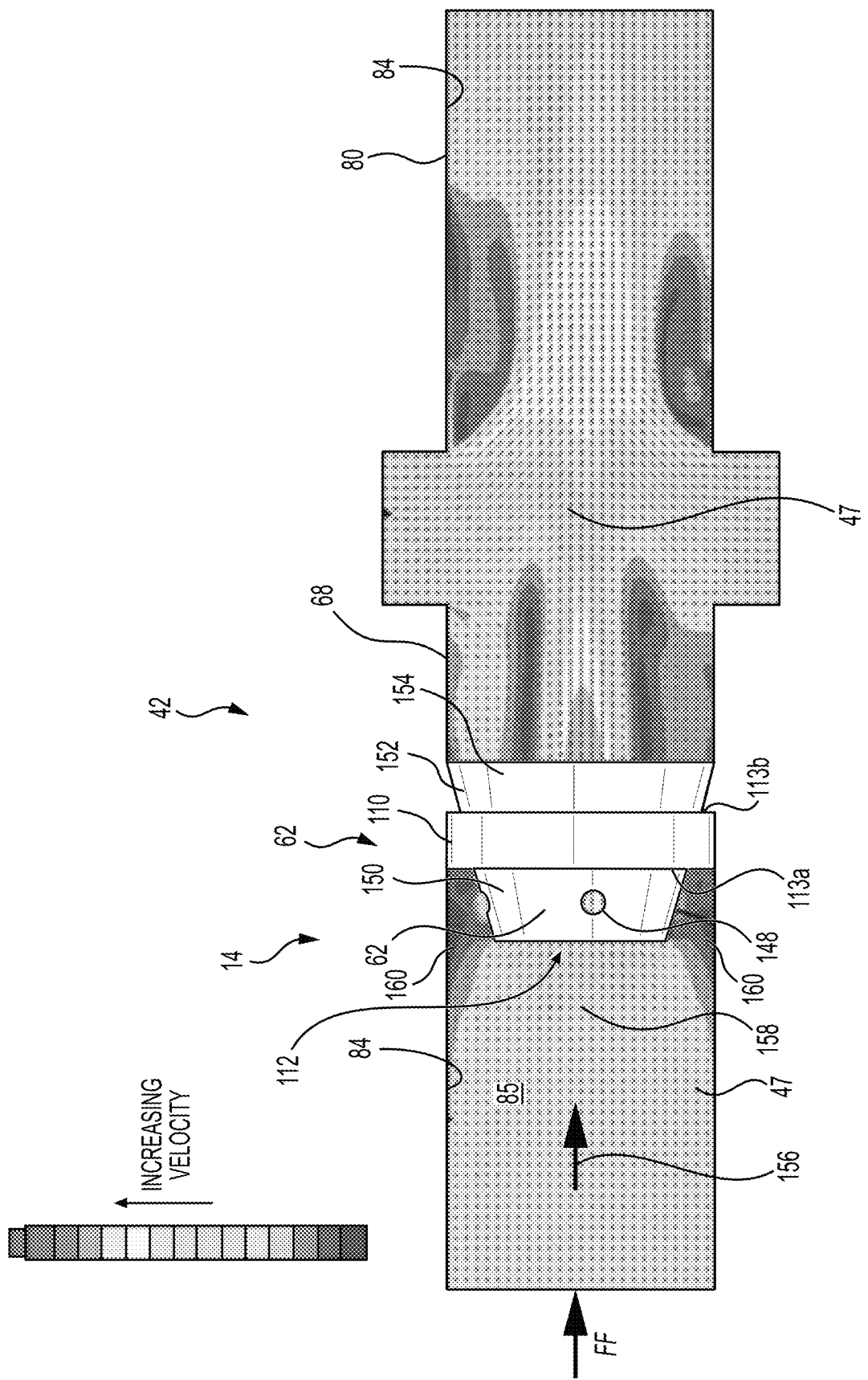
FIG. 19 is a schematic flow diagram depicting flow velocity variation in an example fluid manifold passage downstream of an example flow altering assembly consistent with the flow altering assembly shown in FIGS. 14, 15A, 15B, and 15C, according to embodiments of the disclosure.

In some embodiments, an outer front tube surface 150 may define a truncated cone-shaped profile, for example, as shown in FIGS. 15A-C and 19. As shown in FIGS. 9 and 19, some embodiments of the flow altering device 62 may include a rear flow altering tube 152 connected to the second face 113*b* of the annular device flange 110. For example, the rear flow altering tube 152 may be positioned in the manifold bore 85 facing downstream relative to the annular flow altering device 62. In some embodiments, the rear flow altering tube 152 may include an outer rear tube surface 154 defining a truncated cone-shaped profile diverging as the rear flow altering tube 152 extends away from the second face 113*b* of the annular flow altering device 62.

As shown in FIGS. 10A and 10B, in some embodiments of the flow altering device 62, the second face 113*b* of the annular device flange 110 may at least partially define a plurality of blind holes 130, each to receive a fastener therein. For example, in some embodiments, the flow altering device 62 may be connected to a device adaptor 64, for example, as shown in FIG. 9 and explained in more detail with respect to FIGS. 7 and 11.

FIG. 11 is a schematic perspective view of an example flow altering assembly 14 including an example flow altering device 62 consistent with the flow altering device 62 shown in FIGS. 10A and 10B connected to the device adaptor 64 shown in FIG. 7, according to embodiments of the disclosure. For example, the device adaptor 64 may position the flow altering device 62 at least partially in the manifold bore 85 as shown in FIG. 9, and the device adaptor 64 may include an adaptor body 98 including a circumferential outer adaptor surface 132 and defining a central adaptor passage 134 through which fracturing fluid may flow. As shown in FIGS. 7 and 11, some embodiments of the adaptor body 98 may at least partially define a device recess 136 that is to receive the annular device flange 110 of the flow altering device 62, such that the longitudinal device passage 112 and the central adaptor passage 134 are substantially aligned. The device adaptor 64, in some embodiments, may facilitate removal and replacement of the flow altering device 62, for example, with a flow altering device having substantially the same configuration as the removed flow altering device or an alternative configuration. The device recess 136 of the device adaptor 64 may define a plurality of adaptor holes 140, each that are to receive a fastener (e.g., a bolt) to connect the flow altering device 62 to the device adaptor 64. For example, the device recess 136 may at least partially define a radially extending face 142, and the adaptor holes 140 may be in the radially extending face 142, for example, as shown in FIG. 7.

Figure 12:
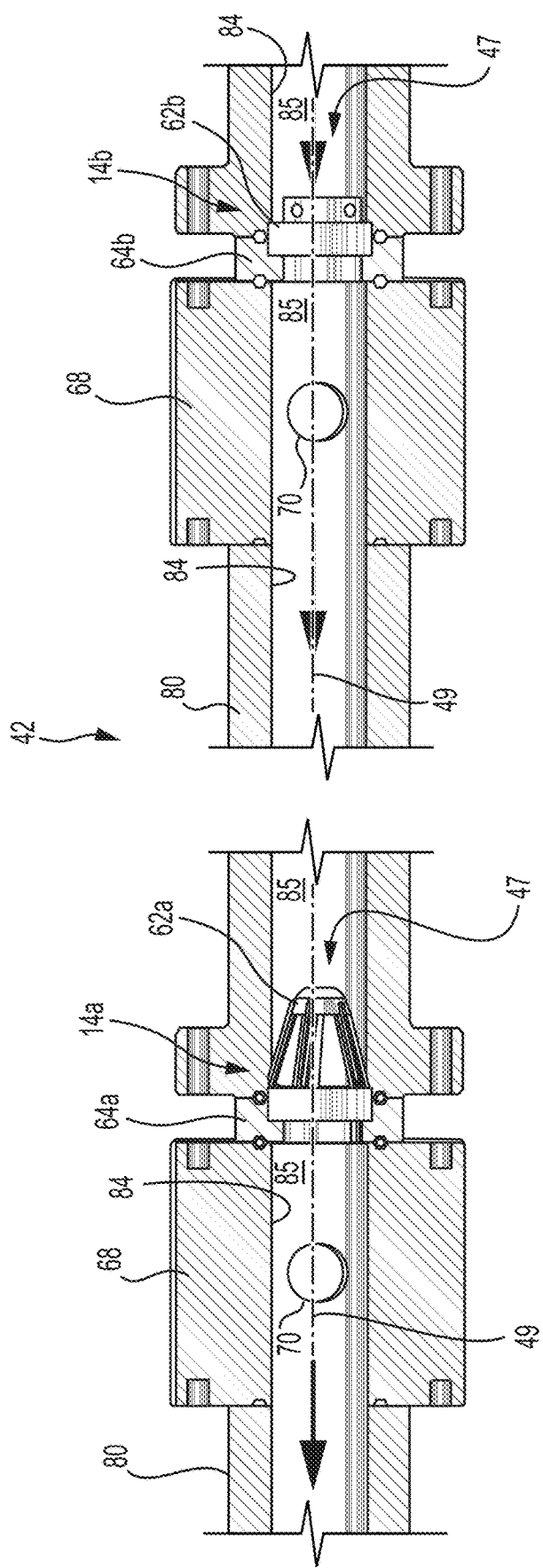
FIG. 12 is a schematic partial section view of two example flow altering assemblies positioned in an example high-pressure manifold assembly according to embodiments of the disclosure.

FIG. 12 is schematic partial section view of two example flow altering assemblies 14*a* and 14*b* positioned in an example high-pressure manifold assembly 42 according to embodiments of the disclosure. For example, the high-pressure manifold assembly 42 shown in FIG. 12 includes the first flow altering device 14*a* positioned in the manifold flow passage 47 at a first manifold location and a second flow altering device 14*b* positioned in the manifold flow passage 47 at a second manifold location upstream relative to the first flow altering device 14*a*. Thus, the first flow altering device 14*a* and the second flow altering device 14*b* may be spaced from one another along the longitudinal axis 49. In some embodiments, the second flow altering assembly 14*b* may be located downstream in the manifold flow passage 47 relative to the first flow altering assembly 14*a*. As indicated previously herein, some embodiments may include only a single flow altering assembly 14, and other embodiments may include more than two flow altering assemblies 14. As shown in FIG. 12, the first flow altering assembly 14*a* may include a first flow altering device 62*a* and a first device adaptor 64*a* connected to the first flow altering device 62*a*, and the second flow altering assembly 14*b* may include a second flow altering device 62*b* and a second device adaptor 64*b* connected to the second flow altering device 62*b*. The first flow altering assembly 14*a* shown in FIG. 12 may generally correspond to the flow altering assembly 14 shown in FIGS. 5 and 8, and the second flow altering assembly 14*b* shown in FIG. 12 may generally correspond to the flow altering assembly 14 shown in FIGS. 9 and 11.

Although the first flow altering device 62*a* and the second flow altering device 62*b* shown in FIG. 12 differ from one another, in embodiments including more than one flow altering assembly 14, all the flow altering assemblies 14 may have substantially the same configuration, and/or all the flow altering devices 62 may have substantially the same configuration. In some embodiments including more than one flow altering assembly 14, two or more of the flow altering assemblies 14 may have configurations differing from one another. Any combination of flow altering assemblies 14 having the same or different configurations is contemplated. Although each of the embodiments of flow altering assembly 14 shown in FIG. 12 includes a device adaptor 64, some embodiments of flow altering assembly 14 may not include a device adaptor. Although the device adaptors 64*a* and 64*b* shown in FIG. 12 have the same configuration, some embodiments of flow altering assembly 14 may include device adaptors having different configurations.

In the example configuration shown in FIG. 12, the second flow altering assembly 14*b* may reflect pressure pulsations caused by operation of the upstream hydraulic fracturing pumps 16 and/or dissipate energy in the fracturing fluid as it passes through the second flow altering assembly 14*b*. In some embodiments, the first flow altering assembly 14*a* may divert the flow path of the fracturing fluid to lengthen the flow path and reduce or mitigate energy in the fracturing fluid by diverting a wave front of standing waves outward toward the bore wall 84. In some embodiments consistent with the flow altering assemblies 14*a* and 14*b* shown in FIG. 12, such configurations may cause a velocity differential and/or a pressure differential in the flow of fracturing fluid through the manifold flow passage 47 during operation of the hydraulic fracturing system 10, which, in turn, may prevent acoustic resonance, disrupt standing wave formation, and/or prevent vibration associated with the high-pressure manifold assembly 42.

Figure 13:
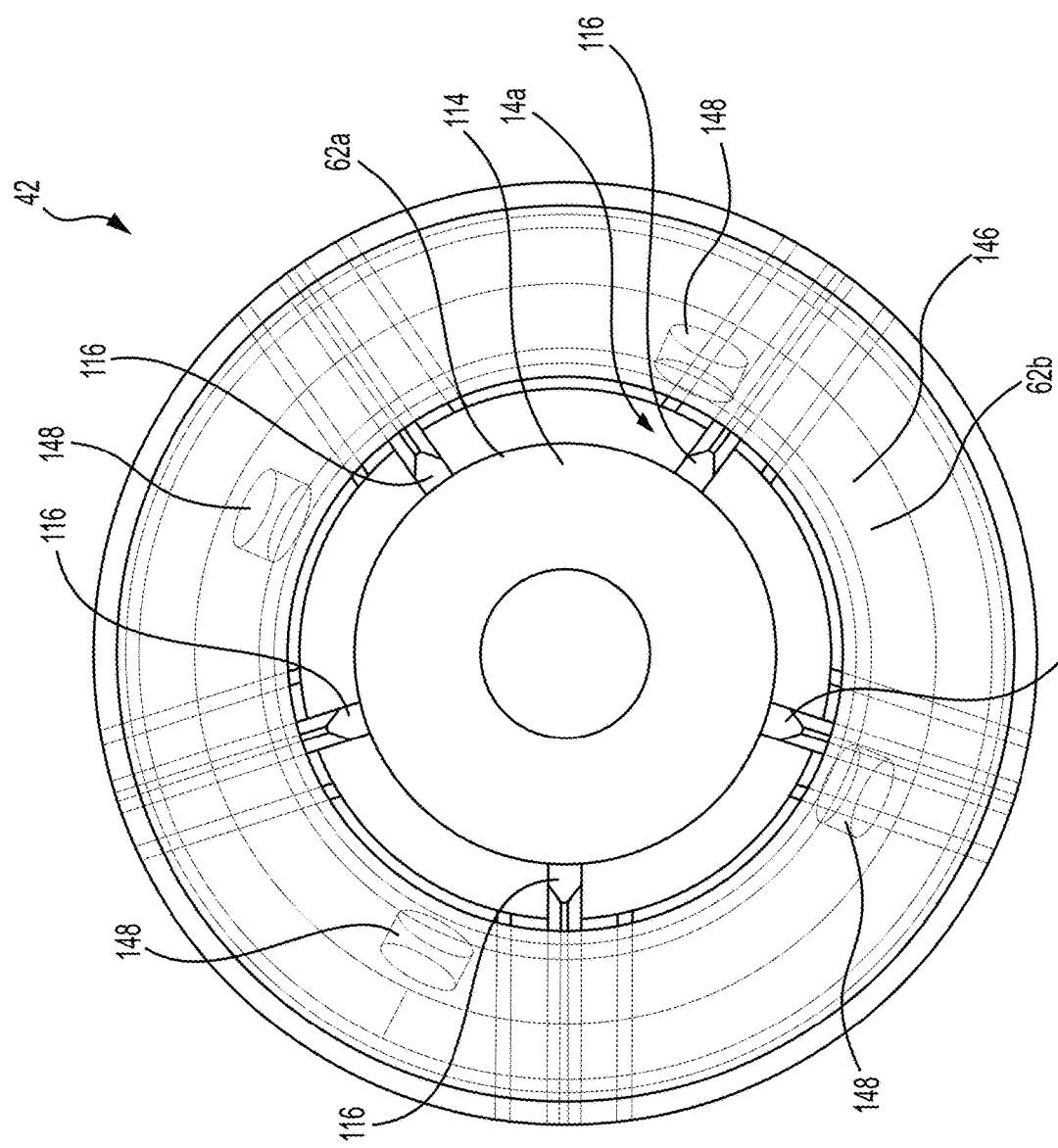
FIG. 13 is a schematic view longitudinally down an example manifold flow passage of an example high-pressure manifold assembly showing an example relationship between the two example flow altering assemblies shown in FIG. 12 positioned in the manifold flow passage, according to embodiments of the disclosure.

FIG. 13 is schematic view longitudinally down an example manifold flow passage 47 of an example high-pressure manifold assembly 42, showing an example relationship between the two example flow altering assemblies 14*a* and 14*b* shown in FIG. 12 positioned in the manifold flow passage 47, according to embodiments of the disclosure. As shown in FIG. 13, the embodiments of first flow altering assembly 14*a* and the second flow altering assembly 14*b*, as viewed longitudinally, provide almost no, or zero, straight path flow through the two flow altering assemblies 14*a* and 14*b*. As a result, first flow altering assembly 14*a* and second flow altering assembly 14*b* may prevent or block a continuous straight axial flow path along the manifold flow passage 47 from a point upstream of the second flow altering device 14*b* to a point downstream of the first flow altering device 14*a* (e.g., for the flow direction shown in FIG. 11). Thus, the two flow altering assemblies 14*a* and 14*b* may act to block, divert, interrupt, and/or dissipate pressure pulsations created by operation of the multiple hydraulic fracturing pumps 16, and/or block, divert, interrupt, and/or dissipate energy associated with standing waves in the manifold flow passage 47.

Figure 14:
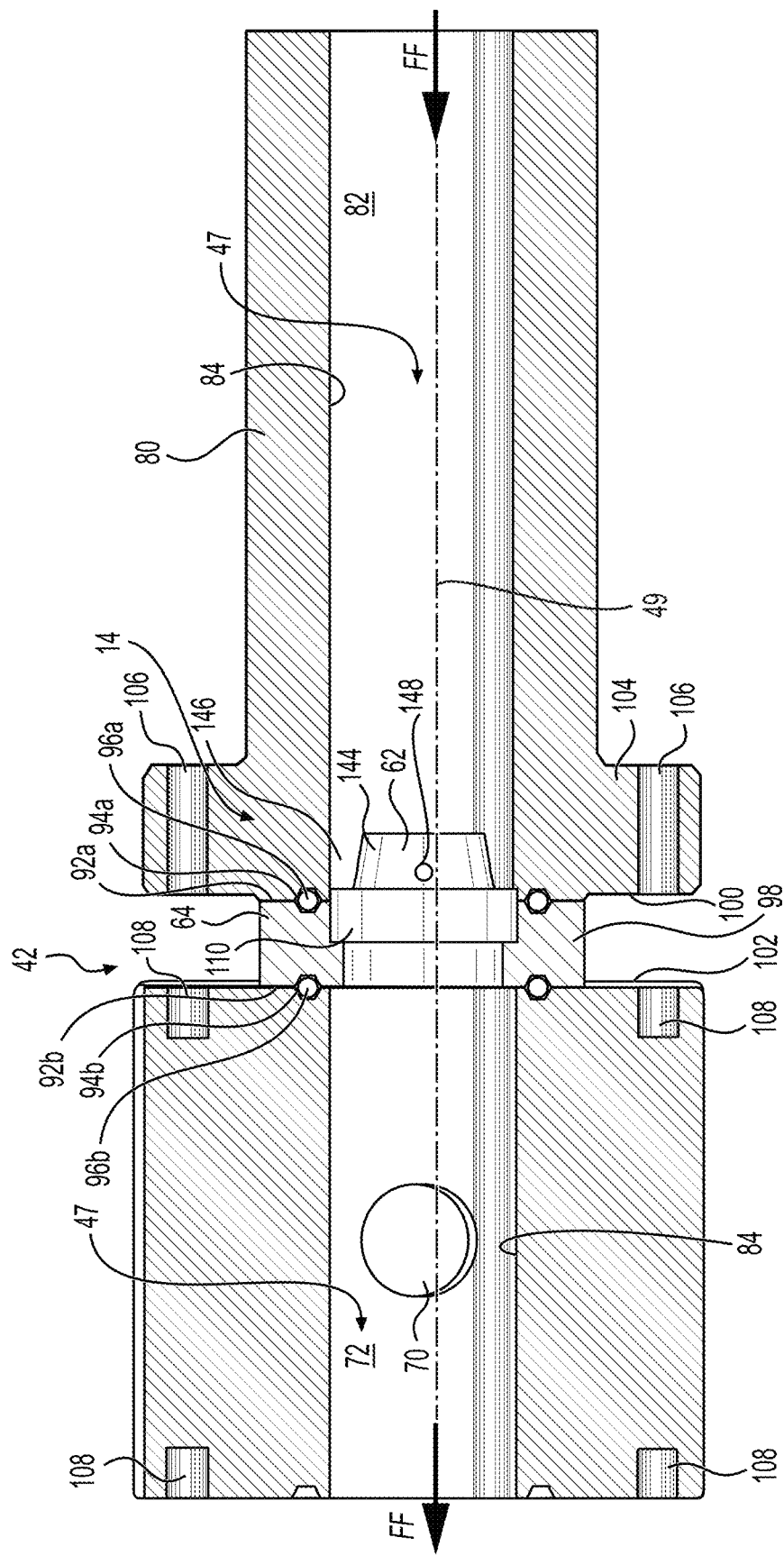
FIG. 14 is a schematic partial side section view of still a further example flow altering assembly positioned in an example high-pressure manifold assembly according to embodiments of the disclosure.

FIG. 14 is a schematic partial side section view of still a further example flow altering assembly 14 positioned in an example high-pressure manifold assembly 42 according to embodiments of the disclosure. The flow altering device 62 shown in FIG. 14 may reduce the effects of pressure pulsations and/or standing wave resonance associated with operation of the multiple hydraulic fracturing pumps 16 during a fracturing operation. As shown in FIG. 14, the flow altering device 62 may be connected to a device adaptor 64 and positioned longitudinally between a flow cross junction 68 and a spool section 80 of the high-pressure manifold assembly 42. The flow cross junction 68 may define a flow cross passage 70 for receiving the fracturing fluid output of two hydraulic fracturing pumps 16 and a bore segment 72. The bore segment 72 and a spool bore 82 of the spool section 80 may collectively at least partially define a bore wall 84 of the manifold flow passage 47. As shown in FIG. 14, the device adaptor 64 may include a first radial face 92*a* and a second radial face 92*b* opposite the first radial face 92*a*. Each of the first radial face 92*a* and the second radial face 92*b* may define therein respective first and second annular grooves 94*a* and 94*b* that may receive therein respective first and second annular seals 96*a* and 96*b* (e.g., O-ring seals and/or gaskets) to provide a fluid-tight seal between an adaptor body 98 of the device adaptor 62 and a spool end face 100 of the spool section 80, and/or between the adaptor body 98 and a junction end face 102 of the flow cross junction 68. As shown in FIG. 14, the spool section 80 may include a spool flange 104 defining one or more fastener bores 106, and the junction end face 102 may include one or more threaded blind fastener holes 108. Fasteners (e.g., bolts, not shown) may be received through the one or more fastener bores 106 and by the one or more blind fastener holes 108 to secure the spool section 80 to the flow cross junction 68. In the embodiment shown, the device adaptor 64 may be positioned between the junction end face 102 and the spool flange 104.

In the embodiment shown in FIG. 14, the fracturing fluid is flowing right-to-left in the direction of arrows FF through the manifold flow passage 47. As shown, the flow altering assembly 14 is positioned upstream relative to the flow cross junction 68 and the flow cross passage 70 of the flow cross body 74.

FIG. 15A is a schematic perspective view of an example flow altering device 62 consistent with the flow altering device 62 shown in FIG. 14, FIG. 15B is a schematic side section view of the example flow altering device 62 shown in FIG. 15A according to embodiments of the disclosure, and FIG. 15C is a schematic front end view of the example flow altering device 62 shown in FIG. 15A according to embodiments of the disclosure. As shown in FIGS. 14, 15A, 15B, and 15C, the flow altering device 62 may include an annular device flange 110 positioned at least partially in the manifold flow passage 47. The annular device flange 110 may define a longitudinal device axis D (which may be aligned with longitudinal axis 49 during operations as previously described), a longitudinal device passage 112, a first face 113*a*, and a second face 113*b* opposite the first face 113a. In some embodiments, the device flange 110 may have an outer circumferential diameter sized to fit within the bore wall 84 of the spool section 80. In some embodiments, the device flange 110 may have an outer circumferential diameter slightly larger than the bore wall 84 of the spool section 80. In some such embodiments, the device flange 110 may serve a function similar to the device adaptor 64, for example, for connecting the flow altering device 62 between the flow cross junction 68 and the spool section 80. In some such embodiments, the device flange 110 may at least partially define annular grooves for receiving seals, for example, in a manner at least similar to the annular grooves 94a and 94b of the device adaptor 64 shown in FIG. 7.

As shown in FIGS. 14, 15A, 15B, and 15C, some embodiments of the flow altering device 62 may include a front flow altering tube 144 connected to the annular device flange 110 (e.g., to the first face 113a) that may reflect a portion of the fracturing fluid back upstream and/or cause a velocity differential and/or a pressure differential in the fracturing fluid as the fracturing fluid flows through the flow altering device 62. In some embodiments, the flow altering device 62 may prevent acoustic resonance, disrupt standing wave formation, and/or dissipate energy associated with pressure change in the manifold flow passage 47 or interrupt standing waves in the manifold flow passage 47. For example, as shown in FIG. 14, the front flow altering tube 144 may be positioned in the manifold flow passage 47 upstream relative to the annular device flange 110, and the annular device flange 110 and/or the front flow altering tube 144 may reflect a portion of the fracturing fluid back upstream or cause a velocity differential and/or a pressure differential in the fracturing fluid as the fracturing fluid flows through the flow altering device 62. The annular device flange 110, the front flow altering tube 144, and the bore wall 84 of the spool section 80 may define an annular cavity 146 that extends radially between front flow altering tube 144 and the bore wall 84 and axially along the front flow altering tube 144 to the annular flange. The annular cavity 146 may be collect and/or reflect a portion of the fluid flow FF as the fracturing fluid reaches the flow altering device 62. The annular cavity 146 may dissipate energy associated with pressure change in the manifold flow passage 47 and/or interrupt standing waves in the manifold flow passage 47. In some embodiments, the longitudinal device passage 112, having a cross-sectional area relatively smaller than the cross-sectional area of the manifold bore 85, may cause a velocity differential and/or a pressure differential in the fluid flow FF as it passes through the longitudinal device passage 112. This may act to increase the velocity of the fluid flow FF, which, in turn, may create an offset pressure wave, dissipate the amount of energy in the fracturing fluid, and/or prevent or mitigate pressure pulses from downstream hydraulic fracturing pumps 16 being transmitted upstream.

In some embodiments, as shown in FIGS. 14 and 15A, the front flow altering tube 144 may at least partially define a plurality of pressure relief apertures 148 may, for example, equalize pressure between the annular cavity 146 and the flow through the flow altering device 62. A low pressure area may develop in the annular cavity 146, which may tend to cause erosion by the fracturing fluid. In some embodiments, the pressure relief apertures 148 may assist with reducing the erosion rate or preventing erosion.

In some embodiments, an outer front tube surface 150 may define a truncated cone-shaped profile, for example, as shown in FIG. 14 and FIG. 15B. For example, the front flow altering tube 144 may be connected to the first face 113a of the annular device flange 110, and an outer front tube surface 150 of the front flow altering tube 144 may at least partially define a truncated cone-shaped profile. Thus, in some embodiments, the front flow altering tube 144 (including the outer front tube surface 150 and the corresponding inner front tube surface 151) may converge radially inward toward axis D (and thus also longitudinal axis 49) when moving axially away from annular device flange 110 along front flow altering tube 144. As shown in FIG. 14, the front flow altering tube 144 may be positioned in the manifold bore 85 facing upstream relative to the annular device flange 110. In some embodiments, this may result in causing a velocity differential and/or a pressure differential in the flow of fracturing fluid through the fluid manifold bore 85 of the fluid manifold assembly 42. As shown in FIG. 15B, the longitudinal device passage 112 diverges creating an expanding cross-sectional area as the longitudinal device passage 112 extends between the first face 113a and the second face 113b. For example, the front flow altering tube 144 may at least partially define a tube passage 145, and the tube passage 145 may diverge creating an expanding cross-sectional area as the tube passage 145 extends between a tube leading edge 147 and a tube trailing edge 149 at the first face 113a of the annular device flange 110. In some embodiments, the expanding cross-sectional area and/or diverging tube passage 145 in the direction of flow FF (see FIG. 14) may contribute to disrupting standing pressure waves, for example, as they reciprocate axially within the fluid manifold bore 85, for example, since the standing pressure waves contact different portions of the flow altering device 62 longitudinal device passage 112 at different times. In some embodiments, the longitudinal device passage 112 may at least partially define a flange entry cross-section at the first face 113a and a tube exit cross-section at the second face 113b. The tube exit cross-section and the flange entry cross-section have one or more of a common cross-sectional area or a common cross-sectional shape (e.g., the same cross-sectional shape and same cross-sectional area).

As shown in FIGS. 15A and 15C, in some embodiments of the flow altering device 62, the second face 113b of the annular device flange 110 may at least partially define a plurality of blind holes 130, each to receive a fastener therein. For example, in some embodiments, the flow altering device 62 may be connected to a device adaptor 64, for example, in a manner at least similar to the manner in which the flow altering device 62 shown in FIG. 9 is connected to the device adapter 64 and as explained in more detail with respect to FIGS. 7 and 11.

Figure 16:
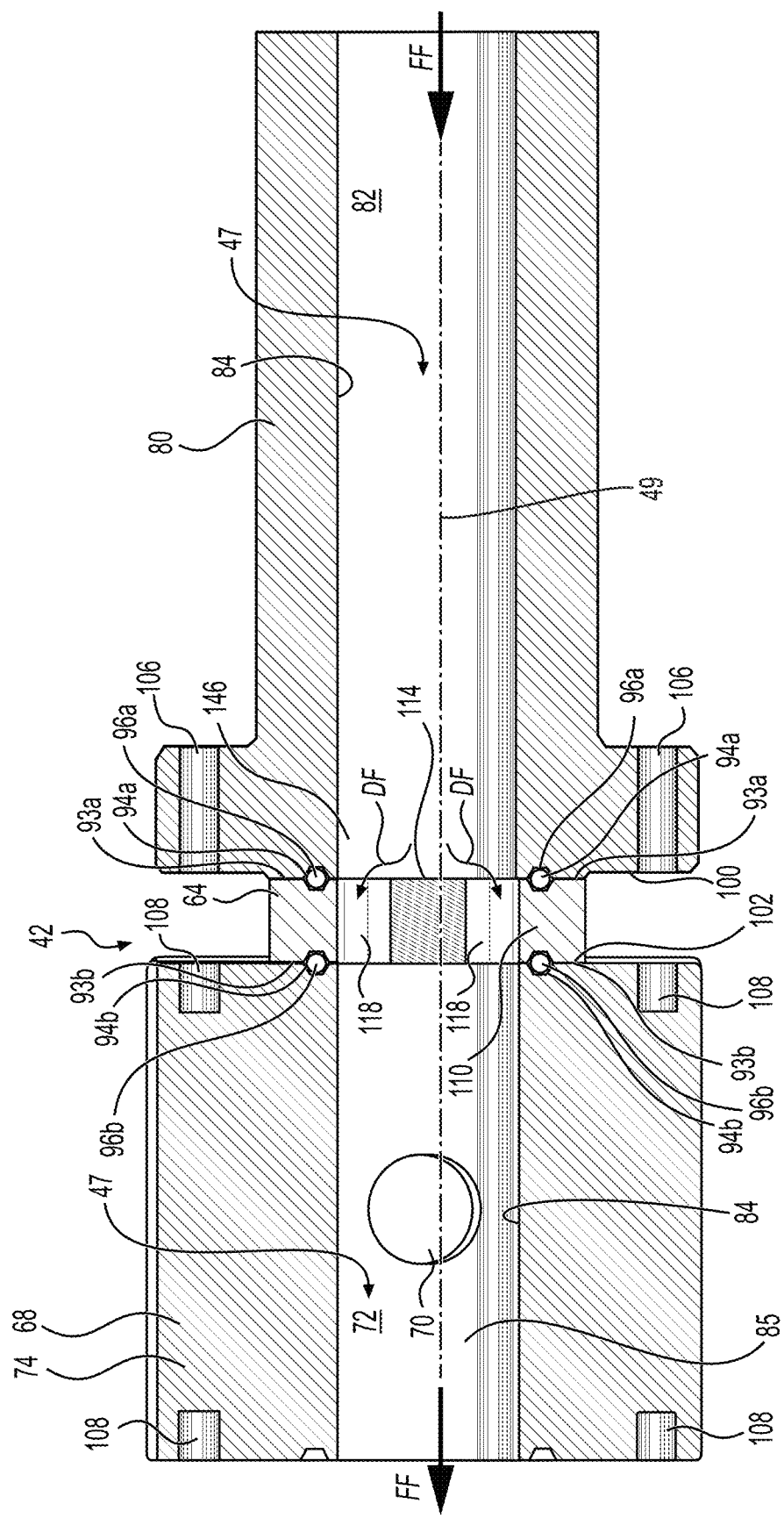
FIG. 16 is a schematic partial side section view of yet another example flow altering assembly positioned in an example high-pressure manifold assembly, according to embodiments of the disclosure.

FIG. 16 is a schematic partial section view of an example flow altering assembly 14 positioned in an example high-pressure manifold assembly 42 according to embodiments of the disclosure. As shown in FIG. 16, in some embodiments, the high-pressure manifold assembly 42 may include a flow altering device 62 to reduce effects of pressure pulsations and/or standing wave resonance associated with operation of the multiple hydraulic fracturing pumps 16 during a fracturing operation. Although the example flow altering assembly 42 shown in FIG. 16 does not include an adaptor assembly, the flow altering assembly 14 may include a flow altering device 62 connected to a device adaptor 64 and positioned longitudinally between a flow cross junction 68 and a spool section 80 of the high-pressure manifold assembly 42, for example, as explained herein with respect to other example flow altering assemblies. The flow cross junction 68 may define a flow cross passage 70 for receiving the fracturing fluid output of two hydraulic fracturing pumps 16 and a bore segment 72. The bore segment 72 and a spool bore 82 of the spool section 80 collectively partially define a bore wall 84 of the manifold flow passage 47.

As shown in FIG. 16, the flow altering device 62 may include an annular device flange 110 including a first radial face 93*a* and a second radial face 93*b* opposite the first radial face 93*a*. Each of the first radial face 93*a* and the second radial face 93*b* may define therein respective first and second annular grooves 94*a* and 94*b* that may receive therein respective first and second annular seals 96*a* and 96*b* (e.g., O-ring seals and/or gaskets) to provide a fluid-tight seal between the annular device flange 110 and a spool end face 100 of the spool section 80 and/or a junction end face 102 of the flow cross junction 68. As shown in FIG. 16, the spool section 80 may include a spool flange 104 defining one or more fastener bores 106, and the junction end face 102 may include one or more threaded blind fastener holes 108. Fasteners (e.g., bolts, not shown) may be received through the one or more fastener bores 106 and by the one or more blind fastener holes 108 to secure the spool section 80 to the flow cross junction 68. In the embodiment shown, the annular device flange 110 may be positioned between the junction end face 102 and the spool flange 104.

In the embodiment shown in FIG. 16, the fracturing fluid is flowing right-to-left in the direction of arrows FF through the manifold flow passage 47. As shown, the flow altering assembly 14 is positioned upstream relative to the flow cross junction 68 and the flow cross passage 70 of the flow cross body 74.

Figure 17:
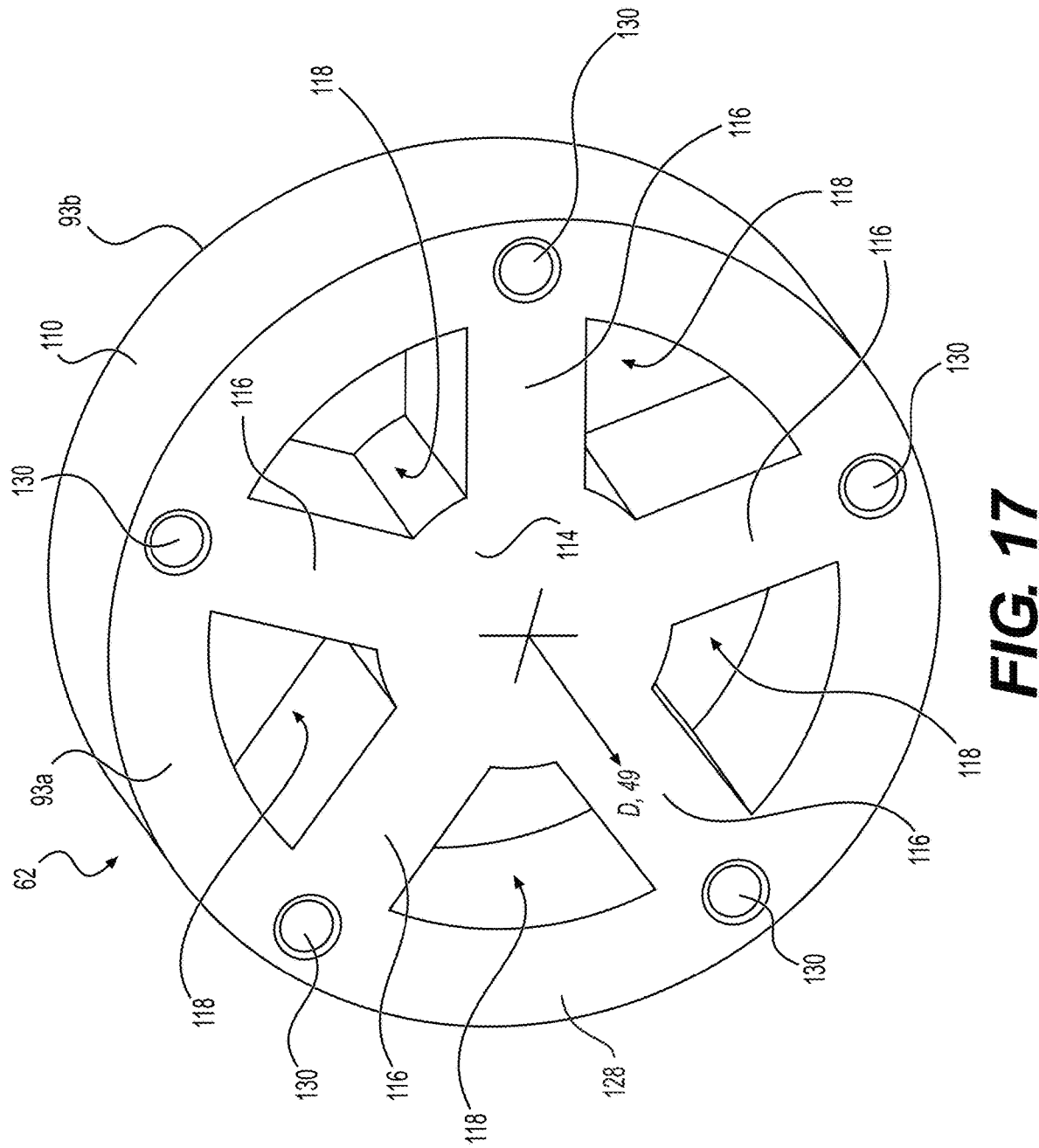
FIG. 17 is a schematic perspective view of yet another example flow altering device consistent with the example flow altering device of the example flow altering assembly shown in FIG. 19, according to embodiments of the disclosure.

FIG. 17 is a schematic perspective view of an example flow altering device 62 consistent with the flow altering device 62 shown in FIG. 16, according to embodiments of the disclosure. As shown in FIGS. 16 and 17, the flow altering device 62 may include an annular device flange 110 that is to be positioned at least partially in the manifold flow passage 47. The annular device flange 110 may define a longitudinal device axis D and a plurality of longitudinal device passages 118. When the flow altering device 62 is installed within the manifold flow passage 47, the longitudinal device axis D may be aligned with the longitudinal axis 49 (FIG. 16). In some embodiments, one or more of the plurality of longitudinal device passages 118 may have a diverging cross-sectional area in the direction of flow FF (FIG. 16). In some embodiments, the device flange 110 may have an outer circumferential diameter sized to fit within the bore wall 84 of the spool section 80. In some embodiments, the device flange 110 may have an outer circumferential diameter slightly larger than the bore wall 84 of the spool section 80. In some such embodiments, the device flange 110 may serve a function similar to the device adaptor 64, for example, for connecting the flow altering device 62 between the flow cross junction 68 and the spool section 80, for example, as explained above. In some such embodiments, the device flange 110 may at least partially define annular grooves for receiving seals, for example, in a manner at least similar to the annular grooves 94*a* and 94*b* of the device adaptor 64.

As shown in FIGS. 16 and 17, some embodiments of the flow altering device 62 may include a diverter face 114 connected to the annular device flange 110 that is to divert flow of the fracturing fluid from a substantially straight flow path to a diverted flow path toward the bore wall 84. For example, as shown in FIG. 16, the diverter face 114 may present a substantially planar surface to be positioned facing upstream in the manifold flow passage 47 relative to the annular device flange 110 and the fluid flow FF. As noted above, the velocity profile of the fluid flow FF is such that the velocity of fluid in the central portion of the manifold flow passage 47 is relatively faster than the velocity of the fluid near the bore wall 84. The diverter face 114 of the flow altering device shown in FIGS. 16 and 17 is located in the central portion of the manifold flow passage 47, and thus, the flow of fluid having the relatively faster velocity in the central portion contacts the diverter face 114 and is diverted radially outward, for example, as shown in FIG. 16 by arrows DF.

As shown in FIGS. 16 and 17, some embodiments of the flow altering device 62 may include a plurality of face supports 116 extending radially between the diverter face 114 and the annular device flange 110 and connecting the diverter face 114 to the annular device flange 110. In some embodiments, the face supports 116 and the longitudinal device passages 112 may at least partially define a plurality of device passages 118 through which to allow fracturing fluid to flow within the manifold flow passage 47. In some embodiments, the fracturing fluid may be diverted by the diverter face 114 from the central portion of the manifold flow passage 47 toward the bore wall 84 and through the device passages 118. In this example manner, the flow altering device 62 may dissipate energy associated with velocity and/or pressure change in the manifold bore 85 or interrupt standing waves in the manifold bore 85.

As shown in FIGS. 16 and 17, in some embodiments, the diverter face 114 and the face supports 116 form sector-shaped passages between outer edges of the diverter face 114 and the annular device flange 110. This may assist with diverting the flow of the fracturing fluid outward toward the bore wall 84. In some embodiments, such a configuration may cause a velocity differential and/or a pressure differential in the flow of fracturing fluid through the manifold flow passage 47 during operation of the hydraulic fracturing system 10, which, in turn, may prevent acoustic resonance, disrupt standing wave formation, and/or prevent vibration associated with the high-pressure manifold assembly 42.

As shown in FIG. 17, in some embodiments of the flow altering device 62 the annular device flange 110 may include an annular face 128. The annular face 128 may at least partially define a plurality of blind holes 130, each to receive a fastener therein. For example, in some embodiments, the flow altering device 62 may be connected to a device adaptor 64, for example, as shown in FIG. 5 and explained in more detail with respect to FIGS. 7 and 8.

Figure 18:
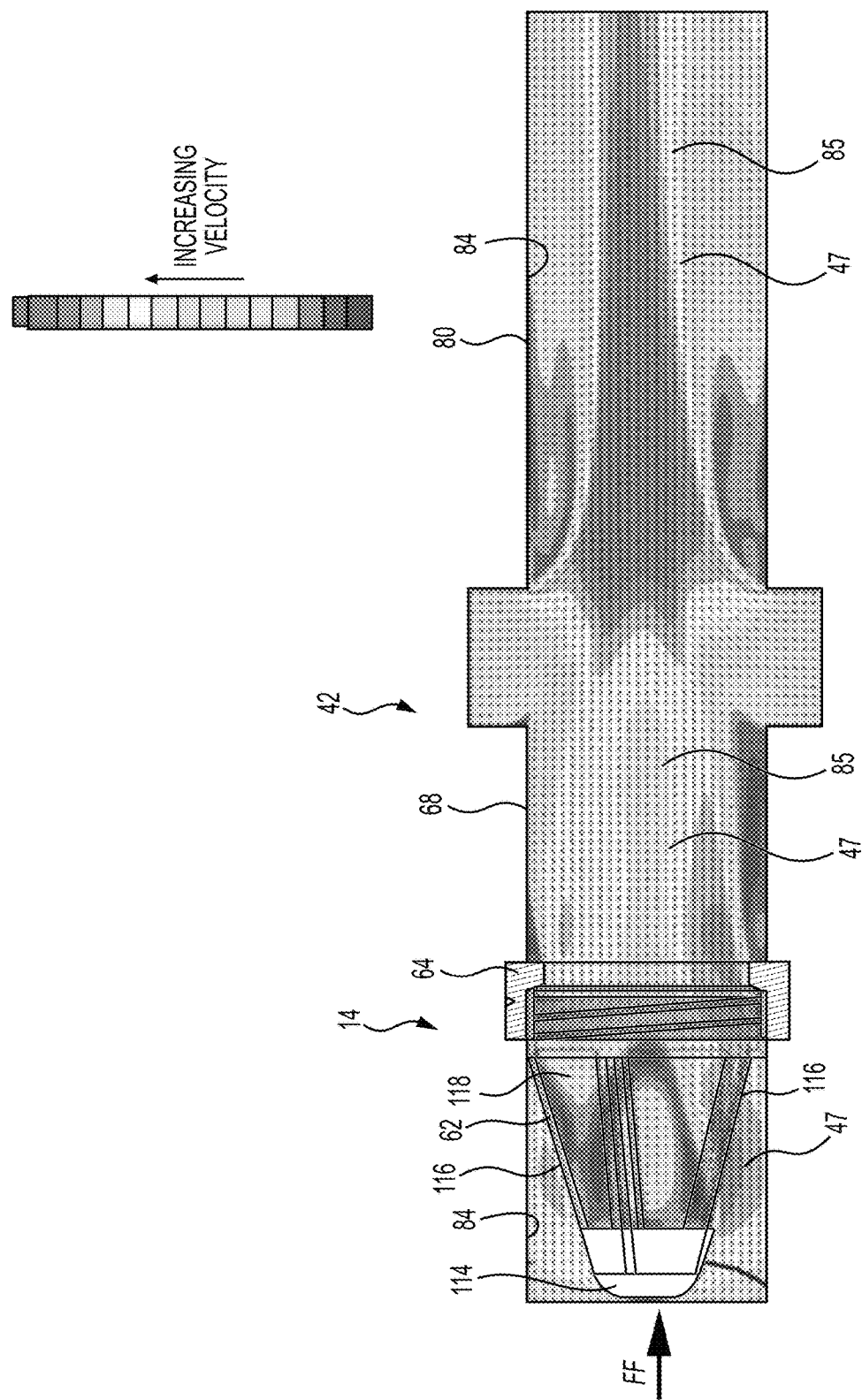
FIG. 18 is a schematic flow diagram depicting flow velocity variation in an example fluid manifold passage downstream of an example flow altering assembly consistent with the flow altering assembly shown in FIGS. 5 and 8, according to embodiments of the disclosure.

FIG. 18 is a schematic flow diagram depicting flow velocity variation in an example fluid manifold passage 47 downstream of an example flow altering assembly 14 consistent with the flow altering assembly shown in FIGS. 5 and 8, according to embodiments of the disclosure. As shown in FIG. 18, the fluid flow FF is left to right, and the embodiment of flow altering assembly 14 results in diverting the fluid flow FF around the diverter face 114 outward toward the bore wall 84 and through the device flow passages 118. In some embodiments, the flow altering assembly may be positioned in the manifold flow passage 47 upstream relative to the flow cross junction 68, and thus may disrupt the fluid flow FF upstream relative entry of outputs of hydraulic fracturing pumps 16 connected to the flow cross junction 68. As shown in FIG. 18, a large gradient in fluid velocity behind the diverter face 114 shows that the fracturing fluid behind the diverter face 114 may effectively act as a blank end while still allowing the fluid flow FF to travel downstream in the manifold flow passage 47. For example, in some embodiments, directly behind the diverter face 114, the fluid flow FF may closely mimic an eddy-like, slow circular flow, that might be expected to be seen at the back of a blank end (e.g., a mono-bore blank end). As shown FIG.

18, a relatively higher velocity flow stream that may be caused by diverter face 114 and/or the face supports 116 may create vortex flow that may assist in dissipating a portion of energy, thereby reducing potential peak-to-peak pressure from pressure pulsations. In some embodiments, such a flow pattern may be an indication that flow altering device 62 and/or flow altering assembly 14 may act as a quasi-blank end, changing the effective length of the section of the manifold bore 85 in which the flow altering assembly 14 is present. In some embodiments, this obstruction-like function may interrupt standing waves that have developed (or would have developed), and in some embodiments, a new quarter-wave signature may be initiated in the flow cross junction 68, for example, downstream of the flow cross passages 70 through which fracturing fluid output by two hydraulic fracturing pumps 16 enters the manifold bore 85.

Figure 20:
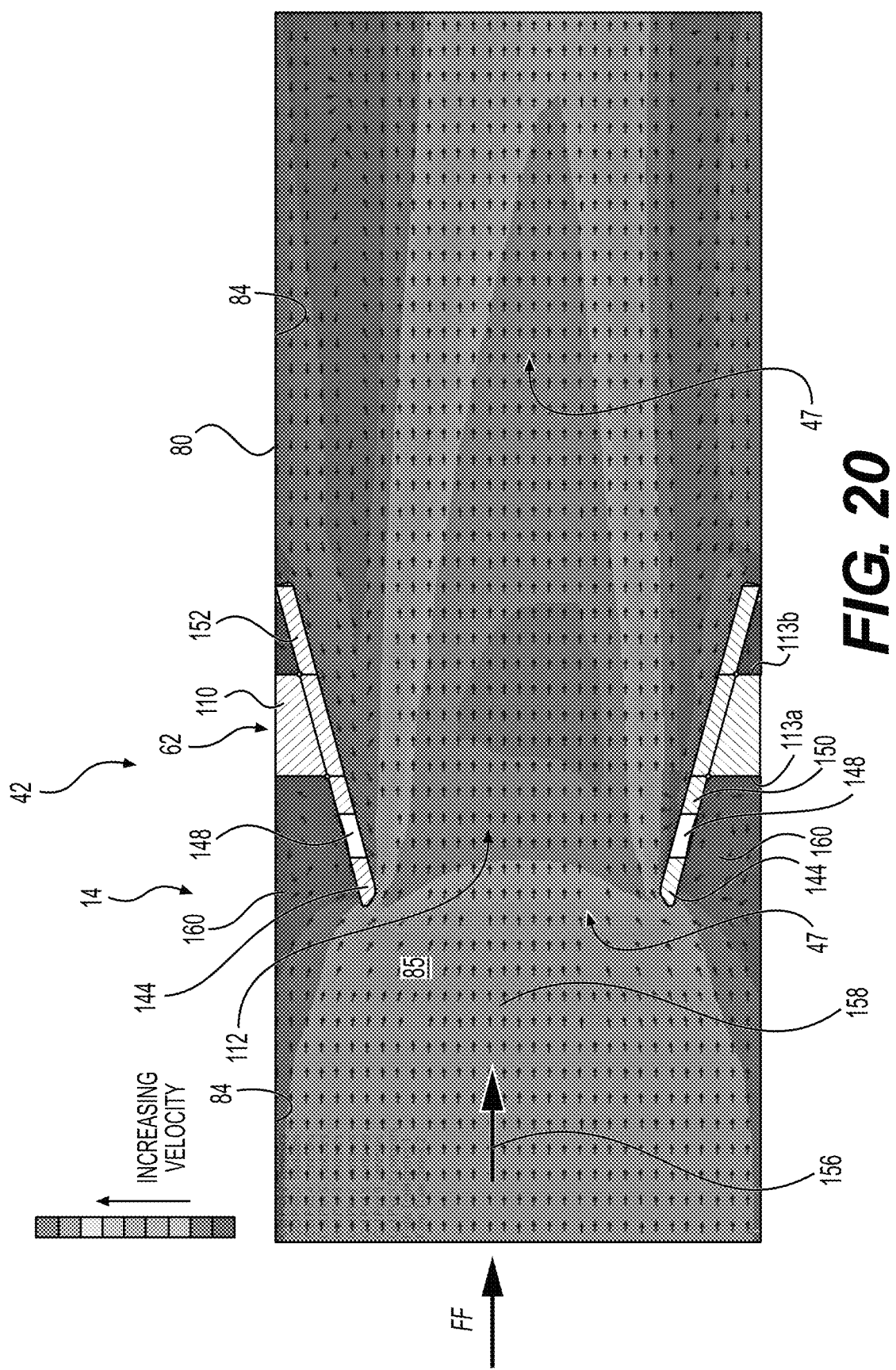
FIG. 20 is a schematic flow diagram depicting a section view the flow diagram shown in FIG. 19, according to embodiments of the disclosure.

FIG. 19 is a schematic flow diagram depicting flow velocity variation in an example fluid manifold passage 47 downstream of an example flow altering assembly 14 consistent with the flow altering assembly 14 shown in FIGS. 14, 15A, 15B, and 15C, according to embodiments of the disclosure. FIG. 20 is a schematic flow diagram depicting a section view the flow diagram shown in FIG. 19, according to embodiments of the disclosure. As shown in FIGS. 19 and 20, the flow altering device 62 embodiment shown in FIG. 19 is consistent with the flow altering device embodiment shown in FIGS. 14, 15A, 15B, and 15C, but differing by the addition of a rear flow altering tube 152 connected to the second face 113b of the annular device flange 110. For example, as shown in FIG. 19, the rear flow altering tube 152 may be positioned in the manifold bore 85 facing downstream relative to the annular flow altering device 62. In some embodiments, as shown in FIG. 19, the rear flow altering tube 152 may include an outer rear tube surface 154 defining a truncated cone-shaped profile diverging as the rear flow altering tube 152 extends away from the second face 113b of the annular flow altering device 62. In addition, the interior surface of the rear flow altering tube 152 also may define an interior-facing truncated cone-shaped profile. Thus, in some embodiments, the rear flow altering tube 152 may diverge radially outward from axis D (and thus also longitudinal axis 49) when moving axially away from annular device flange 110 along rear flow altering tube 152. As shown in FIG. 19, the flow altering assembly 14, including a longitudinal device passage 112 having a relatively smaller cross-sectional area than the cross-sectional area of the manifold bore 85, may cause the fluid flow FF to have a relatively high velocity flow 156 at the central region 158 of the manifold bore 85 in combination with a relatively low, eddy flow 160 away from the central region of the manifold bore 85.

Figure 21:
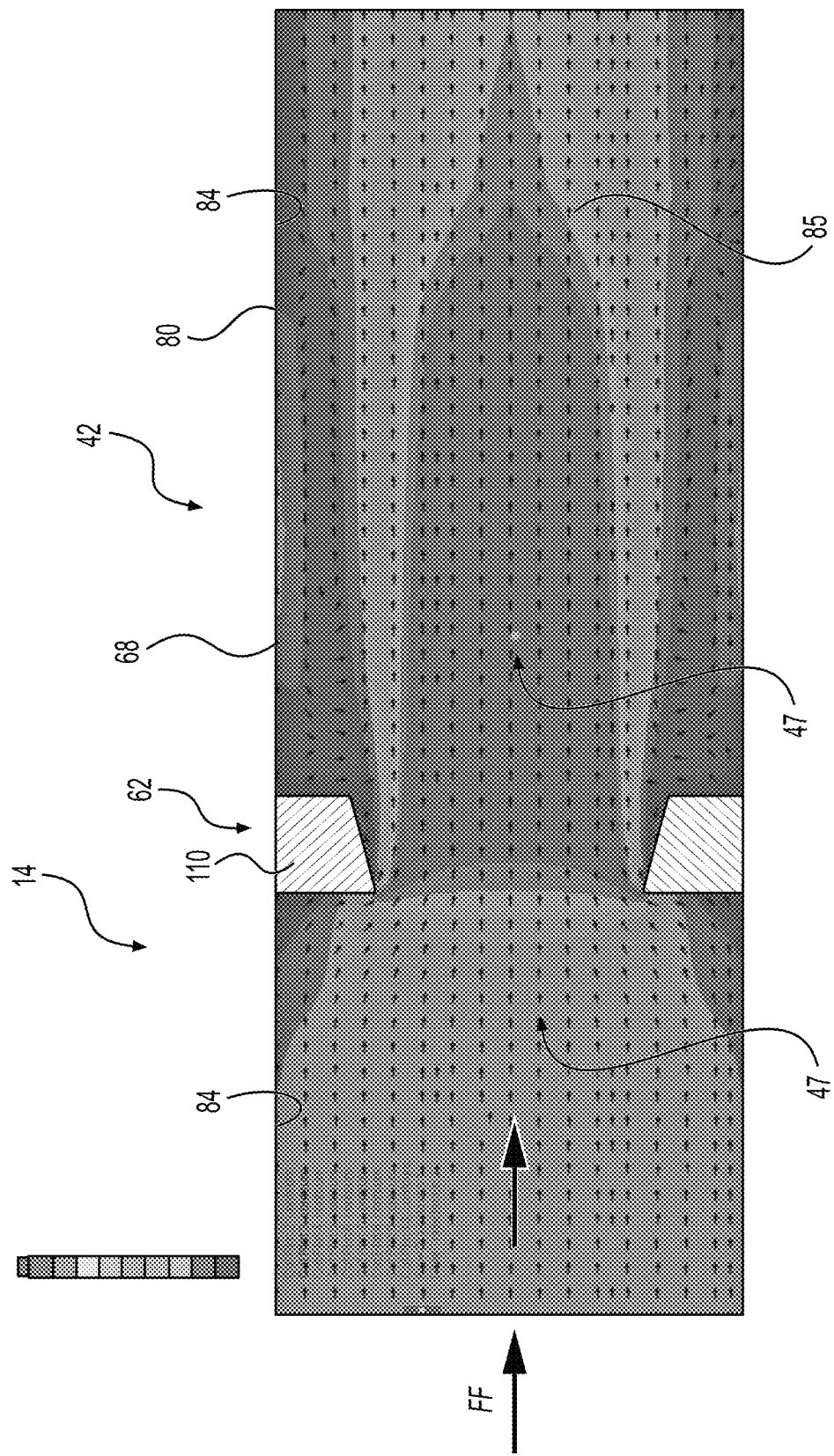
FIG. 21 is a schematic flow diagram depicting flow velocity variation in an example fluid manifold passage downstream of an example flow altering assembly consistent with the flow altering assembly shown in FIG. 16, according to embodiments of the disclosure.

FIG. 21 is a schematic flow diagram depicting flow velocity variation in an example fluid manifold passage downstream of an example flow altering assembly consistent with the flow altering assembly shown in FIG. 16, according to embodiments of the disclosure. As shown in FIG. 21, in some embodiments consistent with the flow altering device 62 shown in FIG. 16, one or more of the device passages 118 may have an expanding cross-sectional area as the device passages 118 extend from the first radial face 93a to the second radial face 93b resulting in, for example, an increasing flow area as the fracturing fluid flows through the device passages 118. As shown in FIG. 21, the fluid flow FF is left to right, and the embodiment of flow altering assembly 14 results in diverting the fluid flow FF around the diverter face 114 outward toward the bore wall 84 and through the device passages 118. In some embodiments, the flow altering assembly may be positioned in the manifold flow passage 47 upstream relative to the flow cross junction 68, and thus may disrupt the fluid flow FF upstream relative entry of outputs of hydraulic fracturing pumps 16 connected to the flow cross junction 68. As shown in FIG. 21, a large gradient in fluid velocity behind the diverter face 114 shows that the fracturing fluid behind the diverter face 114 may effectively act as a blank end while still allowing the fluid flow FF to travel downstream in the manifold flow passage 47. For example, in some embodiments, directly behind the diverter face 114, the fluid flow FF may closely mimic an eddy-like, slow circular flow, that might be expected to be seen at the back of a blank end (e.g., a mono-bore blank end). As shown FIG. 21, a relatively higher velocity flow stream that may be caused by diverter face 114 and/or the face supports 116 may create vortex flow that may assist in dissipating a portion of energy, thereby reducing potential peak-to-peak pressure from pressure pulsations. In some embodiments, such a flow pattern may be an indication that flow altering device 62 and/or flow altering assembly 14 may act as a quasi-blank end, changing the effective length of the section of the manifold bore 85 in which the flow altering assembly 14 is present. In some embodiments, this obstruction-like function may interrupt standing waves that have developed (or would have developed), and in some embodiments, a new quarter-wave signature may be initiated in the flow cross junction 68, for example, downstream of the flow cross passages 70 through which fracturing fluid output by two hydraulic fracturing pumps 16 enters the manifold bore 85.

Figure 22A:
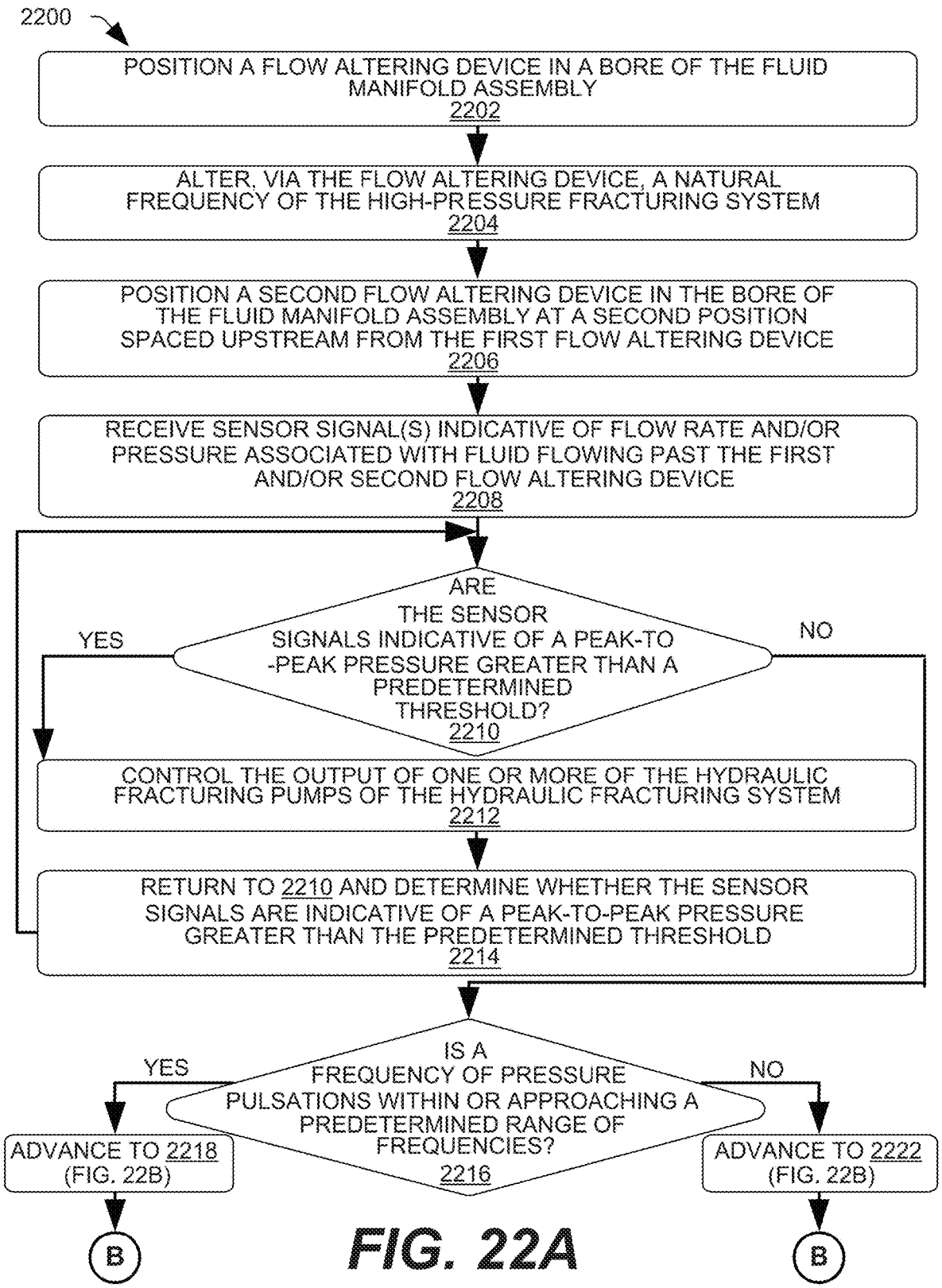
FIG. 22A is a block diagram of an example method to reduce acoustic resonance, disrupt standing wave formation, and/or reduce vibration associated with a flow of fracturing fluid in a fluid manifold assembly during operation of a high-pressure fracturing system including a plurality fracturing pumps pumping fracturing fluid through the fluid manifold assembly, according to embodiments of the disclosure.
Figure 22B:
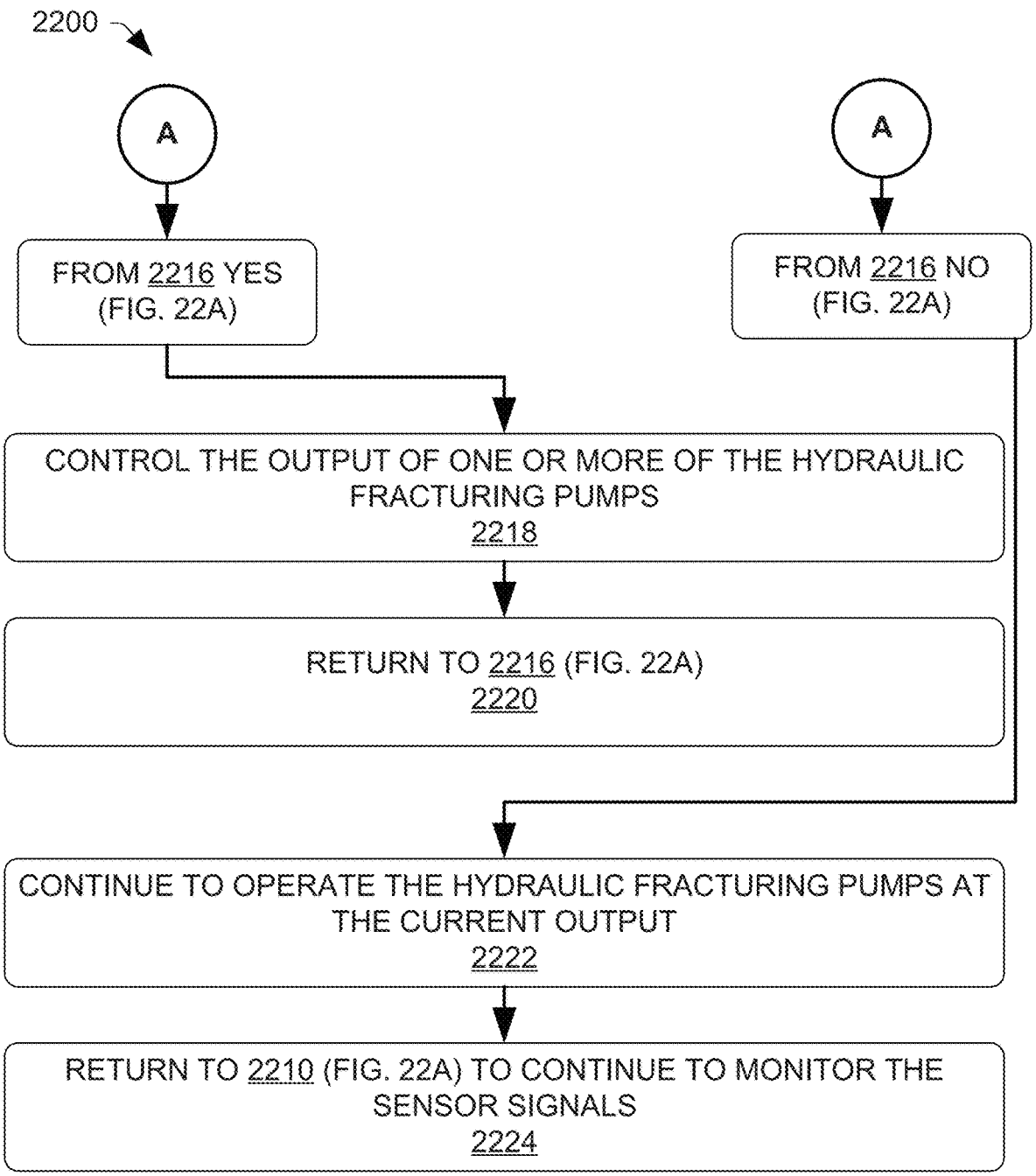
FIG. 22B is a continuation of the example method to reduce acoustic resonance, disrupt standing wave formation, and/or reduce vibration of the block diagram of FIG. 22A, according to embodiments of the disclosure.

FIG. 22A and FIG. 22B show a block diagram of an example method 2200 to prevent acoustic resonance, disrupt standing wave formation, and/or prevent vibration associated with a flow of fracturing fluid in a fluid manifold assembly during operation of a high-pressure fracturing system including a plurality fracturing pumps pumping fracturing fluid through the fluid manifold assembly, according to embodiments of the disclosure, illustrated as a collection of blocks in a logical flow graph, which represent a sequence of operations. The order in which the operations are described is not intended to be construed as a limitation, and any number of the described blocks may be combined in any order and/or in parallel to implement the method.

As shown in FIG. 22A, the example method 2200, at 2202, may include positioning a flow altering device in a bore of the fluid manifold assembly to receive a flow therethrough of fracturing fluid of the high-pressure fracturing system. For example, a flow altering device and/or flow altering assembly as described herein may be positioned in fluid manifold assembly as described herein.

At 2204, the example method 2200 may include altering, via the flow altering device, a natural frequency of the high-pressure fracturing system so that the natural frequency is outside a frequency range capable of being output by the plurality of fracturing pumps. For example, the flow altering device and/or a flow altering assembly including the flow altering device may alter natural frequency of the high-pressure fracturing system, so that the natural frequency is outside a frequency range capable of being output by the plurality of hydraulic fracturing pumps. In some embodiments, altering the natural frequency of the high-pressure fracturing system may include decreasing, via the flow altering device, an effective length of the fluid manifold assembly with respect to pressure standing waves and thus increasing the effective natural frequency of the high-pressure fracturing system.

The example method 2200, at 2206 may include positioning a second flow altering device in the bore of the fluid manifold assembly at a second position spaced upstream from the first flow altering device. For example, the second flow altering device and/or a second flow altering assembly including the second flow altering device may be positioned upstream of the first flow altering device and/or first flow altering assembly. The first and second flow altering devices may have substantially the same configuration or different configurations.

At 2208, the example method 2200 may include receiving one or more sensor signals indicative of one or more of flow rate or pressure associated with fluid flowing past the first flow altering device and/or the second flow altering device. For example, the first flow altering device and/or the second flow altering device may be connected to a device adaptor, and the device adaptor may include an instrumentation port receiving a sensor that is to generate signals indicative of pressure at the device adaptor. The hydraulic fracturing system may include a controller, and the controller may receive the one or more sensor signals.

At 2210, the example method 2200 may include determining whether the sensor signals are indicative of a peak-to-peak pressure magnitude at the first flow altering device and/or at the second flow altering device being greater than a predetermined threshold. The threshold may be operator-entered via an operator interface and/or stored in memory.

If, at 2210, it is determined that the sensor signals are indicative of a peak-to-peak pressure magnitude being greater than the predetermined threshold, at 2212, the example method 2200 may include controlling or altering the output of one or more of the hydraulic fracturing pumps of the hydraulic fracturing system. For example, the controller may communicate one or more control signals to one or more of the hydraulic fracturing pumps to cause them to change output, for example, reducing the output at least temporarily, for example, until the sensor signals are indicative of the peak-to-peak pressure magnitude dropping below the predetermined threshold.

At 2214, the example method 2200 may include returning to 2210 and determining whether the sensor signals are indicative of a peak-to-peak pressure magnitude at the first flow altering device and/or at the second flow altering device being greater than the predetermined threshold.

If, at 2210, it is determined that the sensor signals are not indicative of a peak-to-peak pressure magnitude being greater than the predetermined threshold, at 2216, the example method 2200 may include determining whether a frequency of pressure pulsations at the first flow altering device and/or at the second flow altering device are within or approaching a predetermined range of frequencies. For example, the predetermined range of frequencies may be close to or equal to the fundamental frequency and/or natural frequency of the fluid manifold assembly, and thus operation of the hydraulic fracturing system at a pressure pulsation frequency approaching or within the predetermined range of frequencies may result in resonance and therefore excessive mechanical vibration. The predetermined range of frequencies may be operator-entered via an operator interface and/or stored in memory. In some embodiments, the controller may determine or estimate the predetermined range of frequencies during operation of the hydraulic fracturing system.

If, at 2216, it is determined that the sensor signals are indicative of the frequency of pressure pulsations at the first flow altering device and/or at the second flow altering device being within or approaching the predetermined range of frequencies, at 2218 (FIG. 22B), the example method 2200 may include controlling or altering the output of one or more of the hydraulic fracturing pumps of the hydraulic fracturing system. For example, the controller may communicate one or more control signals to one or more of the hydraulic fracturing pumps to cause them to change output, for example, reducing or increasing the output of one or more of the hydraulic fracturing pumps at least temporarily, for example, until the sensor signals are indicative of the frequency of pressure pulsations at the first flow altering device and/or the second flow altering device no longer being within or no longer approaching the predetermined range of frequencies.

As shown in FIG. 22B, at 2220, the example method 2200 may include returning to 2216 (FIG. 22A) and determining whether a frequency of pressure pulsations at the first flow altering device and/or at the second flow altering device are within or approaching the predetermined range of frequencies.

If, at 2216 (FIG. 22A), it is determined that the sensor signals are not indicative of the frequency of pressure pulsations at the first flow altering device and/or at the second flow altering device being within or approaching the predetermined range of frequencies, at 2222 (FIG. 22B), the example method 2200 may include continuing to operate the hydraulic fracturing pumps at the current output.

At 2224, the example method may include returning to 2210 to continue to monitor the sensor signals.

Figure 23:
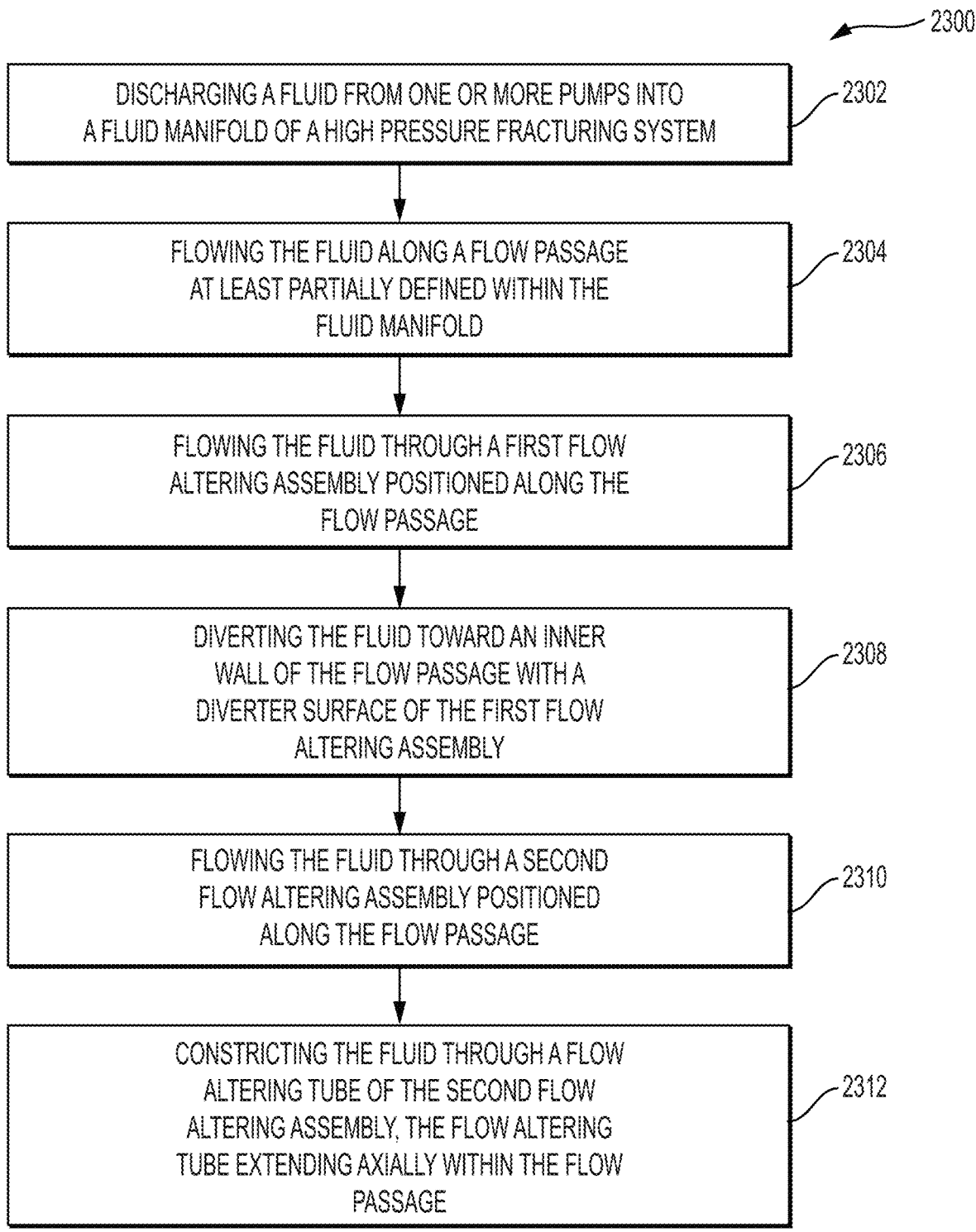
FIG. 23 is a block diagram of an example method to reduce acoustic resonance and/or disrupt standing wave formation in a fluid manifold of a high-pressure fracturing system, according to embodiments of the disclosure.

FIG. 23 shows a block diagram of an example method 2300 to reduce acoustic resonance and/or disrupt standing wave formation in a fluid manifold of a high-pressure fracturing system, according to embodiments of the disclosure. Method 2300 is illustrated as a collection of blocks in a logical flow graph, which represent a sequence of operations. The order in which the operations are described is not intended to be construed as a limitation, and any number of the described blocks may be combined in any order and/or in parallel to implement the method. Moreover, in describing the features of method 2300, reference will be made to the devices, systems, and features of FIGS. 1-21. Thus, so as to illustrate the features of method 2300 according to some embodiments, reference will be made to features shown in FIGS. 1-21 and previously described. However, it should be appreciated that embodiments of method 2300 may not necessarily be limited to these specific examples.

Method 2300 includes, at 2302, discharging a fluid from one or more pumps into a fluid manifold of a high-pressure fracturing system. In addition, method 2300 includes, at 2304, flowing the fluid along a flow passage at least partially defined within the fluid manifold. In some embodiments, the fluid manifold may include one or more (e.g., a plurality of) elongate spool sections (e.g., spool sections 80) coupled to one another along a longitudinal axis (e.g., axis 49) via a plurality of flow cross junctions (e.g., flow cross junctions 68). In addition, in some embodiments, the fluid may be a hydraulic fracturing fluid, such that the fluid may be emitted from the fluid manifold into a subterranean wellbore as part of a hydraulic fracturing operation.

Referring still to FIG. 23, method 2300 may also include, at 2306, flowing the fluid through a first flow altering assembly positioned along the flow passage, and, at 2308, diverting the fluid toward an inner wall of the flow passage with a diverter surface of the first flow altering assembly. For instance, the first flow altering device may have a diverter surface 114 (or diverter face 114) (FIGS. 5-8 and 17) that diverts the flow of fluid radially away from the longitudinal axis (e.g., axis 49) and toward an inner wall (e.g., bore wall 84) of the flow passage during operation.

Further, method 2300 includes, at 2310, flowing the fluid through a second flow altering assembly positioned along the flow passage, and, at 2312, constricting the fluid through a flow altering tube of the second flow altering assembly, the flow altering tube extending axially within the flow passage. For instance, in some embodiments the second flow altering device may include a through passage (e.g., longitudinal device passage 112), having a cross-sectional area relatively smaller than the cross-sectional area of the flow passage of the fluid manifold, such that the fluid flow may be constricted as it progresses into and through the through passage. This flow constriction may cause a velocity differential and/or a pressure differential in the fluid flow that may act to increase the velocity of the fluid flow, which, in turn, may create an offset pressure wave, dissipate the amount of energy in the fracturing fluid, and/or prevent or mitigate pressure pulses (e.g., pressure pulses from downstream hydraulic fracturing pumps 16) from being transmitted upstream via the fluid manifold.

In some embodiments, the method 2300 includes flowing the fluid through the first flow altering passage at 2306 after flowing the fluid through the second flow altering passage at 2310. In some embodiments, method 2300 includes preventing the fluid from flowing along a continuous axial path along the flow passage from a point upstream of the second flow altering assembly to a point downstream of the first flow altering assembly. In some embodiments, flowing the fluid through the first flow altering assembly at 2306 includes flowing the fluid through a plurality of flow passages after diverting the fluid with the diverter surface. The plurality of flow passages (e.g., flow passages 118) may be defined circumferentially between a plurality of circumferentially spaced supports (e.g., supports 116) extending between an annular flange (e.g., annular flange 110) and the diverter surface.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They may also be practiced with other computer system configurations, including handheld devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks can be performed by remote processing devices linked through a communications network.

This application claims priority to and the benefit of, U.S. Provisional Application No. 63/262,993, filed Oct. 25, 2021, titled "DEVICES AND METHODS TO PREVENT ACOUSTIC RESONANCE AND/OR DISRUPT FORMATION OF STANDING WAVES IN A FLUID MANIFOLD DURING OPERATION OF A HIGH-PRESSURE FRACTURING SYSTEM," the disclosures of which is incorporated herein by reference in its entirety.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. A fluid manifold for a high-pressure fracturing system, the fluid manifold comprising:
   one or more spool sections;
   a flow passage at least partially defined by the one or more spool sections that extends along a longitudinal axis;
   a first flow altering assembly positioned along the flow passage, the first flow altering assembly including a diverter surface positioned to divert fluid flowing within the flow passage radially away from the longitudinal axis; and a second flow altering assembly positioned along the flow passage and spaced from the first flow altering assembly along the longitudinal axis, the second flow altering assembly including:
an annular flange; and
a flow altering tube extending axially from the annular flange such that the annular flange and the flow altering tube define an annular cavity that extends radially between the flow altering tube and an inner wall of the flow passage and that extends axially along the flow altering tube to the annular flange,
wherein the flow altering tube comprises an inner surface extending axially between an open upstream end of the flow altering tube and an open downstream end of the flow altering tube such that the inner surface defines a through passage extending axially through the flow altering tube,
wherein at least one aperture having a first diameter extends radially through the flow altering tube to the through passage,
wherein the open upstream end of the flow altering tube defines an axial opening having a second diameter greater than the first diameter.

2. The fluid manifold of claim 1, wherein the second flow altering assembly is upstream of the first flow altering assembly.

3. The fluid manifold of claim 1, wherein the first flow altering assembly comprises:
a second annular flange; and
a plurality of supports extending between the second annular flange and the diverter surface, the plurality of supports being circumferentially spaced about the longitudinal axis so as to define a plurality of flow passages circumferentially between the plurality of supports.

4. The fluid manifold of claim 3, wherein the diverter surface is spaced from the second annular flange along the longitudinal axis.

5. The fluid manifold of claim 4, wherein the diverter surface comprises a convex curved surface.

6. The fluid manifold of claim 3, wherein the plurality of supports extend radially from the second annular flange and the diverter surface.

7. The fluid manifold of claim 1, wherein the open upstream end defines a leading edge of the flow altering tube and an outer surface of the flow altering tube defines a truncated cone-shaped profile between the leading edge and the open downstream end.

8. The fluid manifold of claim 7, wherein the second flow altering assembly comprises a rear flow altering tube extending axially away from the annular flange on an opposite side of the annular flange from the flow altering tube, the rear flow altering tube diverging radially outward when moving axially away from the annular flange.

9. The fluid manifold of claim 1, wherein:
a leading edge of the flow altering tube defines the open upstream end,
the leading edge includes a frustoconical surface, and
the frustoconical surface angles radially inward toward the longitudinal axis when moving axially away from the leading edge.

* * * * *